(12) United States Patent
Innikel et al.

(10) Patent No.: US 12,274,288 B2
(45) Date of Patent: Apr. 15, 2025

(54) FOAMED PRODUCT DISPENSING SYSTEM, VALVE MEMBER, AND PRODUCT CONTAINER

(71) Applicant: FrieslandCampina Nederland B.V., Amerfoort (NL)

(72) Inventors: Quintijn Innikel, Wageningen (NL); Mark Robert René Massa, Wageningen (NL); Robert Matheus Adriaan Poets, Wageningen (NL); Koen Beeckman, Wageningen (NL)

(73) Assignee: FrieslandCampina Nederland B.V, Amersfoort (NL)

( * ) Notice: Subject to any disclaimer, the term of this patent is extended or adjusted under 35 U.S.C. 154(b) by 193 days.

(21) Appl. No.: 17/883,254

(22) Filed: Aug. 8, 2022

(65) Prior Publication Data

US 2023/0033650 A1 Feb. 2, 2023

Related U.S. Application Data

(63) Continuation of application No. PCT/NL2021/050127, filed on Feb. 26, 2021.

(30) Foreign Application Priority Data

Feb. 28, 2020 (EP) .................................... 20160193

(51) Int. Cl.
*A23P 30/40* (2016.01)
*B01F 23/235* (2022.01)
(Continued)

(52) U.S. Cl.
CPC ............ *A23P 30/40* (2016.08); *B01F 23/235* (2022.01); *B01F 35/42* (2022.01); *B01F 35/451* (2022.01);
(Continued)

(58) Field of Classification Search
CPC ........ A23P 30/40; B01F 23/235; B01F 35/42; B01F 35/451; B01F 35/71805;
(Continued)

(56) References Cited

U.S. PATENT DOCUMENTS

| | | | | | |
|---|---|---|---|---|---|
| 1,196,510 | A | * | 8/1916 | Blattau | B65D 47/286 215/322 |
| 1,862,870 | A | * | 6/1932 | Tiscornia | B65D 47/286 141/370 |

(Continued)

FOREIGN PATENT DOCUMENTS

| EP | 1 061 006 | 12/2000 |
|---|---|---|
| EP | 1 927 290 | 6/2008 |

(Continued)

OTHER PUBLICATIONS

International Search Report and Written Opinion on PCT Appl. Ser. No. PCT/NL2021/050127 dated Jun. 29, 2021 (16 pages).

*Primary Examiner* — Donnell A Long
(74) *Attorney, Agent, or Firm* — Foley & Lardner LLP

(57) ABSTRACT

A foamed product dispensing system, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the system includes a hermetically sealable wall structure that encloses a container receiving space for receiving the container, wherein the wall structure includes a product outlet port that is closable (and sealable) by a thermally insulating closure member.

19 Claims, 34 Drawing Sheets

(51) Int. Cl.
*B01F 35/42* (2022.01)
*B01F 35/45* (2022.01)
*B01F 35/71* (2022.01)
*B01F 101/07* (2022.01)

(52) U.S. Cl.
CPC .... *B01F 35/71805* (2022.01); *B01F 2101/07* (2022.01)

(58) Field of Classification Search
CPC .............. B01F 2101/07; B01F 25/314; B01F 33/5014; B01F 35/71745; B01F 35/2213; B01F 35/7547; A23G 9/28; A47J 31/4485; B65D 90/58; B65D 90/587; B65D 47/283; B65D 47/286; B65D 83/262; B05C 5/02; B05C 5/0225; B05C 5/0237; B05C 11/1034; B67D 3/0003
See application file for complete search history.

(56) References Cited

U.S. PATENT DOCUMENTS

| | | | | |
|---|---|---|---|---|
| 2,099,289 A * | 11/1937 | Raymond | ............ | B65D 47/286 222/542 |
| RE23,830 E * | 5/1954 | Mojonnier | ............ | B67D 3/0003 222/67 |
| 3,918,616 A * | 11/1975 | Goldsmith | ............... | B67D 3/02 D7/398 |
| 5,464,120 A * | 11/1995 | Alpers | ................... | G01F 11/029 222/149 |
| 7,261,131 B2 * | 8/2007 | Cleveland | ........... | B67D 1/1256 141/311 A |
| 9,565,868 B2 * | 2/2017 | D'Agostino | ............. | A23G 9/30 |
| 10,834,940 B2 * | 11/2020 | Elsom | ...................... | A23G 9/28 |
| 2007/0209521 A1 | 9/2007 | Boussemart et al. | | |
| 2009/0145924 A1 * | 6/2009 | Fiedler | ................ | B67D 1/0462 222/105 |
| 2020/0107558 A1 * | 4/2020 | Dong | ....................... | A23G 9/22 |

FOREIGN PATENT DOCUMENTS

| | | | | |
|---|---|---|---|---|
| EP | 2070587 A1 * | 6/2009 | ......... | B01F 3/04815 |
| EP | 2 586 345 A1 | 5/2013 | | |
| EP | 2 838 374 | 2/2015 | | |
| EP | 3 017 702 | 5/2016 | | |
| JP | 2015-536708 A | 12/2015 | | |
| JP | 2018-500889 A | 1/2018 | | |
| NL | 1024433 | 5/2005 | | |
| TW | 202038830 A | 11/2020 | | |
| WO | WO-2009/110794 | 9/2009 | | |
| WO | WO-2013/156336 | 10/2013 | | |
| WO | WO-2020/204697 A1 | 10/2020 | | |

* cited by examiner

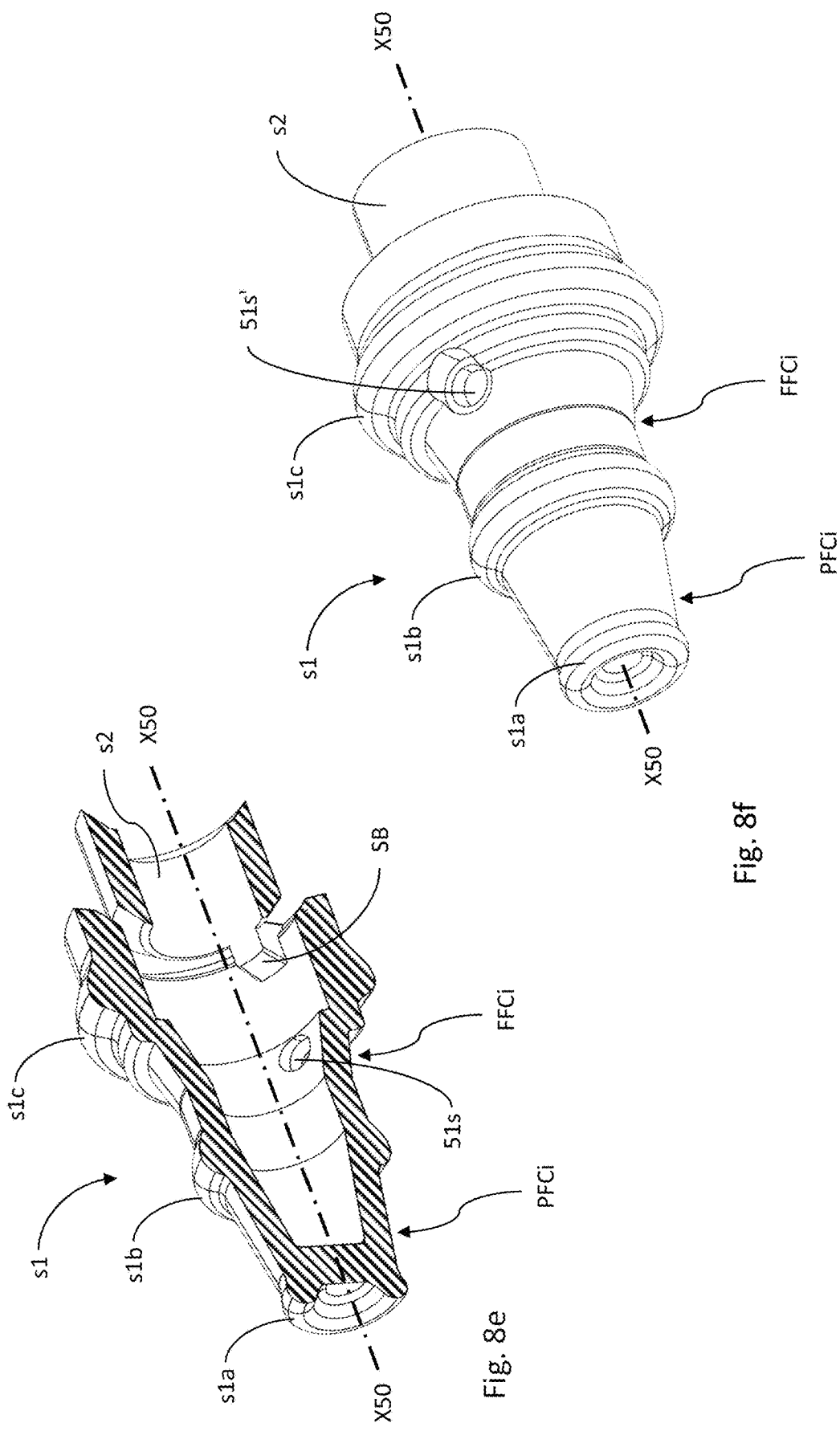

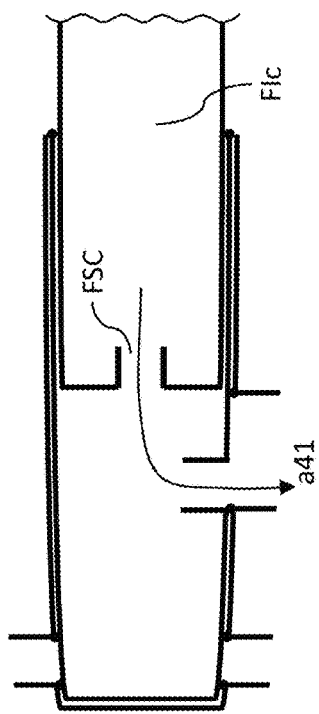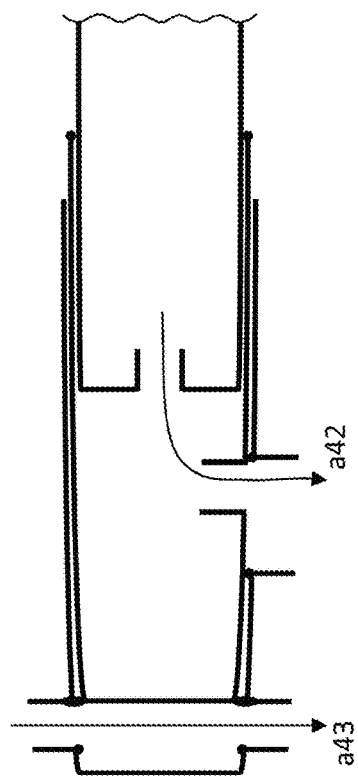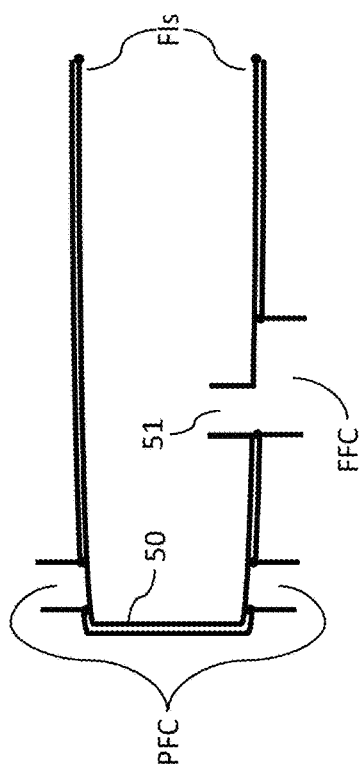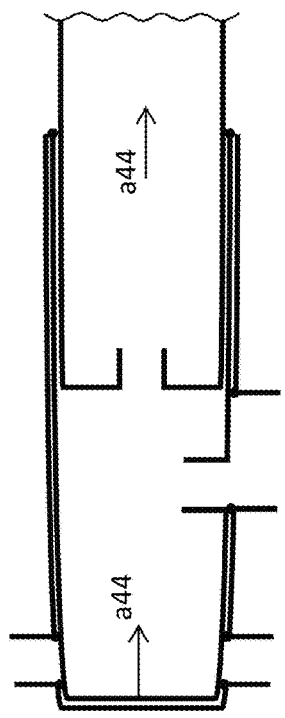

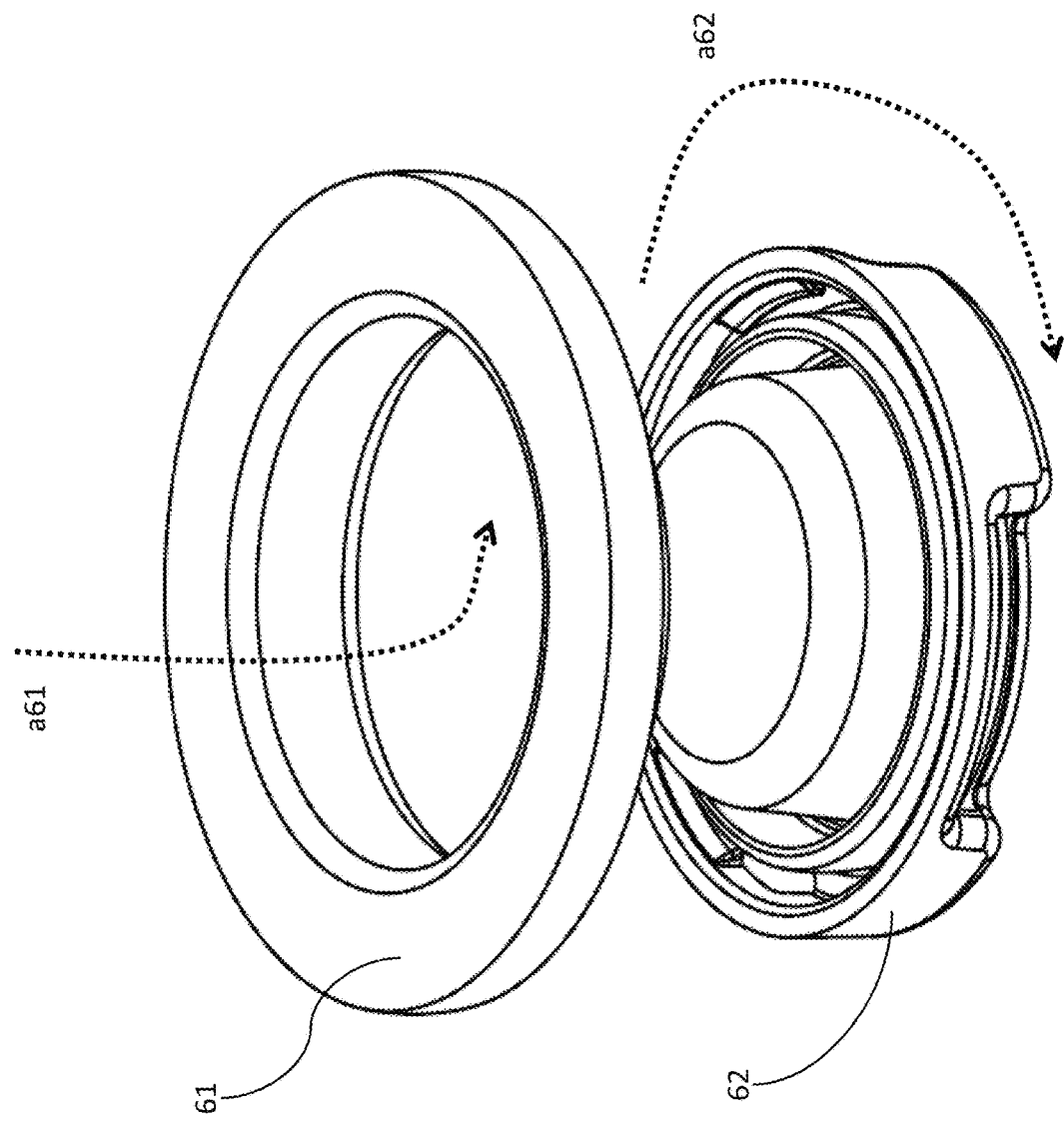

FOAMED PRODUCT DISPENSING SYSTEM, VALVE MEMBER, AND PRODUCT CONTAINER

This application is the National Phase of International Patent Application No. PCT/NL2021/050127, filed Feb. 26, 2021, published on Sep. 2, 2021 as WO 2021/172989 A1, which claims priority to European Patent Application No. 20160193.7, filed Feb. 28, 2020. The contents of these applications are herein incorporated by reference in their entirety. The invention relates to a method and system for dispensing a product, for instance a milk product, milk, foam, cream or aerated dessert or a different product.

Such a system is known from practice in various variants. It is for instance known to contain a spray cream in an aerosol, which aerosol is manually operable for spraying the cream, see for instance European patent application EP 1 061 006A1. Although highly user-friendly, spray cream is usually of poorer quality than whipped cream. Spray cream may be less stable than whipped cream; usually, the initial firmness of spray cream is less than that of whipped cream and furthermore decreases much more rapidly over time than the firmness of whipped cream. One of the causes of this is the absence of a stabilizing network of fat in spray cream. When making whipped cream, during whipping, a network of linked together (interlinked) fat globules (also called partial coalescence) is formed which contributes to the stability of the foam. The cream that is used for spray cream is usually desensitized to partial coalescence, so as to prevent particle coalescence from occurring before spraying through shaking of the aerosol and/or temperature fluctuations (which would lead to clogging of the aerosol). Another cause of the poorer stability of spray cream is the use of, for instance, nitrogen oxide for foaming the cream. Use of nitrogen oxide is often desired because owing to the high solubility of nitrogen oxide in the cream, with an acceptable pressure in the can, sufficient gas can be stored in the can. Here, the gas dissolved in the product is released upon spraying, resulting in highly aerated foam. In addition, the high dissolvability of nitrogen oxide enables the gas to diffuse relatively rapidly from the foamed product leading to a poorer stability.

A second drawback of the known spray cream is that during spraying (involving consecutive dosages from a closed, disposable container, the quality of the spray cream is not constant: the gas content of the initially sprayed cream may be higher than that of the finally sprayed cream, because during spraying, the pressure of the nitrogen oxide drops.

Automated whipped cream machines are known per se from practice and are provided with static or dynamic mixers for whipping cream. Advantages of whipped cream over spray cream concern a different product quality (less aeration, higher firmness and better conservation of firmness over time). However, in general, the known whipped cream machines require much time for preparing the foamed product (compared to spray cream systems), are less user friendly (at least, difficultly operable), relatively less hygienic and therefore required frequent cleaning.

One aspect of the present invention relates in particular to a method and system for dispensing a foamed product.

Dutch patent NL 1024433 describes a method for obtaining a monodisperse foam, wherein first, a relatively coarse prefoam is produced which prefoam is then passed through a membrane. Dutch patent NL1024438 describes a different method wherein different steam beams are spouted into a product, for instance via a beam divider in the form of a membrane.

PCT/NL2009/050097 (WO2009/110794) discloses an innovative product dispensing system, configured for carrying out a method wherein gas is supplied via a microfiltration device to the product, and wherein the product downstream of the microfiltration device undergoes a mixing treatment and/or undergoes a controlled pressure reduction. The known system is provided with a holder which contains a product to be dispensed, and product discharge means for discharging product coming from the holder, wherein the product discharge means are provided with the microfiltration device which is connectable to a fluid supply for supplying gas to the product during discharge of product, characterized in that the product discharge means are further provided with a processing device which is arranged downstream of said microfiltration device for performing a mixing treatment and/or pressure reduction treatment on the product provided with gas. A respective operating device may be provided with a cavity sealable by a cover, in which the holder is removably placeable. Preferably, the cavity is hermetically sealable from the surroundings by means of the cover, for forming a pressure chamber from the cavity. When the holder is for instance empty, the holder is removed from the operating device, and can for instance be discarded or recycled. Then, a new, (full) holder can be brought into the position for cooperation with the operating device, for the purpose of continuing dispensing of the product. Further, according to one aspect, it is advantageous when in the pressure chamber of the holder a flexible bag is provided, which bag contains the product to be dispensed.

The present invention aims to provide an improved product dispensing system, in particular for efficiently, hygienically dispensing foamed product, in a reliable and user-friendly manner. In particular, an object of the invention is to provide a system and method wherein installing and optional removing/replacing of a product holder (e.g. when substantially all the product held by the holder has been foamed by the system so that the holder has become substantially empty) can be carried out swiftly, in a well controlled manner, and preferably in a hygienic manner. Also, an aim is to provide a reliable means for allowing operation and precise process control. Further, it is aimed to provide a system having an exchangeable product container that can be made in a relatively economical manner, and can still provide a reliable hygienic operation.

Further, the invention aims to provide a product dispensing system that can be reliable, providing a relatively constant product quality under varying circumstances (e.g. change of ambient temperature and/or ambient humidity and/or dispensing location), during relatively long operational periods.

In addition, the invention aims to provide a system that can be implemented in a numerous locations, wherein transport of relatively large amounts of product (to be foamed) to end-user locations can be carried out efficiently, in an economical manner.

One or more of these objects are achieved by the features of any of the independent claims.

A first aspect of the invention, which aspect may be combined with one or more other aspects of the invention, provides a foamed product dispensing system, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the system includes a hermetically sealable wall structure that encloses a container receiving space for receiving the container, wherein the wall structure includes a product outlet port that is closable (and e.g. sealable) by a thermally insulating closure member.

Such a configuration can provide improved protection against contact with, e.g. ingress of, environmental air, which may be relatively warm and/or humid compared to (a desired condition of) the container receiving space. Thus, hygienically undesired conditions such as product being insufficiently cooled and/or humid air being in contact with undispensed product can be better prevented. Also, the system, in particular a cooling subsystem thereof, can thus be more energetically efficient.

It will be appreciated that such an exchangeable product container can be realized in various ways, at least some of which will be elucidated further in the present description. For example, the product container may comprise a flexible bag which is exchangeable and/or the product container may comprise a pressure chamber or capsule which is exchangeable, or alternatively the product container can be fixed into the dispensing machine Combinations of such options are also possible. For example, an exchangeable capsule may be provided with an exchangeable flexible bag therein, wherein the exchangeable flexible bag may be exchangeable from the exchangeable capsule.

The product container or parts thereof may be suitable or unsuitable for reuse (wherein unsuitability for reuse can be associated with disposability of such a container, the container e.g. being part of a product packaging in which the product can be transported). For example, such a capsule may be suitable or unsuitable for reuse, and such a flexible bag may be suitable or unsuitable for reuse.

An exchangeable capsule or pressure chamber can e.g. be realized in the form of a plastic, e.g. PET, container, e.g. bottle, in which product is contained, e.g. without a flexible bag therein.

It will also be appreciated that the presence of an exchangeable product container does not exclude the presence of a different product container which is not exchangeable. For example, a pressure chamber or capsule may be non-exchangeable, i.e. substantially fixed in (and thereby e.g. part of) the dispensing machine, wherein the capsule is configured to hold an exchangeable product container, e.g. comprising a flexible bag, therein.

The closure member may be movable between a first position and a second position, wherein in the first position the thermally insulating closure member provides a passage for a flow of foamed product from the product outlet port, wherein in the second position the thermally insulating closure member closes the product outlet port, wherein the closure member preferably includes a product dispensing passage that is located opposite the product outlet port when the closure member is in the first position, wherein in the closure member's second position, compared to the first position, the product dispensing passage is arranged at a distance from the product outlet port.

Such a configuration can enable that product can be dispensed (in the first position) and that thermal insulation can be increased when product is not dispensed, thus enabling that exposure to environmental air is additionally reduced when product is not being dispensed.

A seal may be provided between the wall structure and the closure member, in particular when the product outlet port is closed by the thermally insulating closure member.

Such a seal can provide additional insulation from and/or protection against environmental air.

The closure member may be manually removable from the product dispensing machine and subsequently manually replaceable therein, wherein preferably the closure member comprises a handling structure for manually handling the closure member while removing the closure member from the product dispensing machine.

Such removability and replaceability can make it easier for a user to clean and/or replace the closure member, thus promoting hygiene.

The product dispensing machine may be configured to automatically open and close the product outlet port using the closure member, in particular after a manual replacement of the closure member.

In this way, in particular due to the automation, ease of use and hygiene can be improved.

The product dispensing machine may be configured to detect a replaced closure member, e.g. using a respective sensor, wherein preferably the closure member comprises a respective detectable part, e.g. a magnet, which is configured to be detected by the product dispensing machine, e.g. by the sensor.

Such a configuration enables that the machine can readily respond to a closure member being replaced, e.g to (re)engage said closure member and/or to provide feedback to a user regarding (correct or incorrect) replacement of the closure member.

The closure member may comprise a drip retaining structure for receiving and retaining therein drips of product emanating from the product outlet port at least when the product outlet port is closed by the closure member, wherein preferably the drip retaining structure is at least partly arranged under and/or over the product outlet port when the product outlet port is closed by the closure member.

Such a drip retaining structure can help prevent that drips of product can get to parts or areas of the system which may be hard to clean and/or which may be less or not cooled. Thus, hygiene can be improved.

The product dispensing machine may comprise a closure member actuator for actuating the closure member.

In this way, the closure member can be actuated, in particular moved between multiple positions, by the machine.

The closure member actuator may be configured to engage and disengage the closure member, wherein preferably the system comprises a blocking element for blocking a movement of the closure member at a predetermined position thereof, for example for disengaging the closure member from the closure member actuator.

Such a configuration can effectively enable mutual transfer of (mechanical) control of the closure member between the machine and an operator (user) of the machine: by engaging the closure member, the machine can take control of the closure member and by disengaging the closure member, the machine can release control of the closure member so that a user can subsequently take control thereof.

The closure member actuator may be configured to magnetically engage the closure member, wherein preferably the closure member comprises a magnetically engageable element, e.g. a magnet, which is configured to be engaged by the closure member actuator.

It has been found that such a magnetic configuration can provide a good actuation of the closure member by the machine as well as good engageability and disengagability.

The closure member actuator may comprise a substantially linearly moveable actuator member which is configured to engage the closure member. In this way, the closure member can be moved well by the actuator in a relatively small space.

A second aspect of the invention, which aspect may be combined with one or more other aspects of the invention, provides a foamed product dispensing system, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the product processing unit includes a product feedthrough channel upstream of the frothing device, closable by a valve member, wherein the product processing unit includes a fluid feedthrough channel upstream of the frothing device, wherein said valve member is configured for providing a fluid communication between said fluid feedthrough channel of the product processing unit and a fluid supply of the dispensing machine, wherein at the valve member, preferably at an interface between the valve member and a respective valve seat, there is provided at least one, preferably two, more preferably all, of: a distally arranged first sealing structure configured to provide a first sealed closure which blocks the product feedthrough channel when the product feedthrough channel is closed by the valve member; and/or a second sealing structure configured to provide a second sealed closure, remote from a distal end of the valve member, at a location between a distal section and proximal section of the valve member; and/or a third sealing structure, arranged near or at a proximal section of the valve member.

Such a sealing structure or structures can provide improved performance of the valve member and/or the product processing unit, in particular reducing fluid leakage at the valve member, in particular at one or more areas where the valve member mechanically interfaces with a respective valve seat of the product processing unit.

At least one of the sealing structures may be a compressible sealing structure.

Such compressibility can enable good sealing performance while also enabling movability of the valve member.

At least one of the sealing structures may be configured to increase a respective sealing pressure under influence of an increase in fluid pressure in an area that extends along the valve member and a respective valve seat towards the product feedthrough channel.

In this way, sealing performance may be increased substantially as needed in response to the increased fluid pressure, while (greater) movability of the valve member can be provided in particular when said fluid pressure is less or not increased.

At least one of said sealing structures may be an elastically compressible structure that protrudes laterally with respect to a central axis of the valve member, said compressible structure being compressed by a respective seal receiving structure, wherein the receiving structure is dimensioned to compress the sealing structure more when the valve member is in a opened state compared to when the valve member is in a closed state.

Such a configuration can enable that the sealing structure is more compressed when the valve member is in an opened state compared to a closed state, wherein the closed state may be a default (more prevalent) state and wherein the opened state may be a state wherein sealing performance of the sealing structure is (more) critical. Thus, a degradation of sealing performance over time, in particular due to creep in the sealing material, can be prevented, at least reduced.

The receiving structure preferably forms part of the valve seat of the valve member.

Preferably the receiving structure comprises a substantially frustoconical structure which provides at least two different diameters of the receiving structure, wherein preferably a smaller of the at least two different diameters corresponds to a position of the sealing structure when the valve member is in an opened state, wherein preferably a larger of the at least two different diameters corresponds to a position of the sealing structure when the valve member is in a closed state, wherein preferably a main axis of the substantially frustoconical structure substantially coincides with the central axis of the valve member.

At least one of the sealing structures may comprise a lip seal structure for forming a lip seal, in particular between the valve member and a, e.g. the, valve seat.

Such a lip seal can provide a tighter seal in response to an increased fluid pressure at the seal.

The present disclosure also provides a valve member for a product container of a foamed product dispensing system as described above, which valve member is configured for providing a fluid communication between a fluid feedthrough channel of a product processing unit of the container and a fluid supply of the dispensing machine, wherein the valve member is preferably provided with a first, second and/or third sealing structure.

The present disclosure also provides a product container for a foamed product dispensing system as described above, wherein the product container is provided with a valve member as described above.

A third aspect of the invention, which aspect may be combined with one or more other aspects of the invention, provides a foamed product dispensing system, for example a system according to any of the preceding claims, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the product dispensing machine is configured for pressurizing a placed product container to at least two (mutually different) operating pressures for supplying product to the processing unit, the dispensing machine preferably including a user operable controller for selecting a desired container operating pressure, wherein more preferably said gas supply is configured for providing a predetermined gas flow rate during operation that is substantially independent of a set product container operating pressure.

In this way, by selecting a higher operating pressure, a product-to-air ratio of dispensed product can be increased, i.e. more product can be dispensed with respect to the amount of air in the dispensed product, wherein product-to-air ratio can be associated with firmness of the dispensed foamed product. Thus, for example, a user can modify product overrun.

A fourth aspect of the invention, which aspect may be combined with one or more other aspects of the invention, provides a foamed product dispensing system, for example a system according to any of the preceding claims, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the gas supply is a choked flow gas supply, including a gas restriction for achieving choked flow during operation, wherein the flow constriction is arranged in one of: a (movable) fluid injector connector of the product dispensing machine, in particular in a distal part of the fluid injector; and the product processing unit.

In this way, a dead volume of gas between the flow constriction and (a part of) the frothing device can be reduced, so that fluid pressure can be build up more rapidly at the frothing device, e.g. around the start of dispensing product.

The gas supply may be configured to provide a gas buffer volume upstream of the flow constriction, in particular for providing a pressurized gas buffer, the gas buffer volume in particular being located between a gas pressurization pump of the system and the flow restriction, wherein preferably a minimum volume of the buffer volume is 0.5 liter.

Such a gas buffer volume can provide more rapid initial pressurization at the flow constriction.

The gas supply may comprise a condensate block arranged upstream of the flow constriction and configured to cool and/or dry gas in the gas supply, wherein the condensate block comprises a drain valve for draining condensate from the condensate block, wherein the drain valve is fluidly connected to the product container and/or to a receiving space of the machine, which receiving space is configured for receiving the product container.

In this way, air can drain from the product container through the condensate block through the drain valve into the atmosphere.

A fifth aspect of the invention, which aspect may be combined with one or more other aspects of the invention, provides a foamed product dispensing system, for example a system according to any of the preceding claims, wherein the system includes a product dispensing machine, configured to receive an exchangeable product container; a product container, configured to cooperate with the product dispensing machine, to be pressurized, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein the system further includes an exchangeable capsule configured to exchangeably receive the product container, wherein the machine is configured to exchangeably receive the capsule containing the product container, wherein the capsule is configured to cooperate with the product dispensing machine to be pressurized, wherein the product dispensing machine is configured to enable a pressurization of the capsule depending on a position and/or orientation of the capsule relative to the machine.

Such a configuration can help to prevent that the capsule is pressurized (or that an attempt at such a pressurization is made) while the capsule is not positioned and/or oriented as desired, in particular safely, with respect to the machine. In this way, usage problems such as accidents due to unsafe pressurization can be better avoided.

The product dispensing machine may comprise a retaining member which is movable from a releasing position to a retaining position depending on the position and/or orientation of the capsule relative to the machine, wherein in the releasing position the capsule is releasable from the machine, wherein in the retaining position the capsule is retained in the machine.

Such a retaining member can promote correct placement of the capsule, by providing a clue to the user regarding correctness of the position and/or orientation of the capsule.

The product dispensing machine may comprise a door which is movable from an opened position to a closed position when the retaining member is in its retaining position, wherein in its releasing position the retaining member substantially blocks a movement of the door from the opened position to the closed position, wherein preferably the machine is configured to detect when the door is in the closed position.

Thus, the door can be substantially uncloseable when the retaining member is in its retaining position, which may in turn be due to an incorrect placement of the capsule. By the machine detecting when the door is closed, pressurization of the capsule by the machine can thus be at least indirectly conditioned on correct placement of the capsule in the machine.

The capsule may comprise a handle which is configured to cooperate with the retaining member for allowing the retaining member into its retaining position depending on the position and/or orientation of the capsule relative to the machine.

It has been found that such a configuration can be user friendly and robust.

According to another aspect, which can optionally be combined with one or more other aspects, there is provided a foamed product dispensing system, wherein the system includes:
  a product dispensing machine, configured to receive an exchangeable product container and for example to pressurize the product container;
  a product container, configured to cooperate with the product dispensing machine, after placement in the machine;
  wherein the product container contains a foamable product, wherein the product container is provided with a product processing unit (CPU) including a frothing device having a product entrance for receiving product and a product exit for discharging product, wherein the processing unit is connectable to a fluid (in particular gas) supply for supplying gas to the product (preferably during product discharge), wherein the product processing unit is preferably provided with a processing device which is arranged downstream of said frothing device, for performing a mixing treatment and/or pressure reduction treatment on the product provided with gas, wherein the product processing unit includes a product feedthrough channel upstream of the frothing device, closable by a valve member, wherein the product processing unit (CPU) includes a fluid feedthrough channel upstream of the frothing device, wherein said valve member is configured for providing a fluid communication between said fluid feedthrough channel of the product processing unit and a fluid supply of the dispensing machine.

In this way, a particularly user-friendly system can be provided, and can dispense foamed product of a high quality in a reliable, hygienic manner. Furthermore, the system can be of compact, robust and economic design. In particular, the CPU's valve member (being part of the product container) for controlling product flow towards the micro filtration device is configured to provide a fluid supply (connection) as well, thereby allowing for a compact configuration and reliable construction. In particular, installing of the product container into the product dispensing machine can lead to the CPU's valve member being brought into cooperation with respective machine components, in particular a valve member actuator of the machine, wherein the coupling can automatically lead to connecting the fluid supply as well. After such installation, the valve member is available to control both product and fluid flow (depending on respective machine control states). For example, after installing of the container (wherein the valve member of the CPU is connected to or gets into communication with a machine actuator component) the system can be advantageously configured to prevent product from being dispensed while such dispensing is not desired and/or not controlled by a respective operating device of the system. Also, hygienic use can be provided by implementing an exchangeable product container (integrally including the product processing unit), avoiding potential hygiene issues caused by parts of the product dispensing machine itself getting into contact with the product. It is preferred that the product container and its CPU are substantially recyclable.

According to a further embodiment, the dispensing machine includes a valve actuator, configured to cooperate with the valve member of a placed product container for moving the valve member between a product feedthrough state and a product flow blocking state.

Further it is preferred that the valve member includes a fluid passage, arranged to connect to a fluid injector of the dispensing machine when the product container is in an operating position in the machine. In this way, the valve member itself can define or include at least part of the fluid communication from the dispensing machine towards the CPU, via the internal fluid passage.

Further reliable operation can be achieved in case the valve member is at least rotatable between a product feedthrough state and a product flow blocking state.

According to a preferred embodiment, the fluid passage of the valve member coincides with or is in parallel with an axis of rotation of the valve member.

In this manner, relatively straight-forward coupling of a fluid injector of the machine to the valve member can be achieved, allowing both physical coupling as well as a good fluid flow connection.

Good foamed product dispensing results have been achieved in case the dispensing machine is configured to feed a dry or dried fluid to the fluid feedthrough channel of the product processing unit of a placed product container.

According to a further embodiment, the dispensing machine is configured to feed air to the fluid feedthrough channel of the product processing unit of a placed product container. In that case, preferably, the dispensing machine includes an air dryer for removing water from the air, thereby providing improved product dispensing results.

Advantageously, the dispensing machine is designed to cool said holder, preferably such that the temperature of the product in the holder (H) is lower than 10° C., in particular lower than 5° C. For example, an afore-mentioned air dryer can be embedded in or forms part of a cooling system of the dispensing machine, combining various functions.

According to a further embodiment, the product container can be a substantially cylinder-shaped or bucket-shaped capsule, configured to be pressurized, e.g. to a pressure of at least about 2 bar. For example, an outer wall of the container (or 'the capsule') can be made of steel, aluminum, or rigid plastic (e.g. fiber reinforced plastic), or a combination of such materials.

According to a non limiting, but preferred, embodiment, a length of the capsule can be in the range of about 20 to 40 cm, wherein an external diameter of the capsule is in the range of about 10 to 30 cm.

Also, preferably, the capsule contains at least 4 liter or a least 4 kg product before initial use, so that a relatively large amount of product is available to allow from relatively long operational times (before the container has to be exchanged with a fresh one).

In a preferred embodiment, the product dispensing machine includes a container receiving space for receiving the product container, the product container being exchangeable from the respective container receiving space, wherein a direction of container placement (into that space) is a preferably substantially horizontal direction. This is in particular advantageous in case of placing (and replacing) a relatively heavy container. It is preferred that the dispensing machine includes a container guide for guiding the container into and out of the container receiving space (along said placement direction).

According to a further embodiment, the product processing unit extends through an outer wall of the holder, in particular spaced-apart from a top wall and a bottom wall of the holder.

Preferably, the holder defines an inner space which includes a flexible bag filled with foamable product to be discharged. For example, the holder can include a fluid inlet for receiving fluid from the product dispensing machine, in particular from a respective fluid outlet that connects to the fluid inlet after placement of the holder in the machine, in order to pressurize the inner space of the holder.

Preferably, the frothing device is provided with a microfiltration wall having gas transmissive pores, for instance, a tubular wall, which separates a gas supply space associated with the fluid supply from a foaming channel associated with the product entrance.

For example, good results are achieved in case a length of the foaming channel measured in a product flow direction is at most 10 cm.

Said length can be at most 5 cm, and more particularly is in the range of approximately 0.5-5 cm, for instance, approximately 2 cm or approximately 3 cm.

Preferably, the frothing device is provided with a filtration wall with gas transmissive pores having a pore size in the range of 0.1-10 microns, in particular a pore size of at least 0.1 micron and less than 2 microns, more particularly a pore size of at least 0.2 micron and less than 1.5 microns. It will be appreciated that, within the scope of the present disclosure, other pore sizes than those mentioned are possible. For example, in a non-limiting embodiment the pore size can be substantially in the range of 5 to 10 micron. Also, various different pore sizes and/or pore size ranges may be present in any single filtration wall.

For example, the frothing device can be provided with a housing comprising a product entrance for supply of product, a gas inlet for supply of gas, and an exit for discharge of product provided with gas, wherein said gas inlet terminates in a gas receiving space which is separated by means of a microfiltration wall from said product entrance and exit.

According to a preferred embodiment, the product dispensing machine is provided with or connectable to a gas supply to supply gas under super-atmospheric pressure to the frothing device of the processing unit.

Also, it is preferred that the product dispensing machine is provided with a control unit, preferably being user operable via a user interface or operating device of the machine, the control unit being configured for controlling fluid flow and product flow to the processing unit, wherein the control unit is preferably configured to start fluid flow before product flow in case of initiating a product discharge (thereby preventing clogging of the frothing device).

According to a preferred embodiment, the product processing unit is designed to introduce gas bubbles into the product, in particular for forming a homogeneous foam.

According to a preferred embodiment, said fluid is gas or a gas mixture, for instance, nitrogen, or air.

According to a preferred embodiment, the product present in the holder is a food product, for example cream.

Moreover, according to an extra advantageous aspect, the product processing unit can include an airtight adjustable seal configured to hermetically seal a product flow path between the product processing unit and the product container before initial use, for example before the container is used (e.g. pressurized) for a first time in the machine, and to provide a passage for flow of product from the product container towards the frothing device during use of the product container, e.g. upon a certain pressurization of seal.

The adjustable airtight seal can be embodied in various ways, for example by a valve member, a spring loaded one-way valve or return valve, by a breakable or tearable sealing member that automatically breaks or ruptures at a predetermined (control/opening) pressure, or by a sealing cap that moves from a sealing position to a flow path release position under influence of a predetermined control pressure, and/or the-like. It is preferred that the airtight adjustable seal is located upstream of the frothing unit, but that is not required.

The adjustable seal can e.g. be adjustable from an airtight product flow blocking state to a product flow release state under influence of an opening pressure in the pressurized product container, wherein the opening pressure is a super-atmospheric pressure.

Further, according to an embodiment, a wall of the product container can include a flexible and/or elastic portion, allowing an internal volume of the container to change or increase.

Further, an aspect of the invention provides a foamed product dispensing system, for example a system according to the above-described aspect, wherein the system includes:
  a product dispensing machine, configured to receive an exchangeable product container;
  a product container, configured to cooperate with the product dispensing machine, after placement in the machine;
  wherein the product container contains a foamable product,
  wherein the product container is provided with a product processing unit including a frothing device having a product entrance for receiving product from the container and a product exit for discharging product, wherein the processing unit is connectable to a fluid supply for supplying gas to the product during product discharge, wherein the product processing unit is further provided with a processing device which is arranged downstream of said frothing device, for performing a mixing treatment and/or pressure reduction treatment on the product provided with gas,
  wherein the product container is a substantially cylinder-shaped or bucket-shaped capsule, configured to be pressurized, e.g. to a pressure of at least 2 bar,
  wherein a length of the capsule is in the range of about 20 to 40 cm, wherein an external diameter of the capsule is in the range of about 10 to 30 cm,
  wherein the product dispensing machine includes a container receiving space for receiving the product container, the product container being exchangeable from the respective container receiving space, wherein a direction of container placement is a preferably substantially horizontal direction.

In this way a user friendly, easy to install, foamed product dispensing system can be provided. The capsule is relatively large, allowing for a relatively large amount of product to be loaded into the dispensing machine at initial use. Also, handling of the container can be achieved by a single person. As is mentioned before, to assist the user it is preferred if the dispensing machine includes a container guide for guiding the container into and out of the container receiving space (along said placement direction).

According to another aspect of the invention, which can optionally be combined with any of the above-mentioned aspects, there is provided a foamed product dispensing system, wherein the system includes:
  a product dispensing machine, configured to receive an exchangeable product container;
  a product container, configured to cooperate with the product dispensing machine, after placement in the machine;
  wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product,
  wherein the system is configured so that the gas supply is configured to provide a choked flow gas supply.

In this way, a constant gas flow rate towards the frothing device can be achieved during operation, in particular substantially independent on any change the frothing device might experience during a certain operational period. For example, in the case that the frothing device includes small pores for injecting the gas into the product, the application of a choked flow gas supply can suppress pore clogging and/or lead to proper an reliable functioning of the frothing device in case any pore clogging does happen.

Further, there is provided a product container, evidently configured to be part of a system according to the invention, wherein the product container contains a foamable product, wherein the product container is provided with a product processing unit including a frothing device having a product entrance for receiving product and a product exit for discharging product, wherein the processing unit is connectable to a fluid supply for supplying gas to the product during product discharge, wherein the product processing unit is further provided with a processing device which is arranged downstream of said frothing device, for performing a mixing treatment and/or pressure reduction treatment on the product provided with gas,
   wherein the product processing unit includes a product feedthrough channel upstream of the frothing device, closable by a valve member,
   wherein the product processing unit includes a fluid feedthrough channel upstream of the frothing device, wherein said valve member is configured for providing a fluid communication between said fluid feedthrough channel of the product processing unit and a fluid supply of the dispensing machine.

Thus, above-mentioned advantages can be achieved as well. In a preferred embodiment, the container is configured to provide a pressure vessel, a container wall e.g. being made of steel or another rigid material suitable to provide such a pressure vessel.

Further, an aspect of the invention provides an innovative a method for dispensing foamed product, comprising:
   receiving an exchangeable product container in a product dispensing machine, wherein the product container contains a foamable product, preferably a food product, for example cream, wherein the product container is provided with a frothing device and a product feedthrough channel, closable by a valve member;
   discharging product from the product container;
   moving the valve member from a product flow blocking state to a product feedthrough state;
   supplying gas, for instance nitrogen gas or air, preferably dried air, preferably at super-atmospheric pressure, via a fluid passage of the valve member and via the frothing device to the product (e.g. before and/or during product discharge) to introduce gas bubbles into the product, in particular for forming a homogeneous foam;
   and optionally reducing a pressure of the product supplied with gas.

In this way the valve member is used to control product flow, and additionally for supply of gas, allowing a compact, hygienic and reliable way of dispensing (and foaming) the product.

According to another aspect of the invention, which can optionally be combined with any of the above-mentioned aspects, there is provided a foamed product dispensing system, wherein the system includes:
   a product dispensing machine, configured to receive an exchangeable
   a product container configured to cooperate with the product dispensing machine, after placement in the machine;
   wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein the product dispensing machine includes a container receiving space for receiving the product container, the product container being exchangeable from the respective container receiving space, wherein a direction of container placement is a preferably substantially horizontal direction, wherein the dispensing machine is configured to cool said product container after placement in the container receiving space, preferably such that the temperature of the product in the container including in the product processing unit is lower than 10° C., in particular lower than 5° C.

Preferably, the dispensing machine includes at least one cooling duct containing a cooling liquid, wherein the cooling duct preferably surrounds at least part of the container receiving space, for example extending along a helical path around the container receiving space.

Preferably, the container receiving space is defined by a wall structure, surrounding that space, the wall structure preferably including a closable foamed product passage below the processing unit of a placed product container. Preferably, the wall structure includes or is provided with a said cooling duct.

According to a preferred embodiment the system includes a closing member for closing the closable product passage of the wall structure of the container receiving space, the closing member in particular being configured to limit heat transfer between an environment of the system on one hand and the container receiving space on the other,
   wherein the closing member is movable towards an opened state, preferably by an actuator, permitting foamed product discharge via the product passage of the wall structure of the container receiving space.

A further advantage of the closing member is that it can also limit water vapor flow into the container receiving space, which is in particular advantageous when the system is used in a relatively humid environment (e.g. in the tropics).

According to another aspect of the invention, which can optionally be combined with any of the above-mentioned aspects, there is provided a foamed product dispensing system, including:
   a product dispensing machine, configured to receive an exchangeable product container;
   a product container configured to cooperate with the product dispensing machine, after placement in the machine;
   wherein the product container has a product holding space containing a foamable product, for example a food product, for example cream,
   wherein the product container is provided with a product processing unit including a frothing device having a product entrance for receiving product and a product exit for discharging product, wherein the processing unit is connectable to a fluid supply for supplying gas to the product,
   wherein the product processing unit includes an airtight seal configured to hermetically seal a product flow path between the product processing unit and the product holdings space of the product container before initial use of the product container, and to provide a passage for flow of product from the product container towards the frothing device during use of the product container, Preferably, the airtight seal is located adjacent to or at or in a product discharge opening of the product holding space of the container. Also, preferably, the airtight seal is adjustable from a flow blocking state to a product flow release state under influence of an opening pressure upstream of the seal, for example a pressure in the product holding space of the product container, wherein the opening pressure is a super-atmospheric pressure.

Further, preferably, a wall of the product container includes a flexible and/or elastic portion, allowing an internal volume of the container to change or increase.

According to another aspect of the invention, which can optionally be combined with any of the above-mentioned aspects, there is provided a foamed product dispensing system, including:
- a product dispensing machine, configured to receive an exchangeable product container;
- a product container, configured to cooperate with the product dispensing machine, after placement in a pressurization chamber in the machine;
- wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein the pressurization chamber is defined by a wall structure, the wall structure including a CPU-receiving port for receiving the product processing unit, and for engaging an exterior surface of the product processing unit in an airtight manner, the product processing unit in particular protruding through the port towards a product discharging area.

Preferably, the airtight engagement of the exterior surface of the product processing unit and the CPU-receiving port is configured to withstand pressurization of the a pressurization chamber, Also, preferably, the engagement between the product processing unit and the CPU-receiving port of the machine is releasable, in particular allowing replacement of the product container.

The system is preferably configured to provide feedback to a user regarding engagement between the product processing unit and the receiving port. The CPU receiving port and the product processing unit are preferably configured to jointly produce a sound and/or a haptic feedback signal, for example a click, upon such engagement.

According to another aspect of the invention, which can optionally be combined with any of the above-mentioned aspects, there is provided a foamed product dispensing system, including:
- a product dispensing machine, configured to receive an exchangeable product container;
- a product container, configured to cooperate with the product dispensing machine, after placement in the machine;
- wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
- wherein the product processing unit is provided with an airtight sealing cap configured to seal a downstream product discharge area of the product processing unit from an environment, the downstream area containing a product discharge nozzle of the system.

According to another aspect of the invention, which can optionally be combined with any of the above-mentioned aspects, there is provided a foamed product dispensing system, the system including:
- a product dispensing machine, configured to receive an exchangeable product container;
- a product container, configured to cooperate with the product dispensing machine, after placement in the machine;
- wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
  - wherein, during use, the product processing unit extends outside a pressurized space of the system, wherein a border of the pressurized space includes a CPU opening for exchangeably receiving the product processing unit,
  - wherein the system includes a wall structure, the wall structure including a CPU-receiving port for receiving the product processing unit,
  - wherein a shape of the product processing unit is configured to substantially mate with a shape of the CPU receiving port for positioning the product processing unit with respect to the wall structure,
  - wherein a shape of the product processing unit and a corresponding shape of the CPU receiving port are preferably rotationally asymmetric about an axis that substantially corresponds to a direction of receiving the processing unit in the port.

Preferably at least one of the shape of the product processing unit and the shape of the CPU opening is a tapered shape.

According to another aspect of the invention, which can optionally be combined with any of the above-mentioned aspects, there is provided a foamed product dispensing system, including:
- a product dispensing machine, configured to receive an exchangeable product container;
- a product container, configured to cooperate with the product dispensing machine, to be pressurized, after placement in the machine,
- wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
- wherein the system further includes an exchangeable capsule configured to exchangeably receive the product container, wherein the machine is configured to exchangeably receive the capsule containing the product container.

In a preferred embodiment, the capsule is configured to cooperate with the product dispensing machine to be pressurized.

Furthermore, preferably, the capsule preferably comprises a removable lid for providing access to the internal space of the capsule for exchanging the product container, wherein the lid is preferably configured to cooperate with a remaining part of the capsule to form an airtight connection there-between when the lid is in an assembled closed position, The product container preferably comprises a flexible bag containing product. Also, preferably, the capsule is a rigid capsule. The capsule can have various shapes, for example (but not limited to) the a cylinder-shape and/or bucket-shape.

According to another aspect of the invention, which can optionally be combined with any of the above-mentioned aspects, there is provided a product container, evidently configured to be part of a system according to the invention. The product container contains a foamable product, wherein the product container is provided with a product processing unit including a frothing device having a product entrance for receiving product and a product exit for discharging product, wherein the processing unit is connectable to a fluid supply for supplying gas to the product, wherein the product processing unit is preferably provided with a processing device which is arranged downstream of said frothing device, for performing a mixing treatment and/or pressure reduction treatment on the product provided with gas.

According to a further embodiment, the frothing device has at least one microfiltration wall that includes a hydrophobic and/or oleophobic material, for example PTFE (polytetrafluoroethylene) and/or hexafluoropropylene.

According to a further embodiment the product processing unit includes an airtight seal configured to hermetically seal a product flow path between the product processing unit and a product holding space of the product container before initial use of the product container, and to provide a passage for flow of product from the product container towards the frothing device during use of the product container.

According to a further embodiment, the product processing unit is configured to cooperate with a receiving port of a wall structure of a pressurization chamber, for mutual engagement in an airtight manner.

According to a further embodiment, the product processing unit is provided with an airtight sealing cap configured to seal a downstream product discharge area of the product processing unit from an environment, the downstream area containing a product discharge nozzle of the container.

According to a further embodiment, the container includes a wall structure, the wall structure including a CPU-receiving port for receiving the product processing unit, wherein a shape of the product processing unit is configured to substantially mate with a shape of the CPU receiving port for positioning the product processing unit with respect to the wall structure of the container.

According to a further embodiment, the product container comprises a flexible bag containing product, wherein the flexible bag is at least partly flexible for allowing change of an internal volume of the bag According to another aspect of the invention, which can optionally be combined with any of the above-mentioned aspects, there is provided a foamed product dispensing system, wherein the system includes:
a product dispensing machine, configured to receive an exchangeable product container;
a product container, configured to cooperate with the product dispensing machine, after placement in the machine;
wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
wherein the frothing device is provided with a microfiltration wall having gas transmissive pores, for instance, a tubular wall, which separates a gas supply space associated with the fluid supply from a foaming channel associated with the product entrance,
wherein the microfiltration wall includes a hydrophobic and/or oleophobic material, for example PTFE (polytetrafluoroethylene) and/or hexafluoropropylene.

For example, the microfiltration wall can be made of a hydrophobic material, or it can contain a certain amount of hydrophobic material. Additionally or alternatively, the microfiltration wall can include a coating that includes or consist of a hydrophobic and/or oleophobic material. For example, such a coating can be applied in various ways, for example via one or more of plasma coating, vapour deposition, chemical vapour deposition, immersion coating, or differently. Further, there is provided a product container, evidently configured to be part of a system according any of the above-described aspects of the invention, wherein the product container contains a foamable product, wherein the product container is provided with a product processing unit including a frothing device having a product entrance for receiving product and a product exit for discharging product, wherein the processing unit is connectable to a fluid supply for supplying gas to the product during product discharge,
wherein the frothing device is provided with a microfiltration wall having gas transmissive pores, for instance, a tubular wall, which separates a gas supply space associated with the fluid supply from a foaming channel associated with the product entrance,
wherein the microfiltration wall is configured to prevent clogging of the microfiltration wall,
wherein the microfiltration wall includes a hydrophobic and/or oleophobic material, for example PTFE (polytetrafluoroethylene) and/or hexafluoropropylene.

It has been found that in this way, a further reliable and durable operation of the system can be achieved, wherein the application of the hydrophobic an/or oleophobic material can lead to a reduction of chances of clogging of the pores of the microfiltration wall.

According to another aspect of the invention, which can optionally be combined with any of the above-mentioned aspects, there is provided a method for producing an airtightly sealed product container containing sterilized foamable product, wherein the product container includes a sterilized frothing device, a sterilized valve member having a fluid passage, a sterilized sealed off fluid inlet for connection to a gas supply after unsealing and a sterilized sealed off discharge channel for discharging foamed product after unsealing, wherein the method comprises:
providing a product container containing foamable product, wherein the product container is airtightly connected to an assembly including a frothing device, a valve member having a fluid passage, a fluid inlet for connection to a gas supply and a discharge channel for discharging foamed product;
providing the fluid inlet and the discharge channel with a removable airtight seal to airtightly seal off said fluid inlet and said discharge channel from ambient air; and
sterilizing, for example irradiating and/or heating, the product container provided with foamable product, assembly and seal.

Non-limiting examples of the invention will be explained in the following, with reference to the accompanying drawings.

FIG. 1 schematically shows perspective view of an exemplary foamed product dispensing system according to an example of the invention;

FIG. 8e shows a perspective cross section view of seal elements of a valve member according to a further embodiment;

FIG. 8f shows a perspective view of the seal elements of FIG. 8e;

FIGS. 11a-11d show schematic diagrams of different CPU valve member states;

Figure 3A:
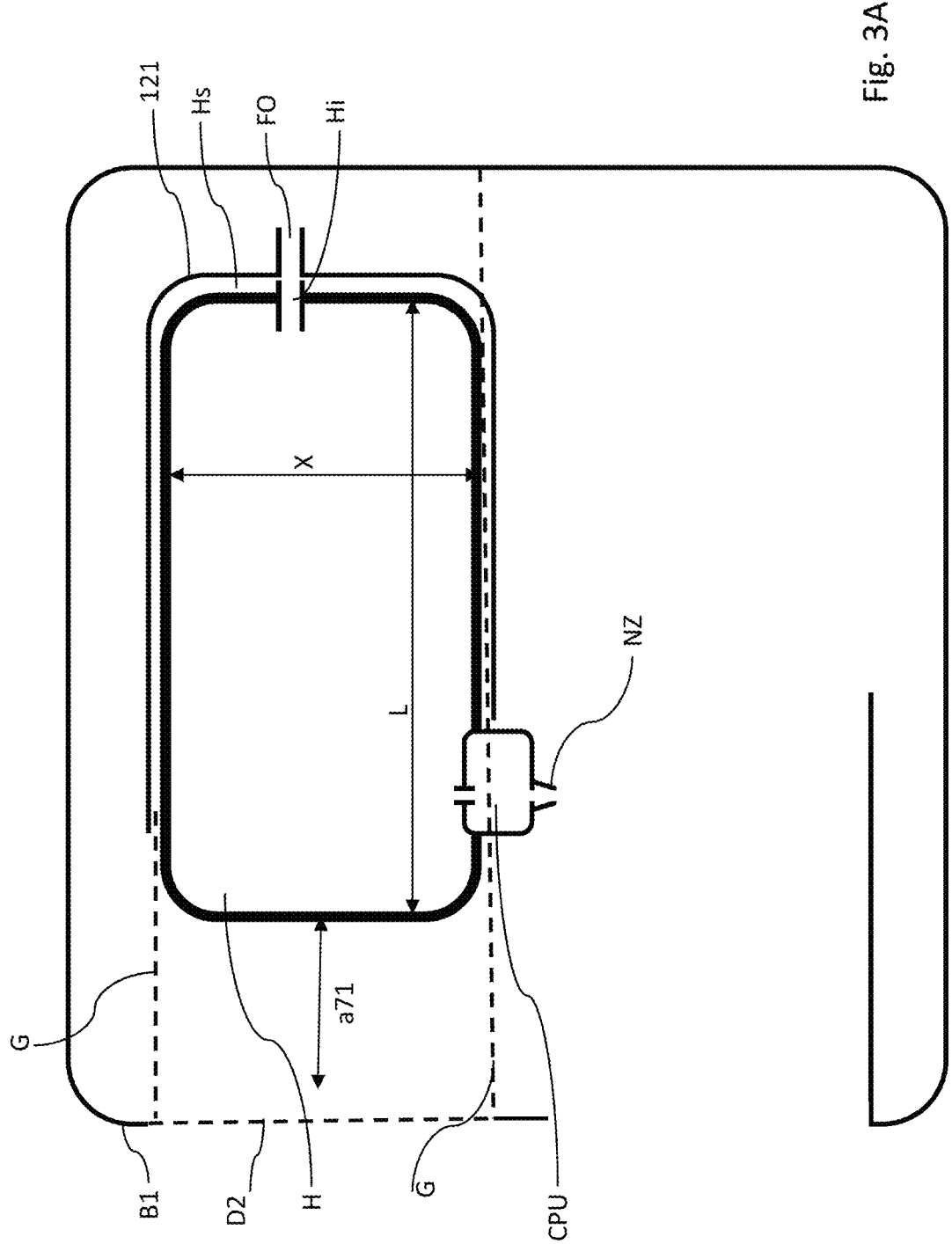
FIG. 3A shows a schematic vertical cross-section view of part of the system of FIG. 1, during unloading/loading a product container.
Figure 3B:
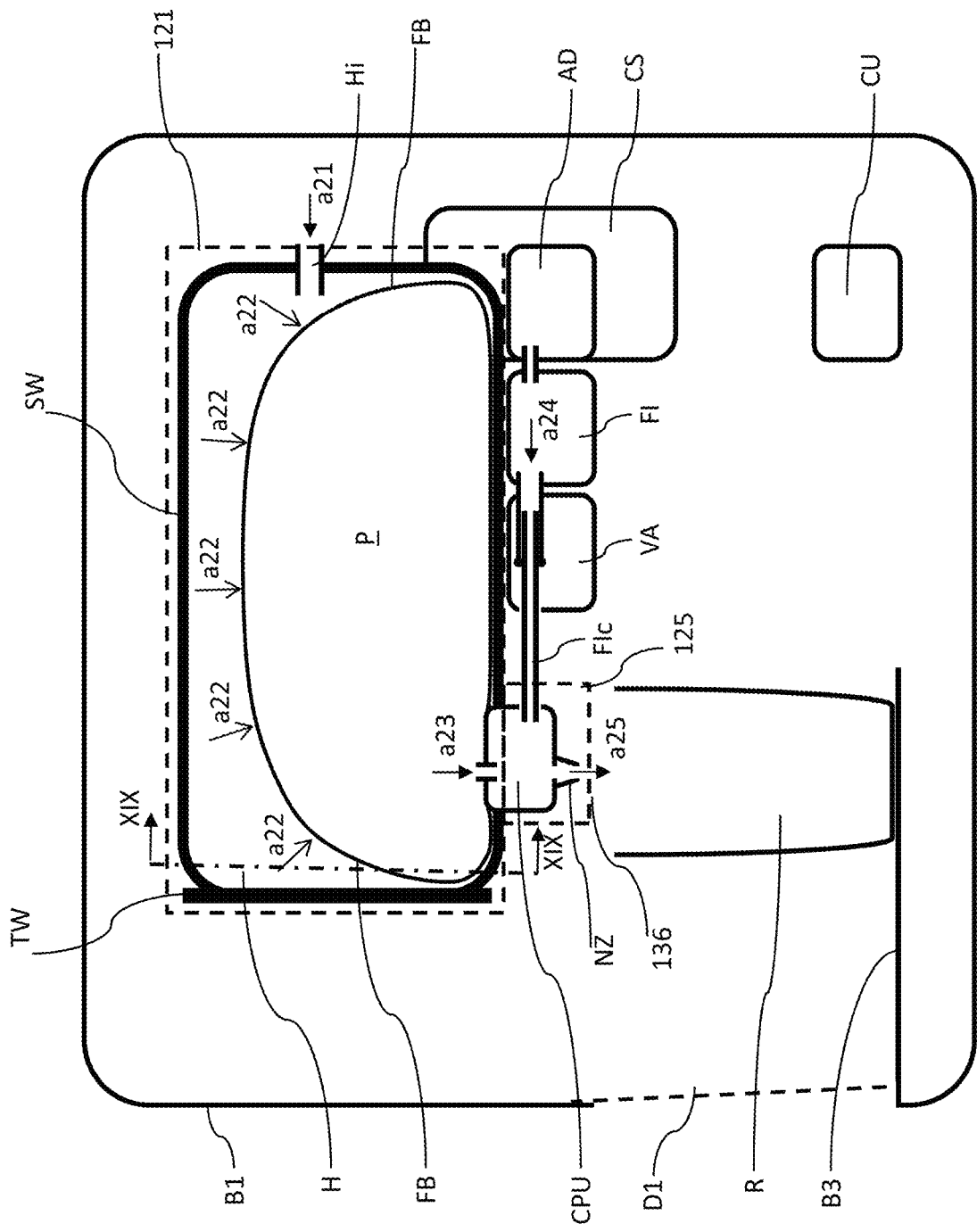
FIG. 3B is similar to FIG. 3A, showing further components of the system.
Figure 12:
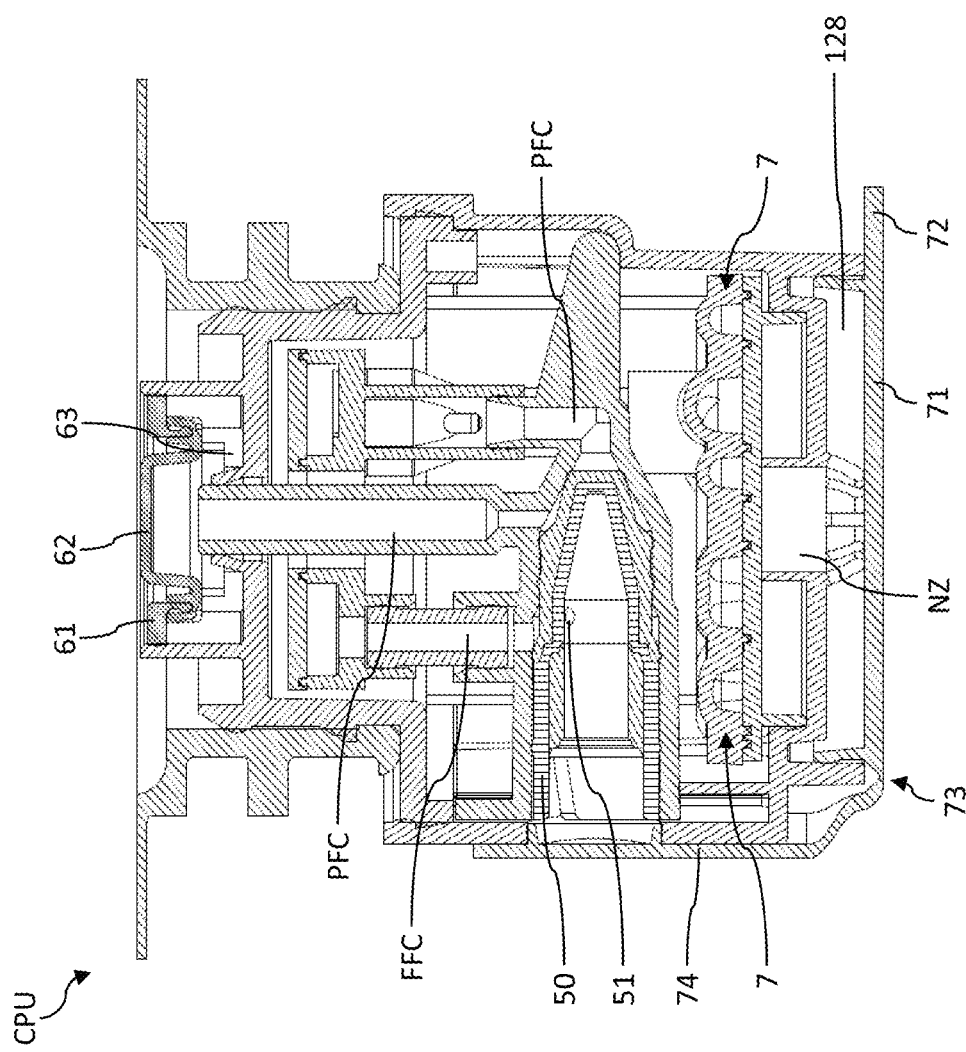
FIG. 12 shows a cross-sectional view of a further embodiment of the CPU, provided with sealing means.
Figure 13:
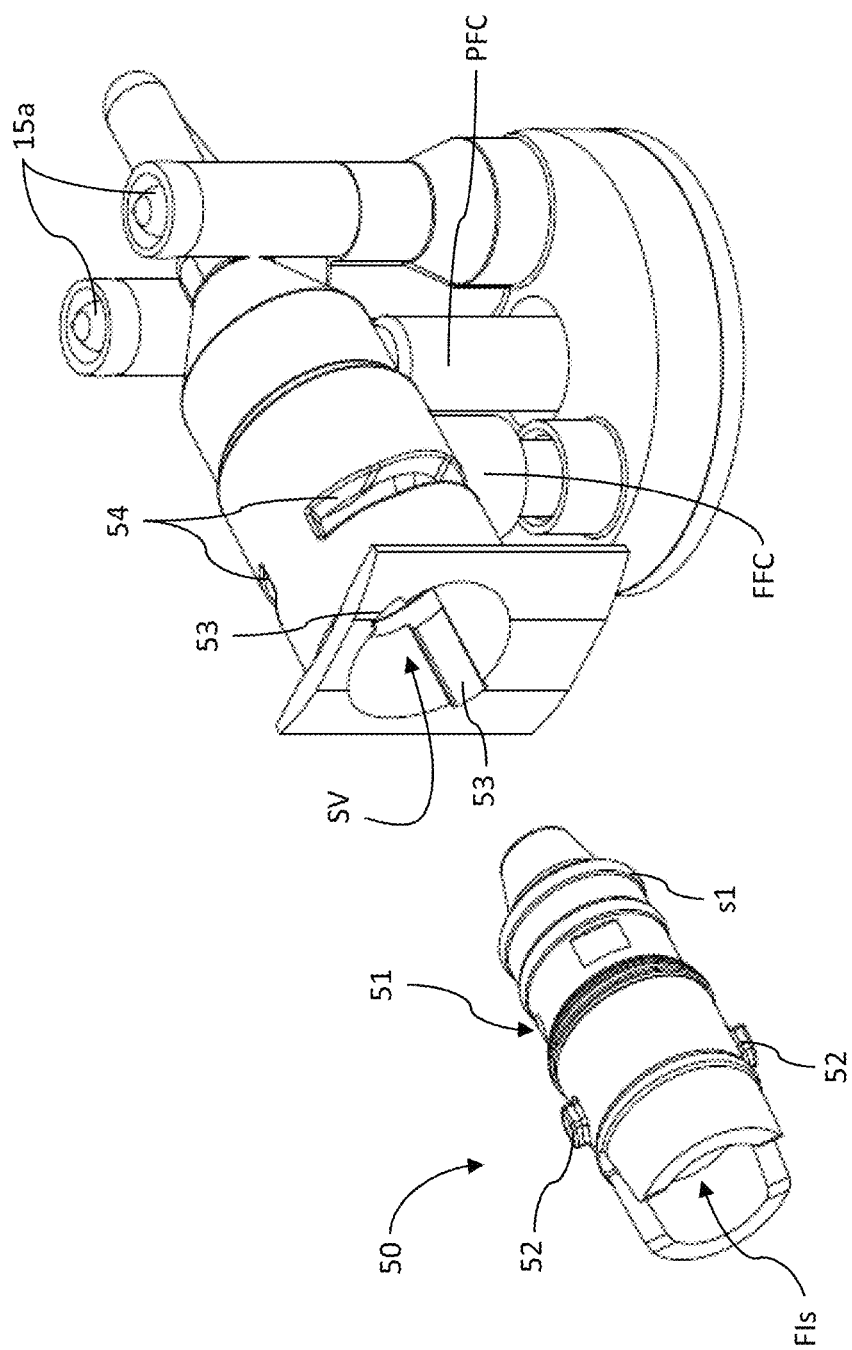
FIG. 13 shows an exploded perspective view of components of the CPU including a valve member.
Figure 14B:
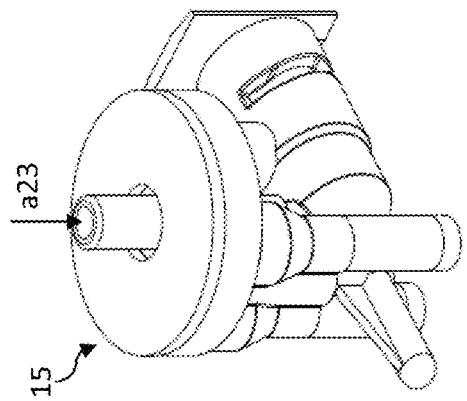
FIG. 14b shows an assembled state of the CPU components.
Figure 14A:
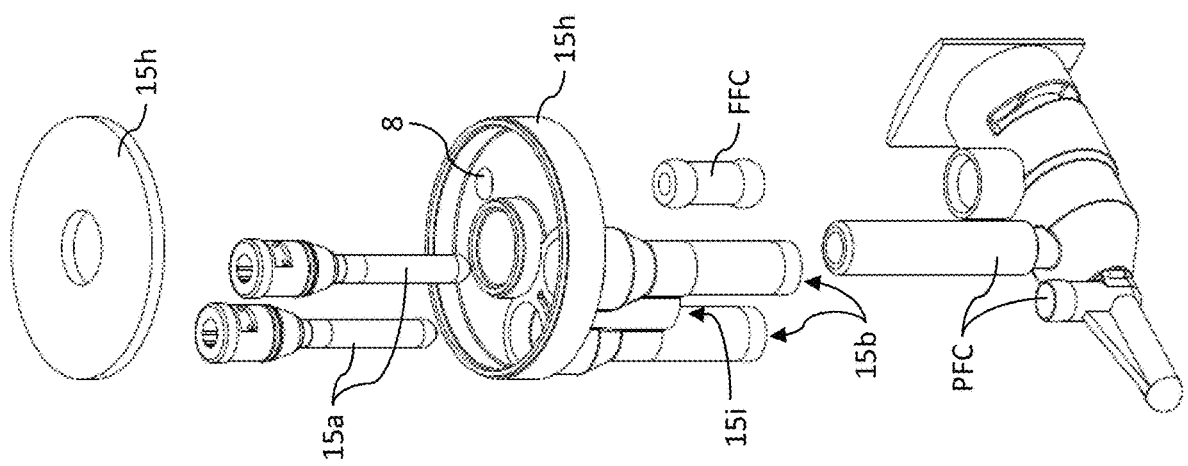
FIG. 14a shows an exploded view of components of the CPU, shown in FIG. 13.
Figure 15B:
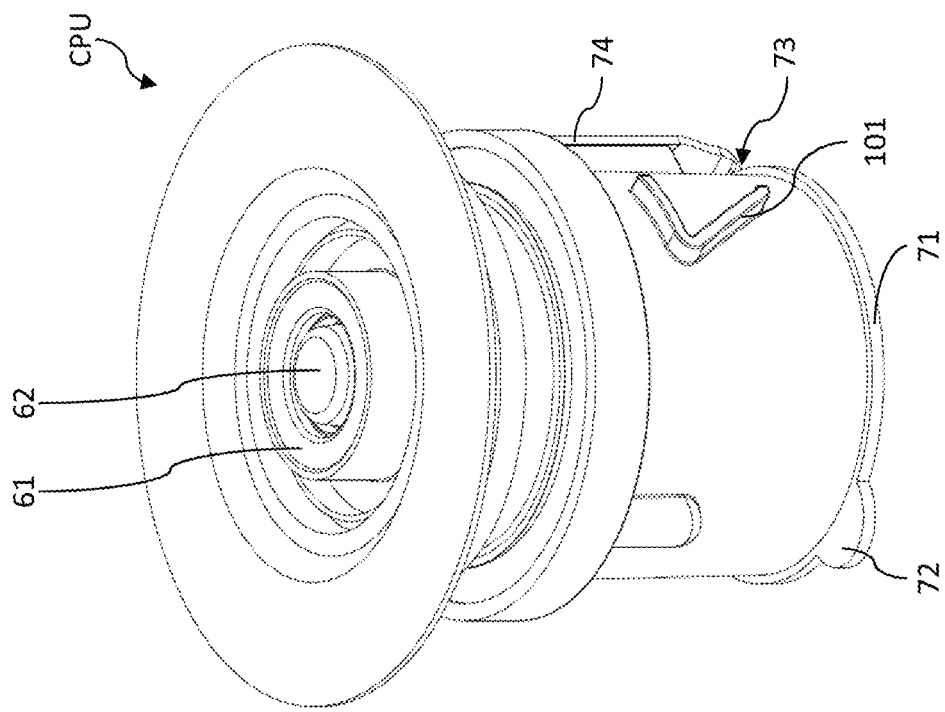
Figure 15A:
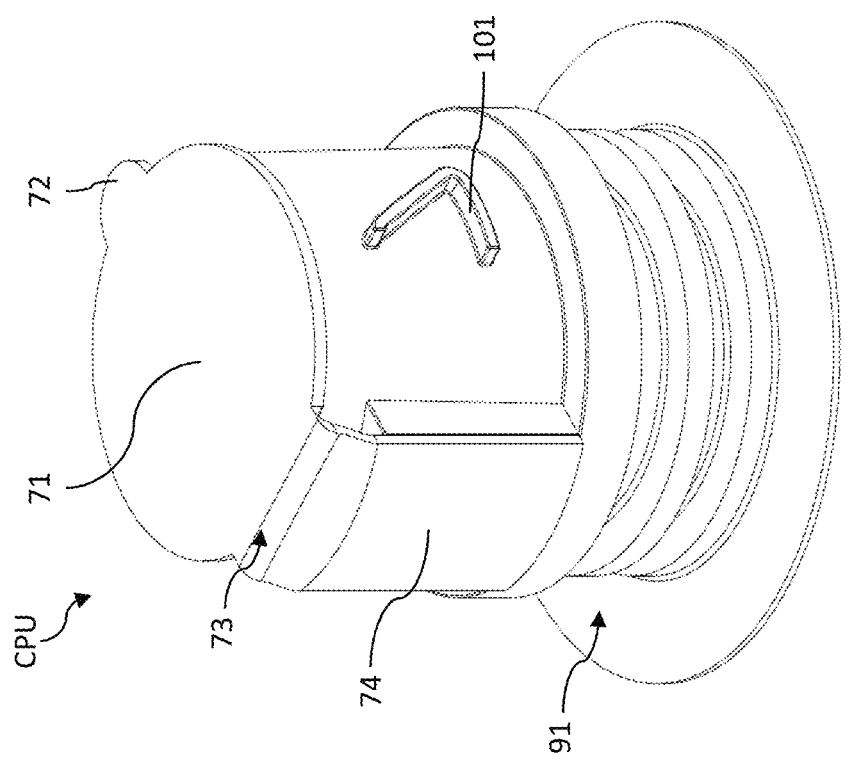
Figure 16C:
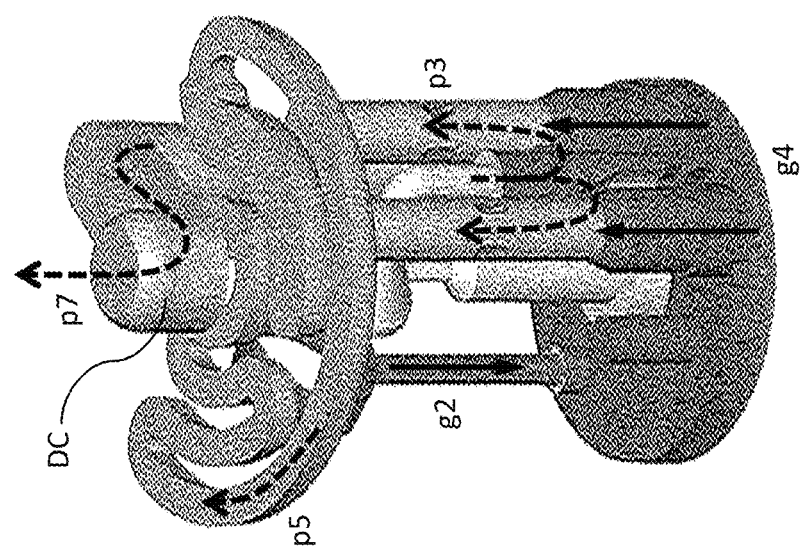
Figure 16B:
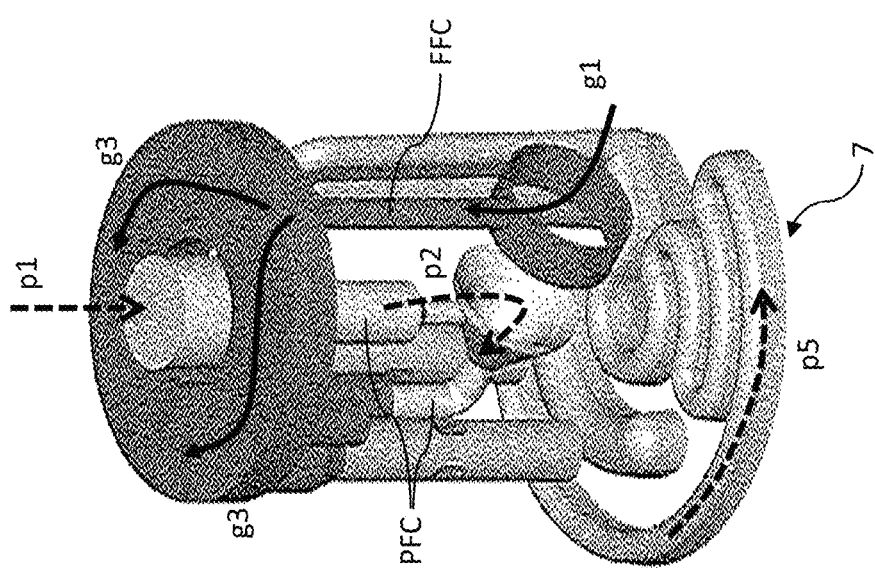
Figure 16A:
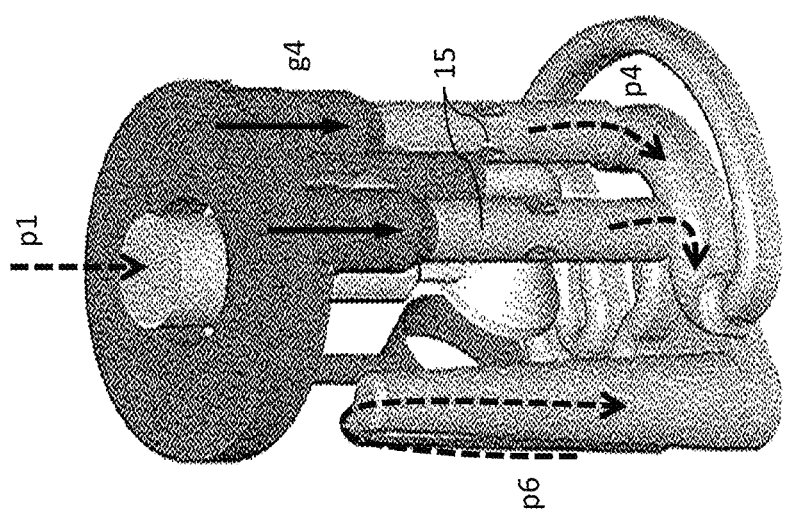
Figure 17:
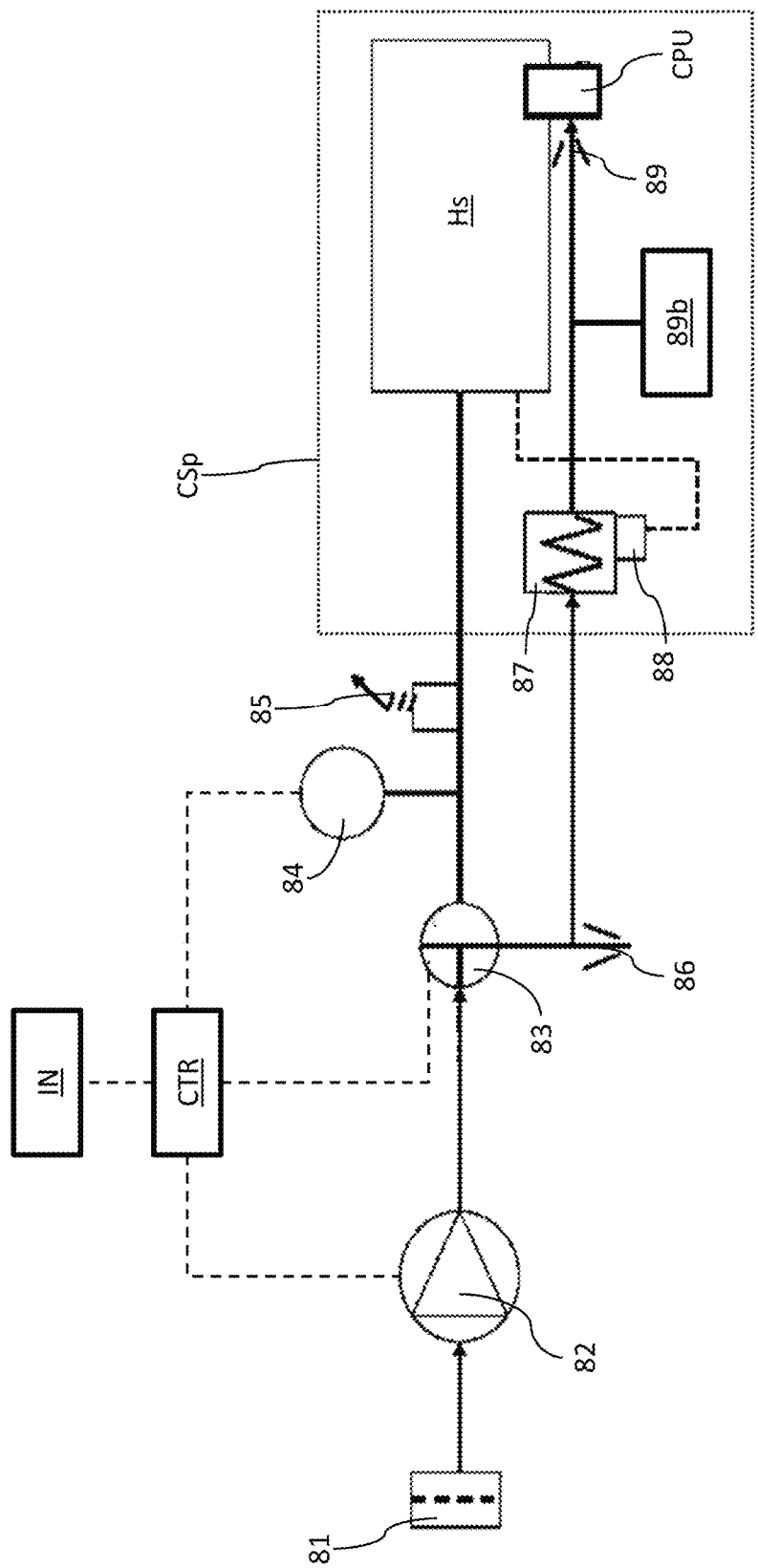
Figure 18B:
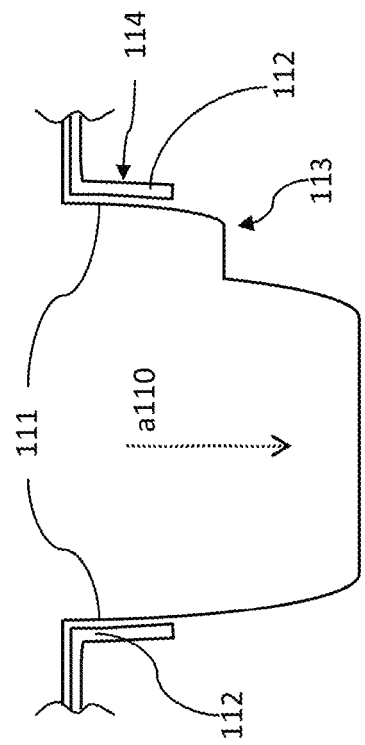
Figure 18A:
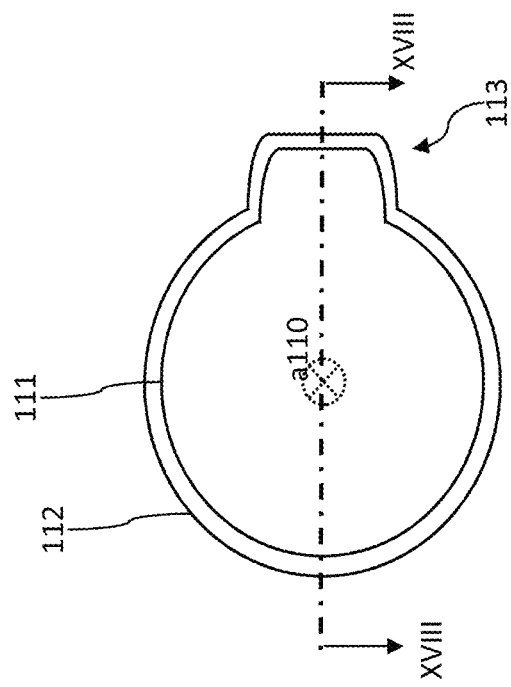
Figure 19A:
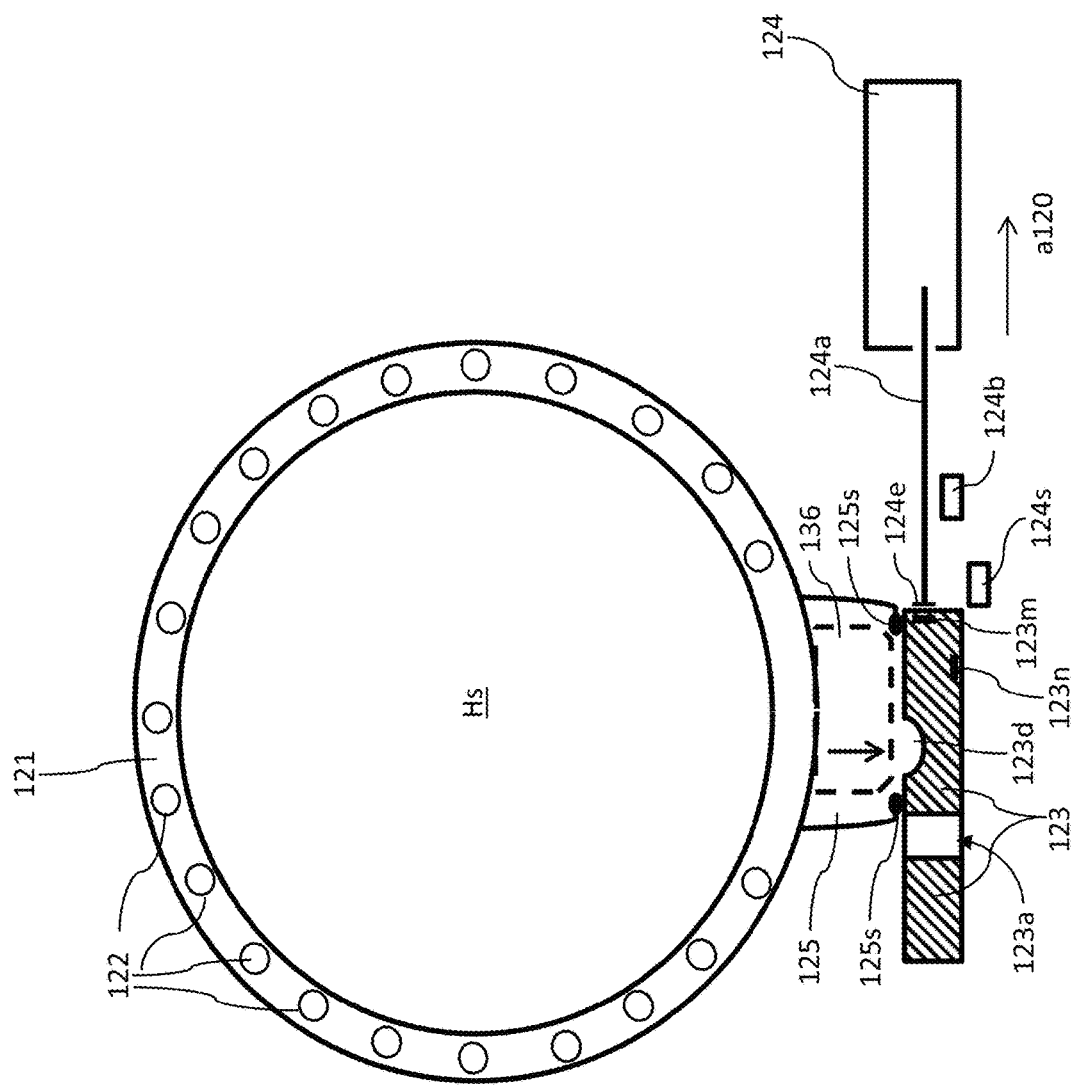
Figure 19B:
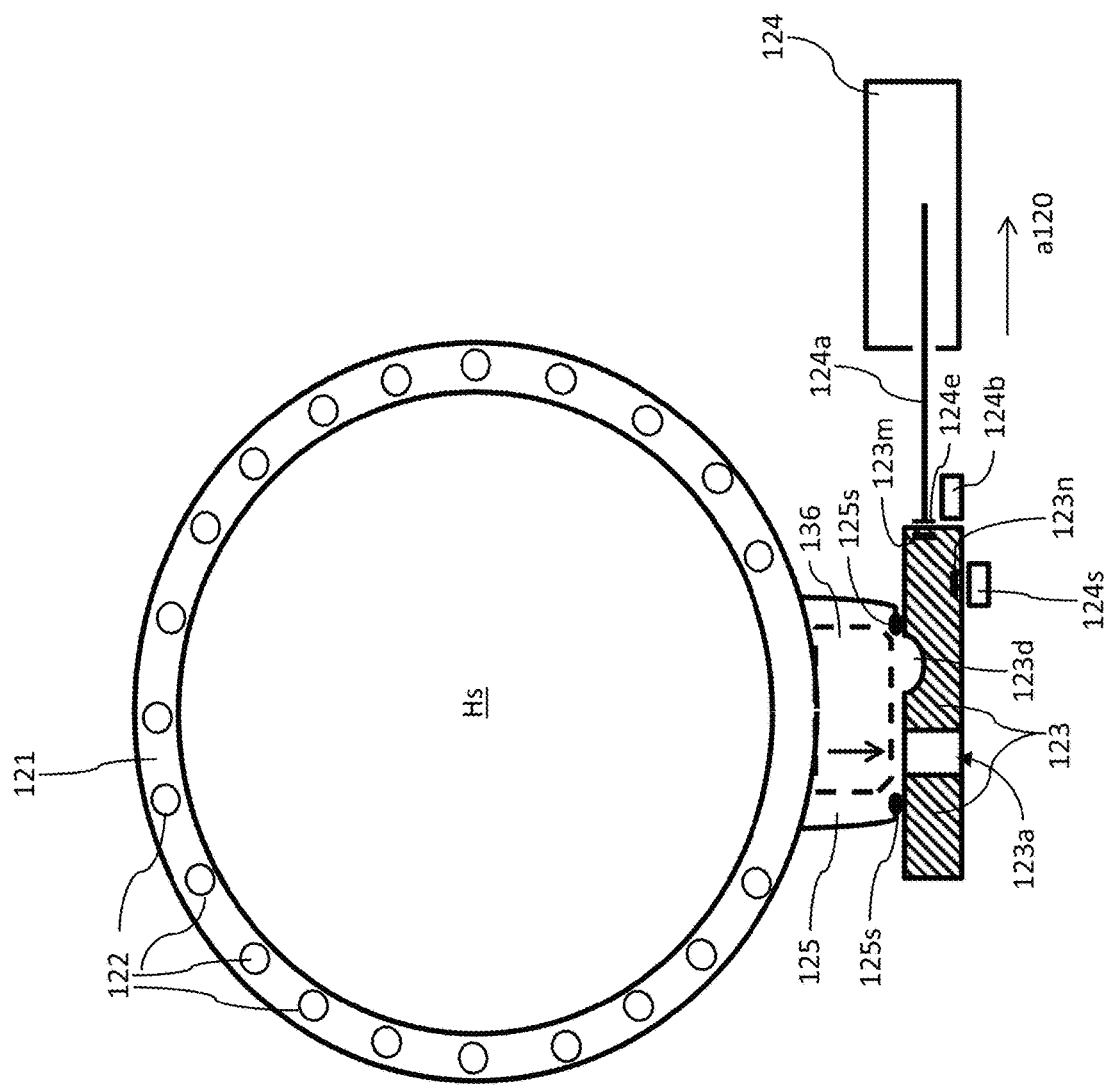
Figure 19C:
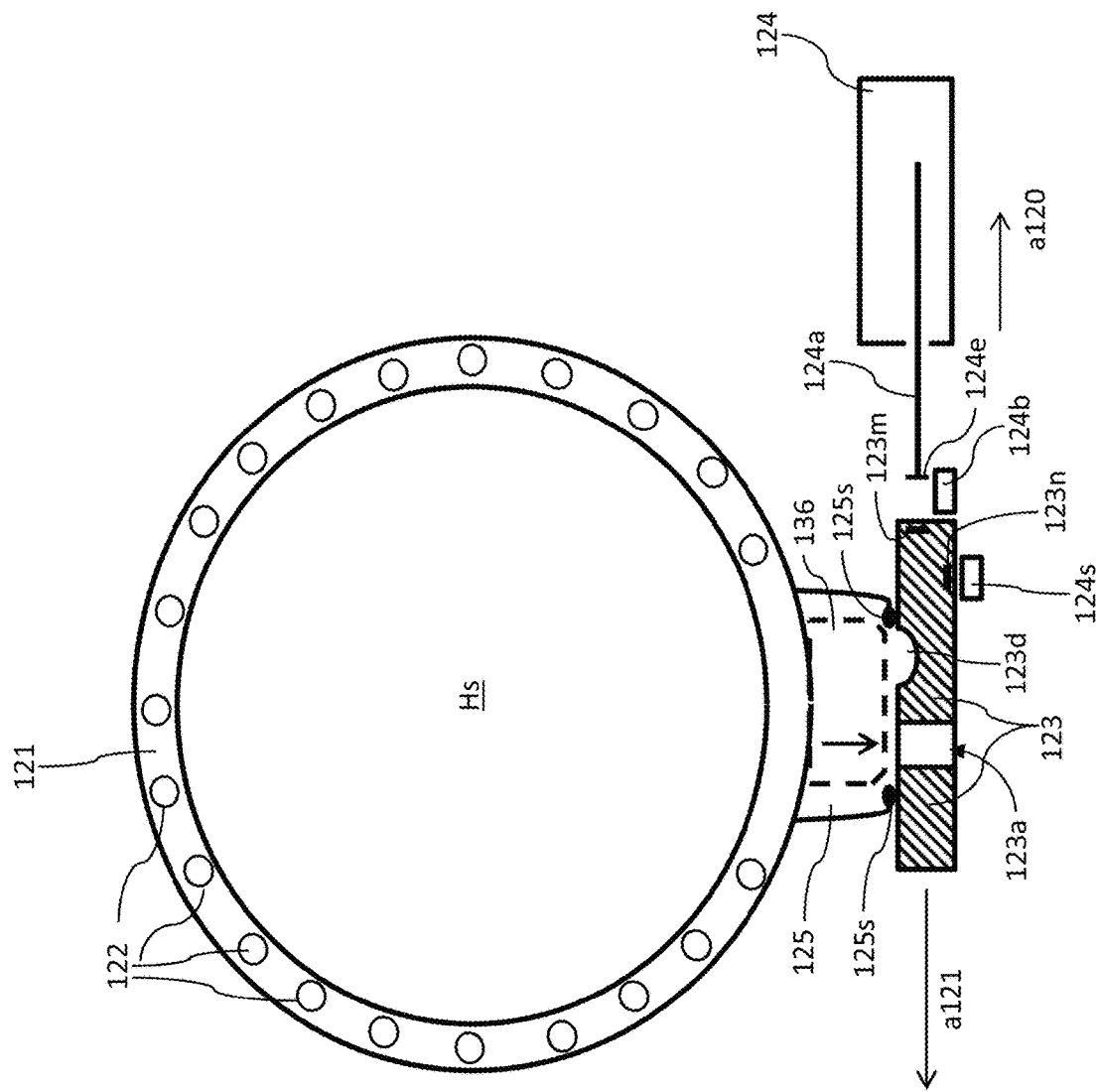
Figure 19D:
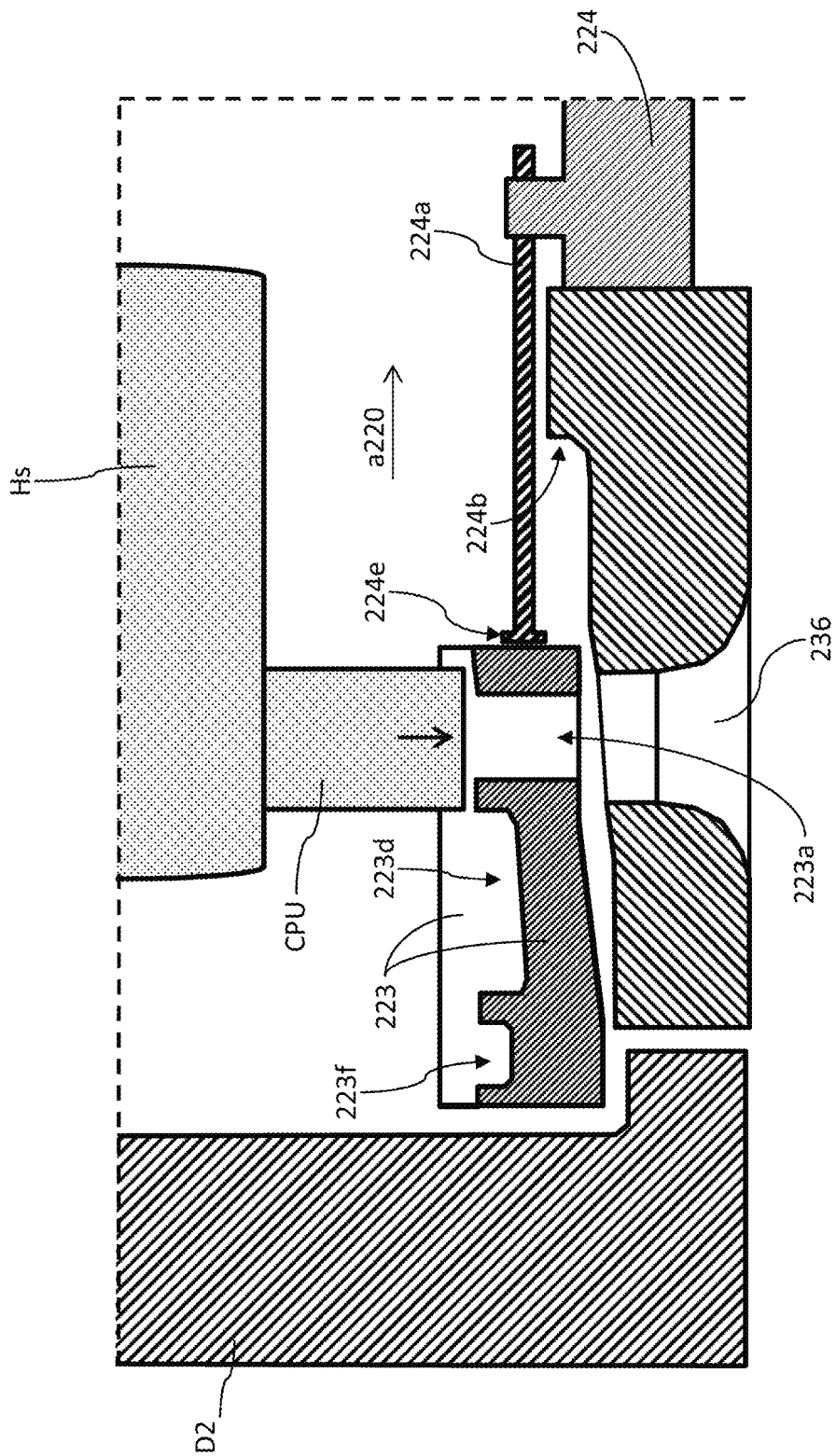
Figure 19E:
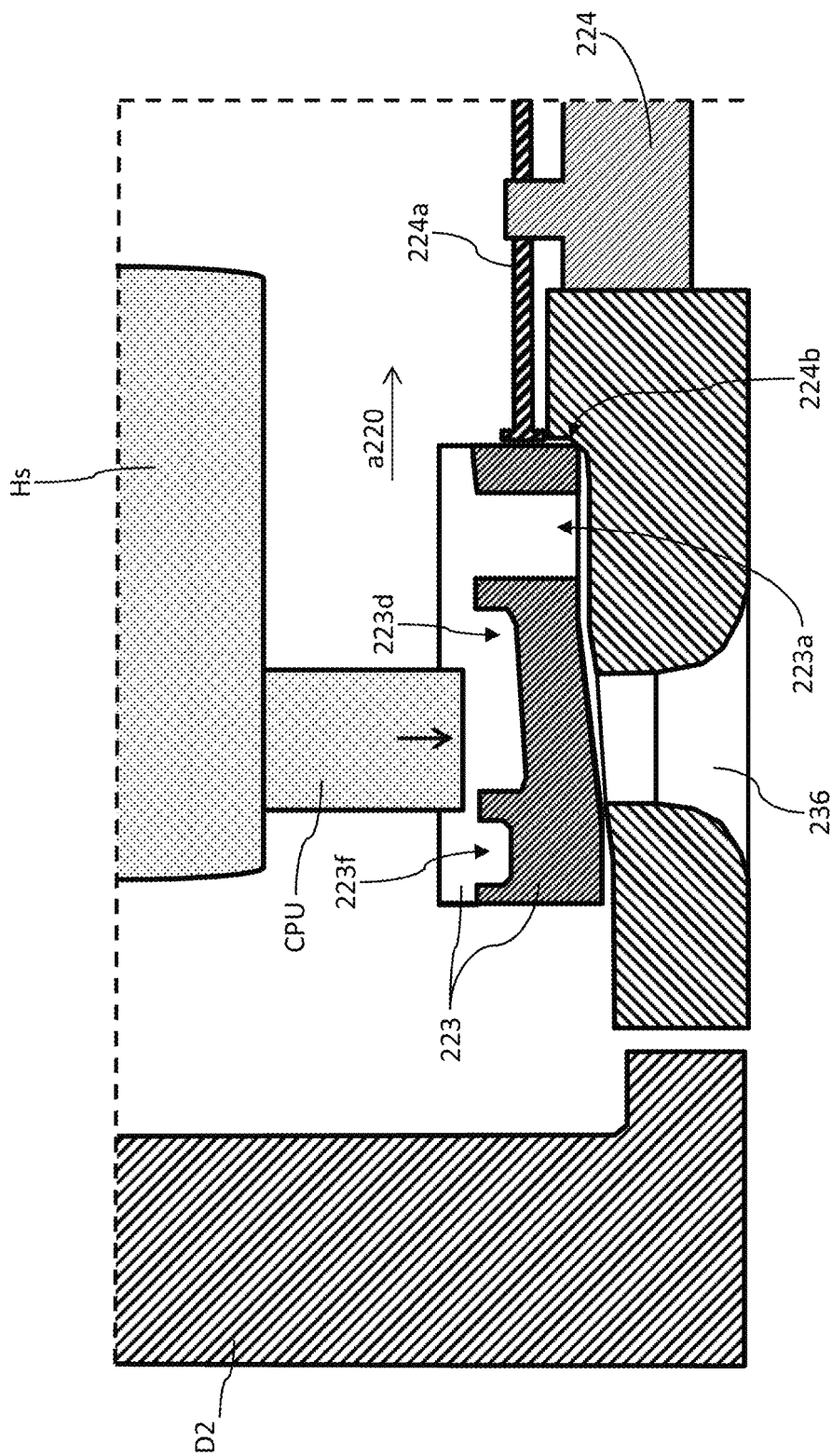
Figure 19F:
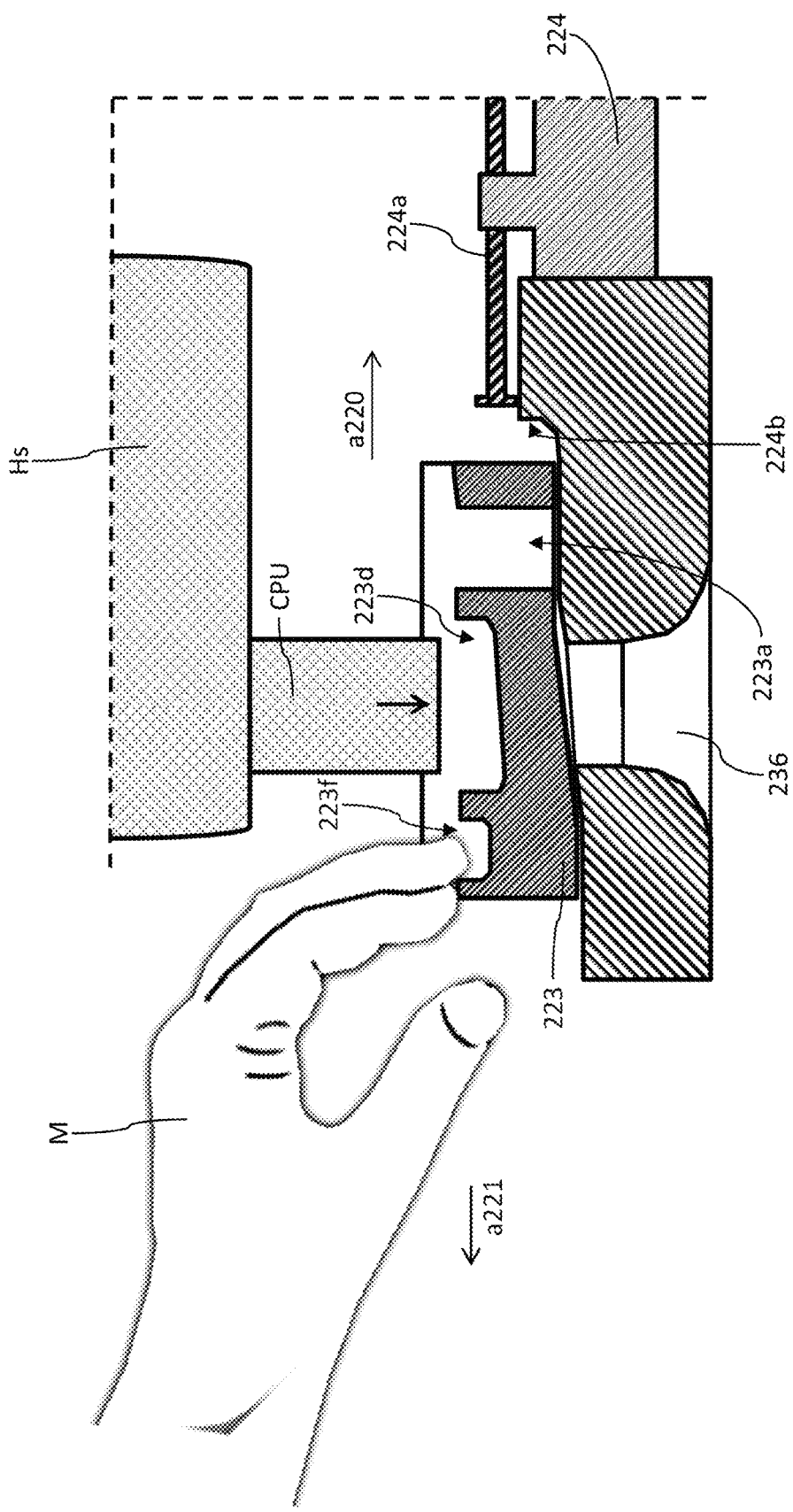
Figure 20A:
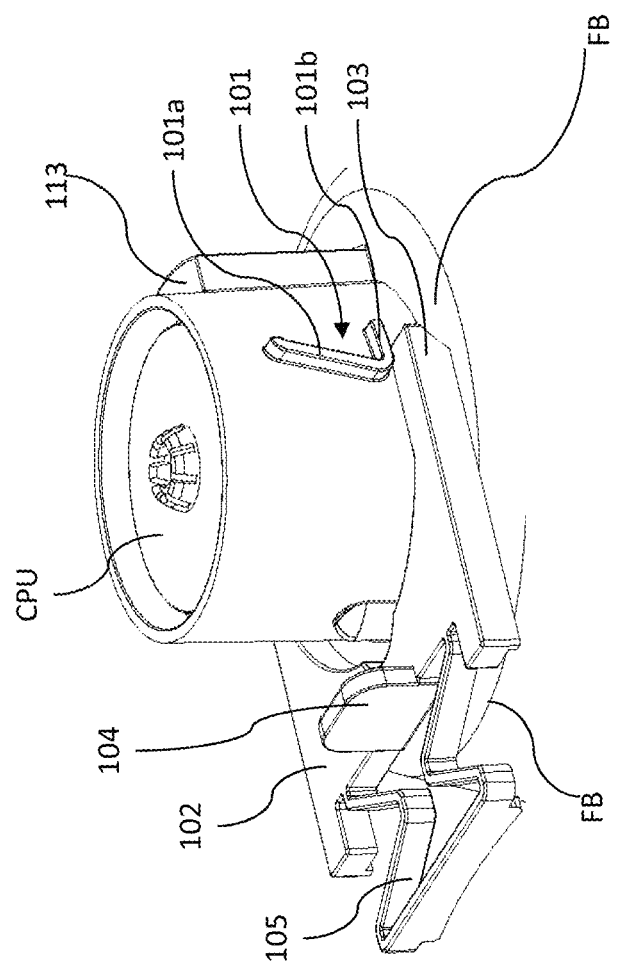
Figure 20B:
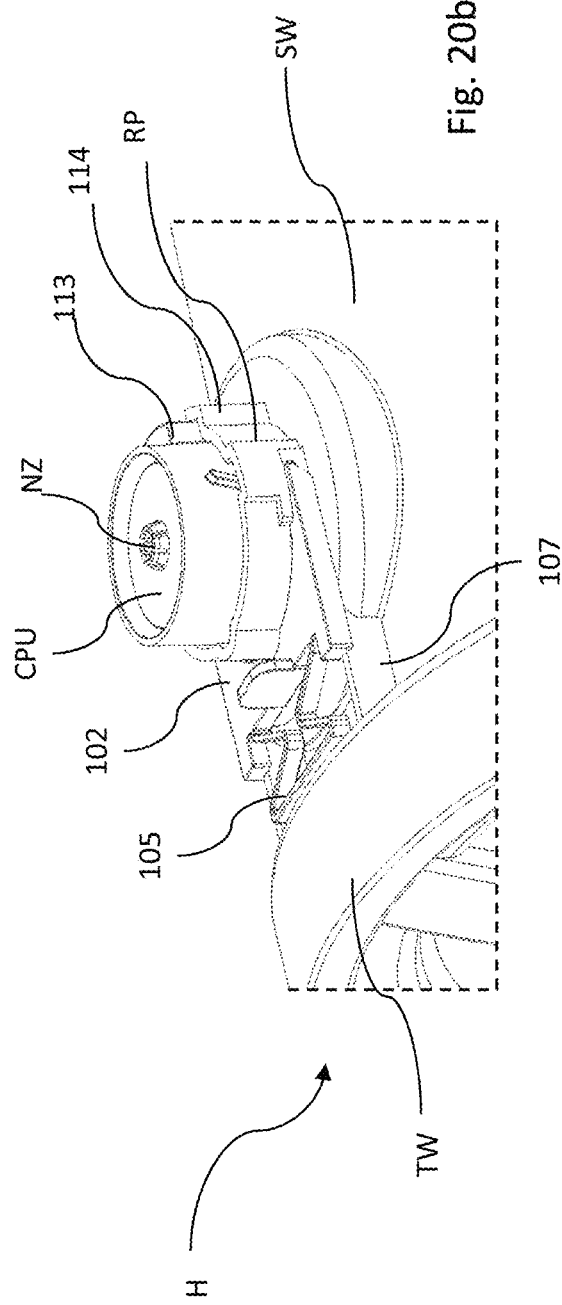
Figure 20C:
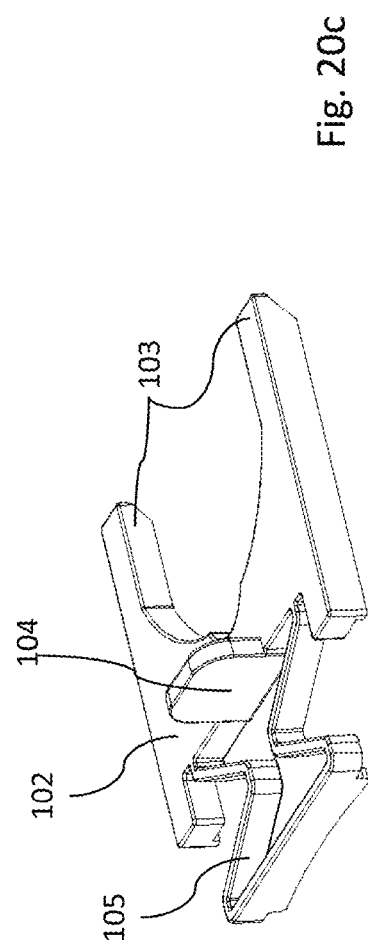

FIGS. 15a-b show perspective views of the CPU shown in FIG. 12, from two different viewing directions;

FIG. 15c shows a perspective view of a seal of the CPU of FIG. 12 in more detail;

FIGS. 16a-c each show a perspective view of product flow paths and fluid flow paths in the CPU;

FIG. 17 shows a schematic view of a system for pressurization of a product container and for fluid supply to the CPU;

FIG. 18a schematically shows a top-down cross-sectional view of a shape of a CPU and a corresponding mating shape of a CPU receiving port;

FIG. 18b shows a sideways cross-sectional view over line XVIII-XVIII FIG. 18a;

FIGS. 19a-c each show a cross section over line XIX-XIX of FIG. 3B, of a further embodiment of a container receiving space provided with a cooling channel and a movable closure member, wherein in the different figures the closure member and a respective actuator are shown in different positions;

FIGS. 19d-f each show a cross section over line XIX-XIX of FIG. 3B, of a further embodiment of a closure member and a respective actuator, wherein in the different figures the closure member and actuator are shown in different positions;

FIGS. 20a-c show perspective views of a CPU and a CPU holding latch; and

Figure 21:
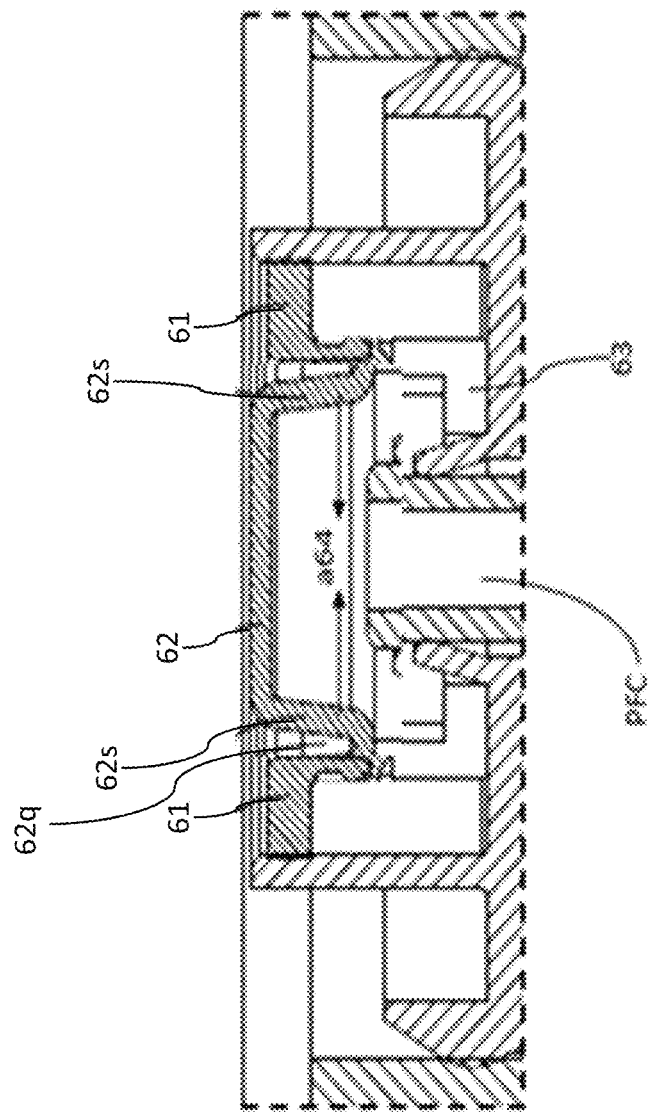

FIG. 21 shows a cross-sectional view of sealing means of a CPU according to an extra advantageous embodiment.

In the present application, corresponding or similar features are denoted by corresponding or similar reference signs.

FIGS. 1-21 show non-limiting examples of a system for dispensing a foamed product.

Figure 1:
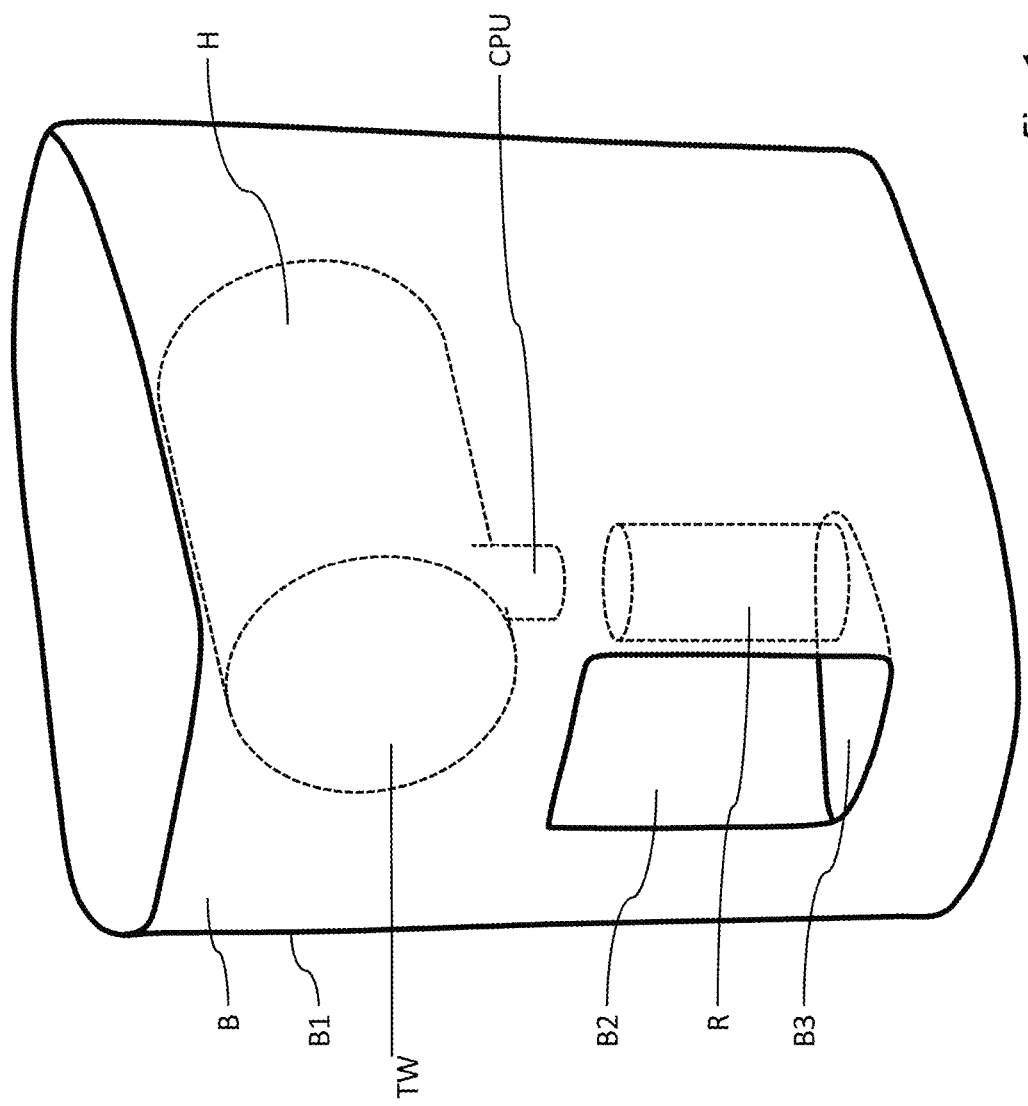

In an exemplary embodiment, as shown in FIG. 1, a foamed product dispensing system includes a product dispensing machine B comprising a housing B1. For example, the housing B1 (i.e. an external wall thereof) can include an opening B2, wherein the opening B2 provides access to a platform B3, wherein the opening B2 and platform B3 are configured for receiving a foamed product receiving receptacle R, e.g. a cup or a glass. Preferably, the opening/access is closable by a movable door D1 (depicted with a dashed line in FIG. 3B).

Figure 2:
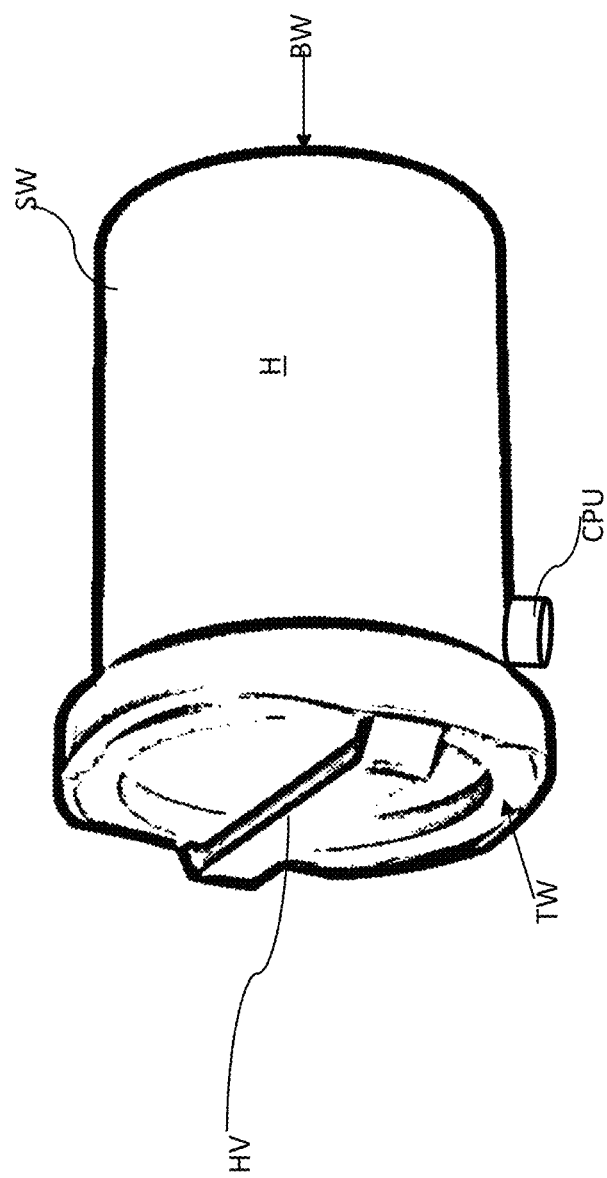
FIG. 2 shows a perspective view of a product container of the system of FIG. 1.

The exemplary system further includes an exchangeable product container H, provided with a product processing unit CPU (see FIG. 2). The CPU may be located on several positions. In the present advantageous example, the product processing unit CPU protrudes radially outwardly from the container. In particular, it extends through an outer wall of the holder H, in particular spaced-apart from a top wall TW and a bottom wall BW of the holder H. Moreover, as follows from the drawing, in this embodiment, the CPU is located near the top of the product container H.

The product container H can be a substantially cylinder-shaped or bucket-shaped capsule, for example having a rigid (e.g. metal or steel or rigid plastic) outer wall, being configured to be pressurized, e.g. to a pressure of at least 2 bar. A preferred length L of the capsule (measured between a top wall TW and bottom wall BW in the present example) is in the range of about 20 to 40 cm, wherein an external diameter X of the capsule (i.e. a diameter of a cylinder wall extending between the top and bottom) is in the range of about 10 to 30 cm. Also, it is preferred that the capsule H contains at least 4 liter or a least 4 kg product before initial use. A maximum weight of the capsule H (in an initial, filled condition) can be e.g. 20 kg or 25 kg. Alternatively, the capsule H contains less than 4 liter, for example less than 2 liter, for example about 1.5 liter, product.

Moreover, as follows from the drawing, it is preferred that the capsule/container H includes a gripping element, for example a handle HV, allowing a user to lift and hold the capsule with ease. In the example, the gripping element protrudes from a top wall TW of the container H, which top wall faces forwardly towards a front of the dispensing machine after placement of the container H in the machine.

As shown in FIG. 3A, the dispensing machine B preferably comprises a container receiving space Hs (e.g. defined by or located within a respective wall structure 121) for receiving the container H. The dispensing machine preferably includes a container guide G (shown with dashed lines) for guiding the container H into and out of a container receiving space Hs of the machine (along a placement direction, indicated by an arrow a71). Preferably, the container receiving space in the housing B1 of the machine can be sealed or closed off from an environment of the housing, in particular allowing improved temperature control of the product container after loading. For example, the housing B1, and/or the afore-mentioned wall structure 121, may include a movable cover D2, e.g. a door for controlling access to the container receiving space Hs.

As indicated by arrow a71, the container H is preferably horizontally removable from the container receiving space Hs, e.g. for exchanging an emptied container with a filled container. Said container guide G can assist an operator in stably moving the container H towards a final position into the machine, and in the removing of a used-up container.

The machine can be configured such that placement of the container H in the container receiving space Hs causes one or more connectors of the machine B to connect to respective connectors of the container H. For example, container placement can cause a pressurizing fluid output connector FO of the machine B to be automatically connected to a fluid input connector Hi of the container H (for pressurizing an interior of the container). As a further example, such placement can cause a fluid injector connector FIc of the machine B to be connected to a fluid injector socket FIs of a product processing unit CPU of the container H, as will be explained in more detail below.

A removing of a container H from the machine can cause the one or more connectors of the machine B to become disconnected from the respective connectors of the container H. The machine B and/or the container H may include means for securing the container H in the container receiving space Hs, in order to prevent accidental and/or unauthorized removal of the container H from the container receiving space Hs, as will be appreciated by the skilled person.

The container H, in particular a product holding space (interior space, reservoir) thereof, can be filled with various types of product.

The product comprises, in particular, a food, for instance, a product safe for human consumption. The product comprises, for instance, one or more of: milk, cream, spray cream, cappuccino milk, or a dessert (for instance, a mousse forming product) or juice. The product can comprise a milk product, for instance, cream. According to an alternative embodiment, the foamable product comprises, for instance, a conditioner and/or cosmetic, and/or a cleaner, and/or, for instance, a body care product, a hair treating agent, or the like.

According to an advantageous elaboration, the product P present in the container H is a homogeneously foamable product, and in particular a food product, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, juice, more particularly a milk product. The product P can be, for instance, cream. The product P can optionally contain, for instance, a propellant or blowing agent (for instance, in a condition at least partly dissolved in the product), in particular a propellant consisting of one or more of: air, $N_2$, $N_2O$ and/or $CO_2$. Such a propellant or blowing agent is, in particular, safe with regard to food technology. The propellant or blowing agent can hold the inner space 4, for instance, at a particular super-atmospheric prepressure. Preferably, the product P does not contain a blowing agent.

In FIG. 3B, an example of the container H is shown in more detail, containing a quantity of product P held in a flexible bag FB within the container H. During operation of the machine B, the container H is pressurized by the dispensing machine by a gas, e.g. air, being by the machine pumped through the fluid input Hi (as indicated by arrow a21), causing the interior of the container H to become pressurized at a super-atmospheric pressure. Consequently, pressure is exerted on the flexible product bag FB, as illustrated by arrows a22. The pressure, possibly in combination with gravity, causes the product P to flow (indicated by arrow a23) from the flexible bag FB into the downstream product processing unit CPU, that is, in case a valve or seal of the product processing unit CPU is brought to an operational state providing a product flow connection towards a respective product processing space (as will be explained below), discharging foamed product via a respective outlet (indicated by arrow a25). The flexible bag FB as such can have various configurations and shapes.

For example the bag can be made of one or more flexible layers of one or more plastic or plastic substances, and/or of one or more flexible layers of paper or paper substances, and/or one or more flexible layers of metal or metal substances (e.g. aluminium). The flexible bag can be entirely flexible but that is not required. It can e.g. include or more foldable bag sides that fold inwardly during product discharge. In particular, the flexible bag FB is configured to allow a bag volume decrease during discharging product from the bag FB.

In yet a further embodiment, the product processing unit CPU and the flexible bag FB are integrally joined with each other (into an assembly). For example, a top wall or top section of the product processing unit CPU can be made in one piece, or welded or glued to, the flexible bag, or joined to the bag FB in another manner. The assembly of the product processing unit CPU and bag FB are removably held by an outer part SW (shell) of the container H. For example referring to FIG. 2, the top wall TW of the container may be a removable cover, that can hermetically seal the interior of the container H (in a gastight manner) when the cover wall TW is in the depicted closed position (e.g. located on top of a side wall SW). The top wall TW can be removed from a remaining container part SW, allowing access to the flexible bag FB that is located in the container H. Then, preferably, the flexible bag FB and its processing unit CPU can be removed from the container (e.g. after use, e.g. when the bag is empty), to replaced with a fresh product containing flexible bag and respective processing unit CPU. After the new filled flexible bag FB and CPU have been properly position within the container shell, the top wall TW can be installed again for hermetically sealing the container again (allowing pressurization of the container interior and respective flexible bag FB). In this embodiment, in particular, the exterior SW of the container H can act as a bag positioning structure, for installing and holding a flexible bag (and its CPU) in a desired operation position within the machine B. The container shell (i.e. the outer wall SW of the container) itself can be made of a rigid material. A single container shell SW can be used to subsequently operate with a number of replaceable flexible bag-CPU assemblies. This also leads to advantages concerning transport and storage, since a relatively large number of flexible product container bags FB can be transported and/or stored in a relatively small transport resp. storage space (whereas transporting a large number of rigid outer container shells can require more space).

In one embodiment, a container H that includes a flexible bag FB (as in the above example), wherein the exterior walls TW, SW of the container H act as a bag pressurization chamber, is entirely removable from the machine B.

In an alternative embodiment, only the flexible bag-CPU-assembly are removable from the machine B, e.g. when the container H has been opened by removing the lid/cover wall TW, leaving an outer part SW of the container in the machine B during the exchange of the bag. In such an embodiment, the flexible bag-CPU-assembly as such can be called the "exchangeable product container", to be placed in a pressurization chamber of the machine B. In yet another embodiment of the invention, the product container as such can have a fully or at least partly flexible outer wall, the product container being placed in a dedicated pressurization chamber of the machine B during operation.

FIG. 3B further shows the machine B to include an optional air dryer AD for supplying dried air, e.g. dried ambient air.

The air dryer AD may be embedded in or forming part of a cooling system CS of the machine B, for example a cooling system CS configured to cool the product container H as well. During operation, the dried air is preferably received from the air dryer AD by a fluid injector FI, which is configured to supply the dried air into the product processing unit CPU via a fluid injector connector FIc (indicated by arrow a24).

According to a highly advantageous embodiment, the fluid injector connector FIc preferably is integrated with or forms part of a valve actuator VA (see FIG. 3B) of the dispensing machine. The valve actuator VA is configured to actuate a valve member 50 (see FIGS. 7-10) of the product processing unit CPU through actuation, e.g. rotary actuation, of the fluid injector connector FIc. A respective valve actuator can be configured in various ways and may include a servo motor, electromotor, electromagnetic actuator or other drive means.

With further reference to FIG. 3B (see also FIG. 10), the product processing unit CPU is configured to mix the product P with the dried air as they are being supplied to the product processing unit CPU, resulting in a foamed product being discharged from the product processing unit CPU, as indicated by arrow a25. A product discharge channel of the CPU can terminate e.g. via a product shaping nozzle NZ, e.g. having an array of product-shaping teeth or the-like (known a such). During use, a receptacle R, e.g. a glass or cup, may be exchangeably placed near, e.g. under, the product processing unit CPU—onto the respective platform B3—for receiving the discharged foamed product.

The machine H may be provided with a control unit CU being configured for controlling fluid flow and product flow to the processing unit CPU, for example by controlling activation and deactivation of fluid flow means (e.g. a pump, servo, motor etc.). Further, the control unit CU can be configured for controlling a position of the CPU valve member 50 through the respective valve actuator VA. Preferably, in case of initiating a product discharge, the control unit is configured to start fluid flow before product flow. The control unit is preferably at least partly user operable via a user interface or operating device (not shown) of the machine B, e.g. via a touch display, control knob, switch or the-like.

Figure 3C:
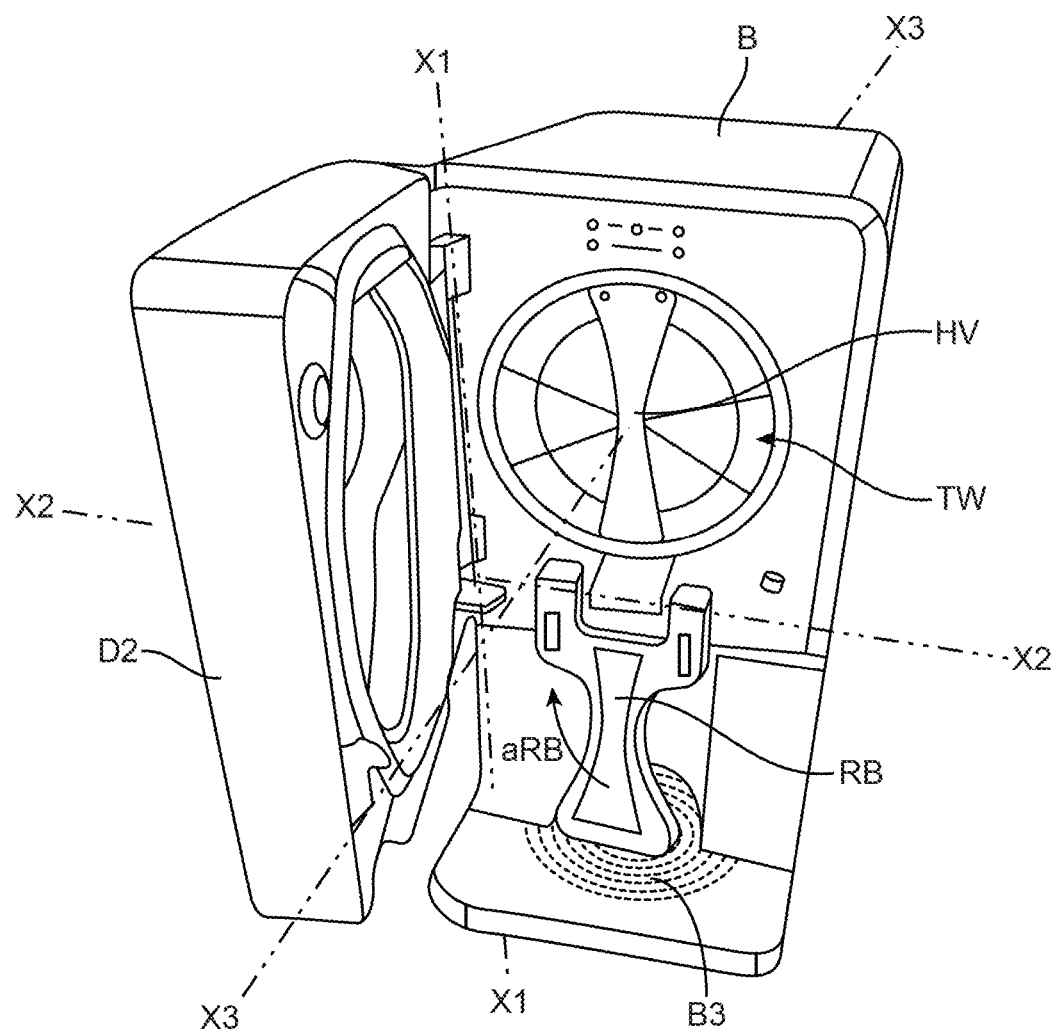
FIG. 3C shows a perspective view of an exemplary foamed product dispensing system according to an embodiment.
Figure 5:
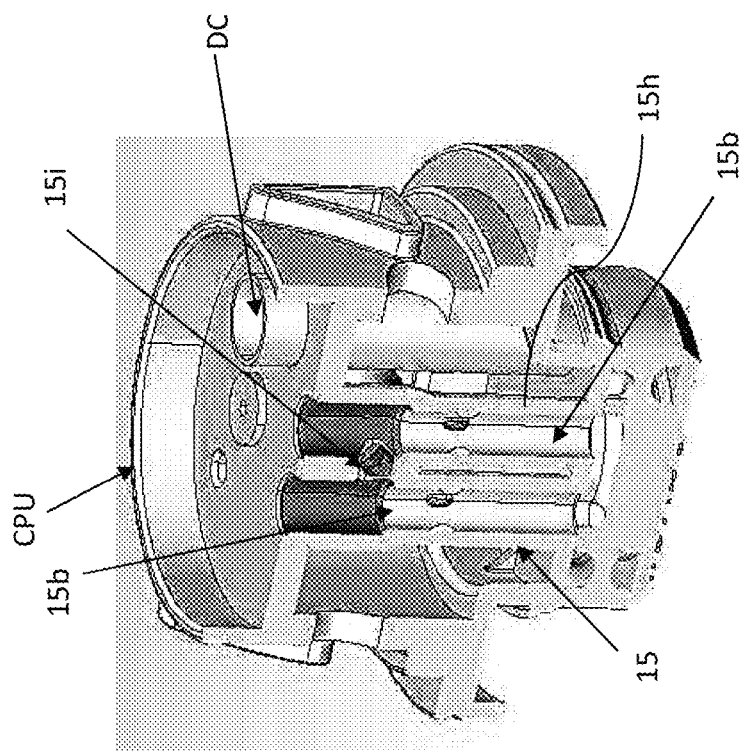
FIG. 5 shows a perspective view of first vertical cross-section of the CPU shown in FIG. 4, taken along centre lines of the two foaming chambers.
Figure 4:
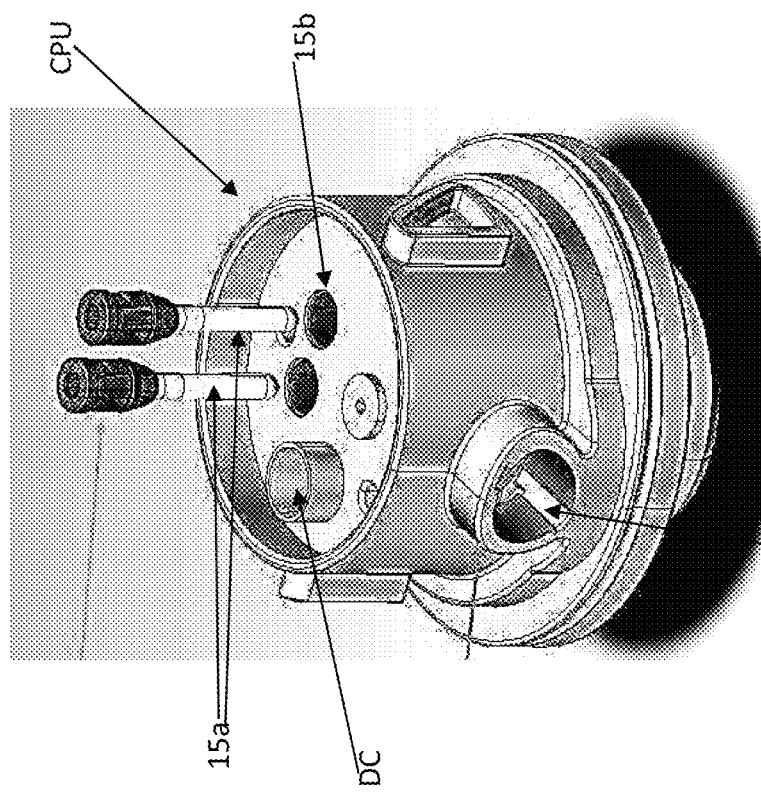
FIG. 4 shows a partly opened perspective upside-down view of the CPU of the product container of the system of FIGS. 1-3, wherein the microfiltration elements are shown exploded from two respective foaming chambers.

FIG. 3C shows a perspective view of an exemplary foamed product dispensing system according to an embodiment which may be combined with one or more of the other embodiments. In FIG. 3C, a product dispensing machine B is shown wherein the housing B1 is provided with a door D2, e.g. a front door, which is rotatable about an axis X1 between an opened position (shown) and a closed position, wherein in the closed position the door D2 may substantially form a front part of the dispensing machine B. The door D2 may e.g. provide elements of a user interface of the machine B. In FIG. 3C, the door D2 is shown in an opened position, exposing a top wall TW of an exchangeable capsule SW (see FIG. 2), which top wall TW comprises a handle HW for handling the top wall TW and/or the capsule SW. Such a capsule SW is preferably configured to exchangeably receive the product container FB therein and to be pressurized by the machine B for thus pressurizing an inserted product container FB.

The top wall TW (e.g. a lid) and/or the capsule SW is preferably provided with a plurality of (e.g. six) closing members, e.g. respective closing members, e.g. bayonet closing members. In this way a user may be enabled to open and close the top wall TW with respect to the capsule SW, in particular close such that a substantially pressure tight seal is formed between the top wall TW and the capsule SW. For example, to close the top wall TW, the user may thus rotate the top wall TW with respect to the capsule, substantially about the axis X3, e.g. by about 15 degrees, thereby engaging said mutual closing members with respect to each other.

The product dispensing machine B is preferably configured to enable a pressurization of the capsule SW depending on a position and/or orientation of the capsule SW relative to the machine B. The machine B preferably prevents that the capsule SW is pressurized while having an undesired, e.g. unsafe, position and/or orientation relative to the machine B.

Such an unsafe position and/or orientation of the capsule SW, e.g. of the top wall TW, may for example result from an incomplete rotation of by a user of the top wall TW with respect to the capsule SW, e.g. incomplete with respect to a target rotation of 15 degrees as explained above.

In the embodiment shown in FIG. 3C, this position and/or orientation dependent enabling of pressurization is realized by a combination features explained hereafter, while it will be appreciated that alternative embodiments may lack one or more of those features.

FIG. 3C shows the machine B as comprising a retaining member RB which is movable from a releasing position (shown in FIG. 3C) to a retaining position (not shown), in particular by rotating the retaining member RB about axis X2 in the direction of arrow aRB. In the retaining position, the retaining member may be substantially aligned with the handle HV of (the top wall TW of) the capsule SW. FIG. 3C shows the capsule SW and its top wall TW in a correct, desired operational position. In the system shown in FIG. 3C, a different, i.e. incorrect, placement (e.g. position and/or orientation) of the capsule SW, in particular the handle HV, would result in the retaining member RB being blocked (in particular by the handle HV) from entering, at least fully entering, its retaining position. For example, when compared to the position and orientation shown in FIG. 3C, the capsule SW (including handle HV) would be translated along and/or rotated about the axis X3, thus into an undesired position and/or orientation, this would result in an at least partial blocking of the retaining member RB as described. It will be appreciated that in this scenario, with continuing reference to FIG. 3C, the capsule SW may be translatable out of the machine B along axis X3 but not further into the machine B, e.g. due to a corresponding configuration, e.g. dimensioning, of the machine B.

While FIG. 3C shows the retaining member RB substantially in the form of a retaining bar RB, it will be appreciated that many alternative shapes are possible. As one such an alternative (not shown), the retaining member RB may be formed as or as part of a door, e.g. a front door similar to the door D2.

As can be seen in FIG. 3C, when the retaining member RB is not in the retaining position, e.g. when it is in the releasing position, the retaining member RB may substantially block the door D2 from moving to its closed position. The machine B is preferably configured to detect when the door D2 is in the closed position and to enable a pressurization of the capsule SW only when the door D2 is detected as being in the closed position. In this way, for example, the machine B can be configured to enable a pressurization of the capsule SW depending on a position and/or orientation, in particular a desired and/or safe position and orientation, relative to the machine B.

Thus, with reference to FIG. 3C, starting e.g. from an operational state of the system, the following steps may be carried out for exchanging the capsule SW while helping to prevent unsafe pressurization of the capsule by the machine B: a user opens the door D2 (rotating the door D2 about axis X1) to expose the retaining member RB; the user moves the retaining member RB from its retaining position to a releasing position (about axis X2, in opposite direction compared to arrow aRB in FIG. 3C); using the thus exposed handle HV, the user translates (and possibly rotates) the capsule SW with respect to the machine B, in particular along (and possibly about) axis X3; using the handle HV, the user opens the capsule SW to enable exchanging of a product container FB (e.g. replacing an empty container by a full container), whereafter the capsule SW is closed again; the user replaces the capsule SW in the machine B; the user moves the retaining member RB back to its retaining position; the user closes the door D2; the machine B detects that the door is closed; and the machine starts to pressurize the capsule SW in response to the detecting. It will be appreciated that the machine B may advantageously be configured to perform further checks prior starting pressurization, so that pressurization may not always necessarily start (merely, directly) in response to said detecting. For example, the machine B may be configured to check if a measured cleaning time interval of a closure member 123. As another example, the start of pressurization may be (additionally) conditioned on a detection that a current pressure at the capsule SW is below a respective target pressure.

It will be clear from the above that thus in the alternative case of an incorrect placement of the capsule SW, the door D2 would not be closeable so that the machine would subsequently not attempt to pressurize the capsule SW.

It will be appreciated that in some embodiments, for example, only the top wall TW of the capsule SW may be removable from (or at least openable with respect to) the machine B, whereas other parts of the capsule SW may be substantially fixed in the machine B.

Figure 8:
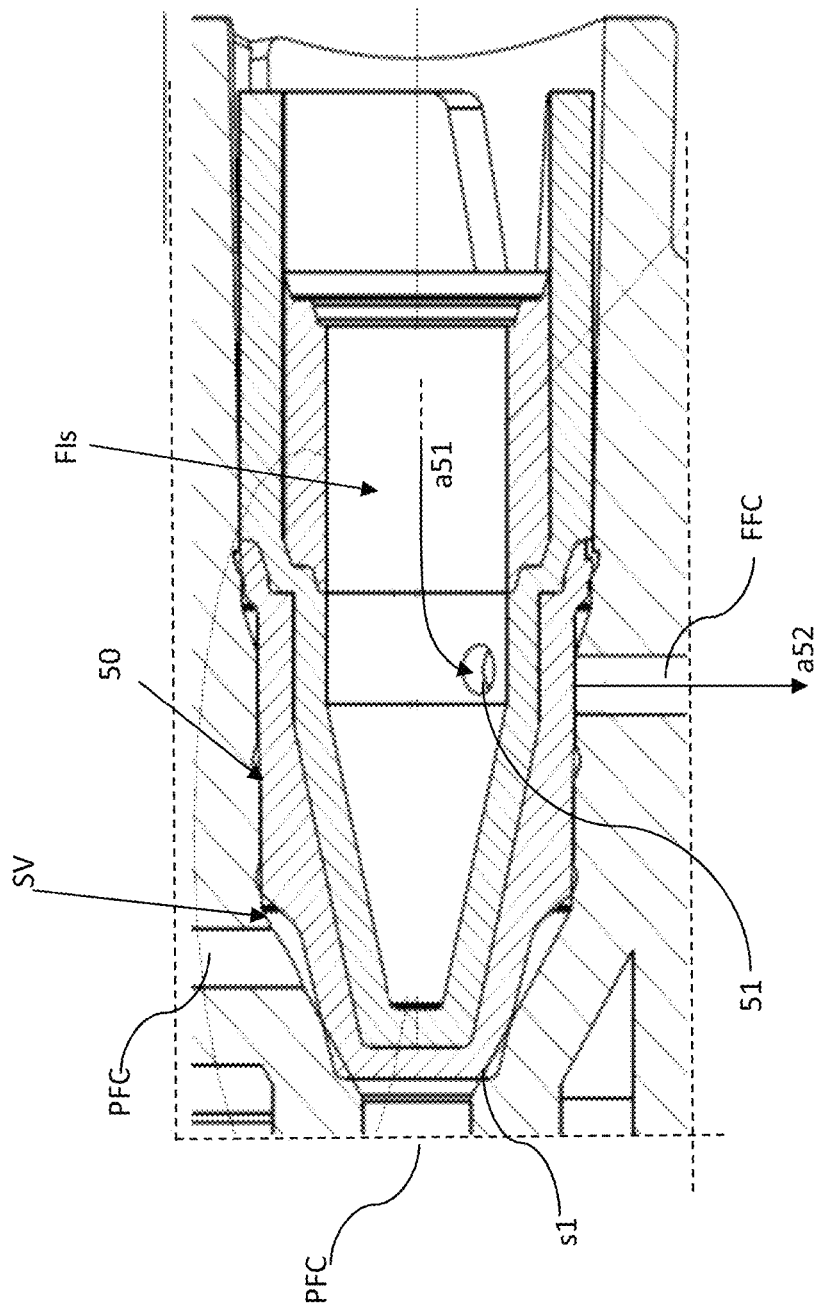
FIG. 8 shows a longitudinal cross-section of the valve section of the CPU of the embodiment of FIGS. 1-7, wherein the valve is in a closed state.
Figure 9:
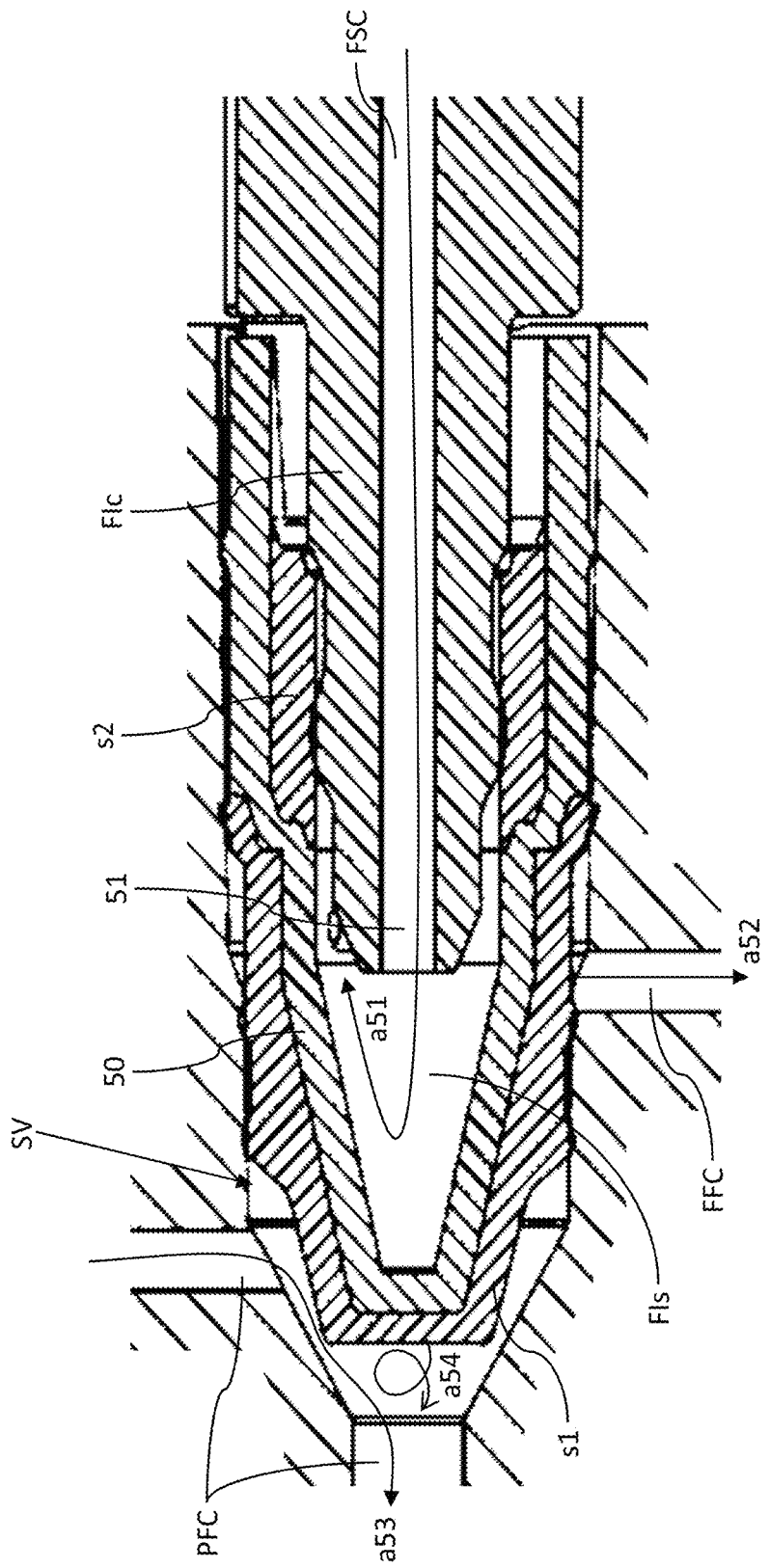
FIG. 9 shows a similar cross-section as FIG. 8 wherein the product dispensing machine has moved the valve to an opened state.
Figure 10:
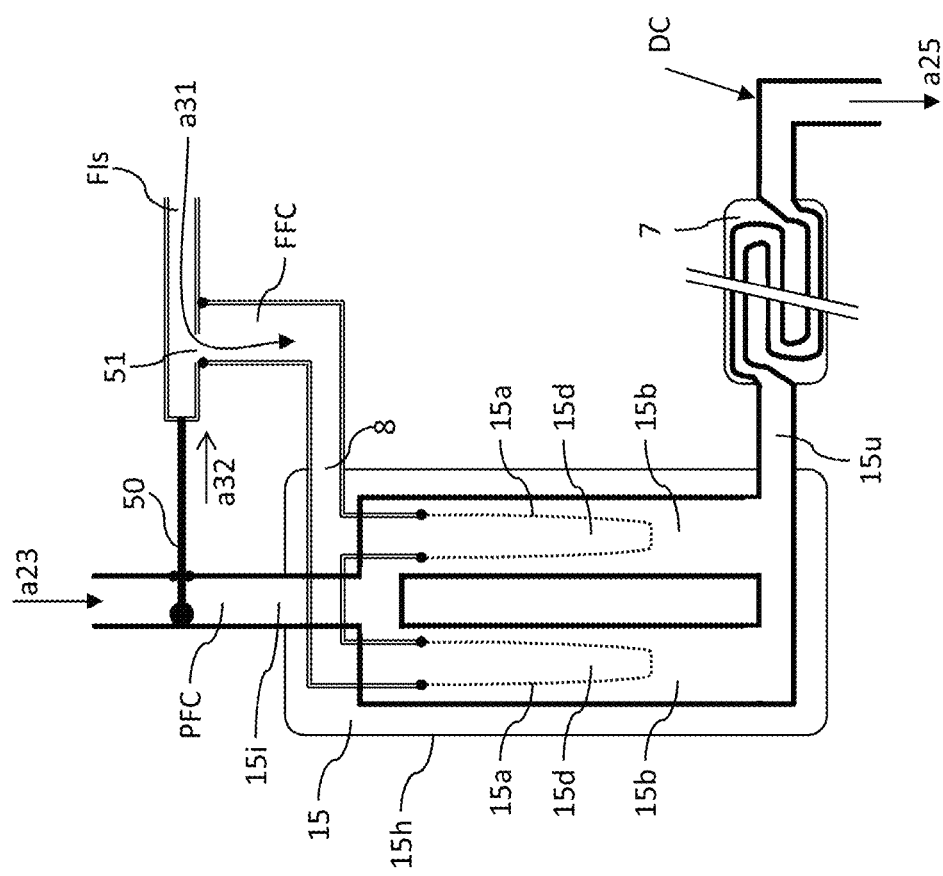
FIG. 10 shows a diagram of flow paths of the system of FIGS. 1-9.

FIGS. 4-9 depict the product processing unit CPU of the system, in more detail (see also FIGS. 12-14a, 14b). The CPU is part of the afore-mentioned product container H, and is connected to the interior of the flexible bag for receiving product there-from (as in FIG. 3B). FIG. 10 shows the CPU in a more schematic way, indicating product and fluid (gas) flows during product discharge as well.

The unit CPU is configured to receive a flow of product P into a product feedthrough channel PFC as indicated by arrow a23. The product feedthrough channel PFC is preferably closeable by a valve member 50: FIG. 8 shows the valve member 50 in a closed state, blocking flow through the product feedthrough channel PFC. The opened position of the optional valve member 50 is shown in FIG. 9. The valve member 50 is not depicted in FIGS. 4-7.

The processing unit CPU is further configured to receive fluid, e.g. dried air, into a fluid feedthrough channel FFC, e.g. from a fluid injector FI through a fluid injector connector FIc. Advantageously, the valve member 50 includes a fluid injector socket FIs for connecting to a fluid injector connector FIc, and a fluid passage 51 for providing fluid communication between the fluid injector socket FIs and the fluid feedthrough channel FFC (as indicated by arrow a31). In the example, the fluid passage 51 is a bore or through-hole, extending laterally through the valve member 50 (one or more such fluid passages 51 may be provided if desired).

FIGS. 4-7 shows the product processing unit CPU (in a perspective, partly opened upside-down view) comprising a frothing device 15, for example a microfiltration device 15. A housing 15h of the microfiltration device 15 can be an integral part of the CPU, and it can comprise a product entrance 15i connected to the product feedthrough channel PFC, downstream of the valve member 50, and a gas inlet 8 connected to the fluid feedthrough channel FFC, downstream of the fluid passage 51. The microfiltration device 15 further comprises at least one filtration wall 15a (two, in this example) having gas transmissive pores, for instance, a tubular wall, which separates a respective gas supply space 15d associated with the gas inlet 8 from a foaming channel 15b. Preferably, the length, measured in a product flow direction, of the foaming channel 15b is approximately 2 or 3 cm. Preferably, the gas transmissive pores of the filtration wall 15a have a pore size of between 0.2 and 1.5 microns.

It has been observed that good results can be achieved e.g. with a pore size of about 0.2 microns. According to an embodiment, the sizes of individual pores may vary within a certain range, for example from below 0.1 microns to above 20 microns. Alternatively or additionally, pore sizes in the range of 5 microns to 10 microns can provide good foaming properties.

In some embodiments, but not necessarily in all embodiments, good results have been achieved in case the microfiltration wall, in particular a product facing side of the microfiltration wall, includes a hydrophobic and/or oleophobic material, e.g. PTFE and/or hexafluoropropylene, to prevent or reduce clogging of the microfiltration wall by product entering or adhering to the pores.

In the present drawings, the microfiltration device 15 comprises two tubular filtration walls 15a, each providing respective gas supply spaces 15d and foaming channels 15b in the housing 15h. The tubular filtration walls 15a are shown exploded from the housing in FIG. 4, and are not depicted in FIG. 5. Each of the tubular filtration walls 15a preferably has a proximal gas inlet (connected to the fluid feed-through channel) and has preferably been closed off at a distal end, as in this example. It follows that the CPU is designed such that said fluid feed-through channel FFC terminates into each of the tubular filtration elements 15a (as in FIG. 10), to feed the interiors 15d of the tubes 15a with gas (e.g. dry air), to be mixed into the product. The number and dimensions of filtration walls 15a, gas supply spaces 15d and foaming channels 15b may be implemented according to general knowledge depending on material properties, required flow rates and/or other variables.

In a preferred embodiment, the system includes a choked gas supply (e.g. at and/or upstream of the fluid injector FI) for supplying gas at a substantially constant flow rate to the processing unit CPU during operation. In particular, as will be explained below (see FIG. 17), the choked gas supply can include a flow constriction 89, wherein a relatively high gas pressure is applied upstream of the flow constriction (e.g. a pressure higher than 5 bar), the configuration being such that a constant gas flow rate (in particular mass flow) can be obtained downstream of the flow constriction. In particular, during operation, a resulting choked flow exit velocity of the gas at the constriction 89 can be at or near sonic conditions, i.e., at or near a Mach number of 1. By application of a choked gas supply, clogging of components of the downstream frothing device (e.g. of said microfiltration device) can be prevented or reduced, and even if such clogging would occur, negative effects of such clogging can be efficiently suppressed. For example, the choked gas supply may be configured to produce a resulting gas pressure in the frothing device in the range of 1.5 to 4.9 bar, preferably in the range of 2.7 to 3.8 bar. During a certain operational period (in particular a period of foaming and discharge a relatively large amount of the product), the resulting gas pressure in the frothing device may gradually increase within a said pressure range, e.g. depending on an increased resistance due to filtration wall clogging.

Figure 6:
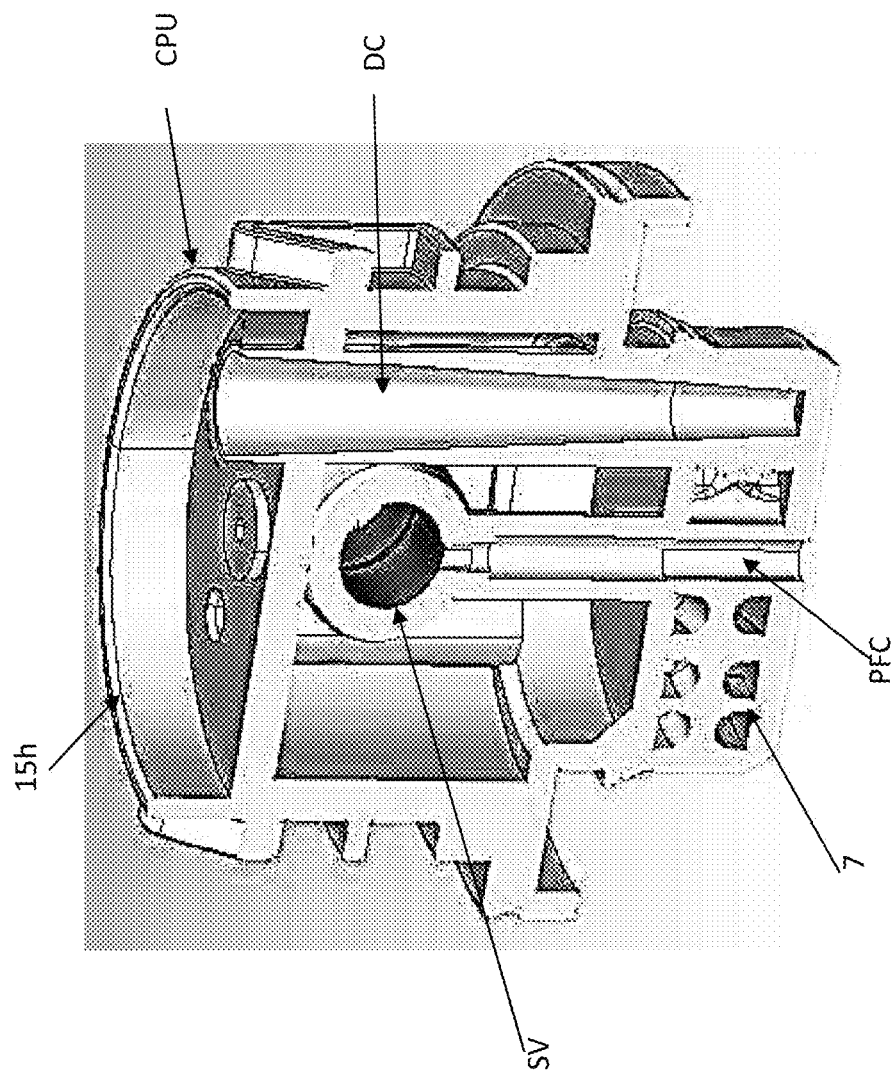
FIG. 6 shows a perspective view of a second vertical cross-section of the CPU shown in FIG. 4, taken in parallel to the cross-section of FIG. 5, along the product outflow channel.
Figure 7:
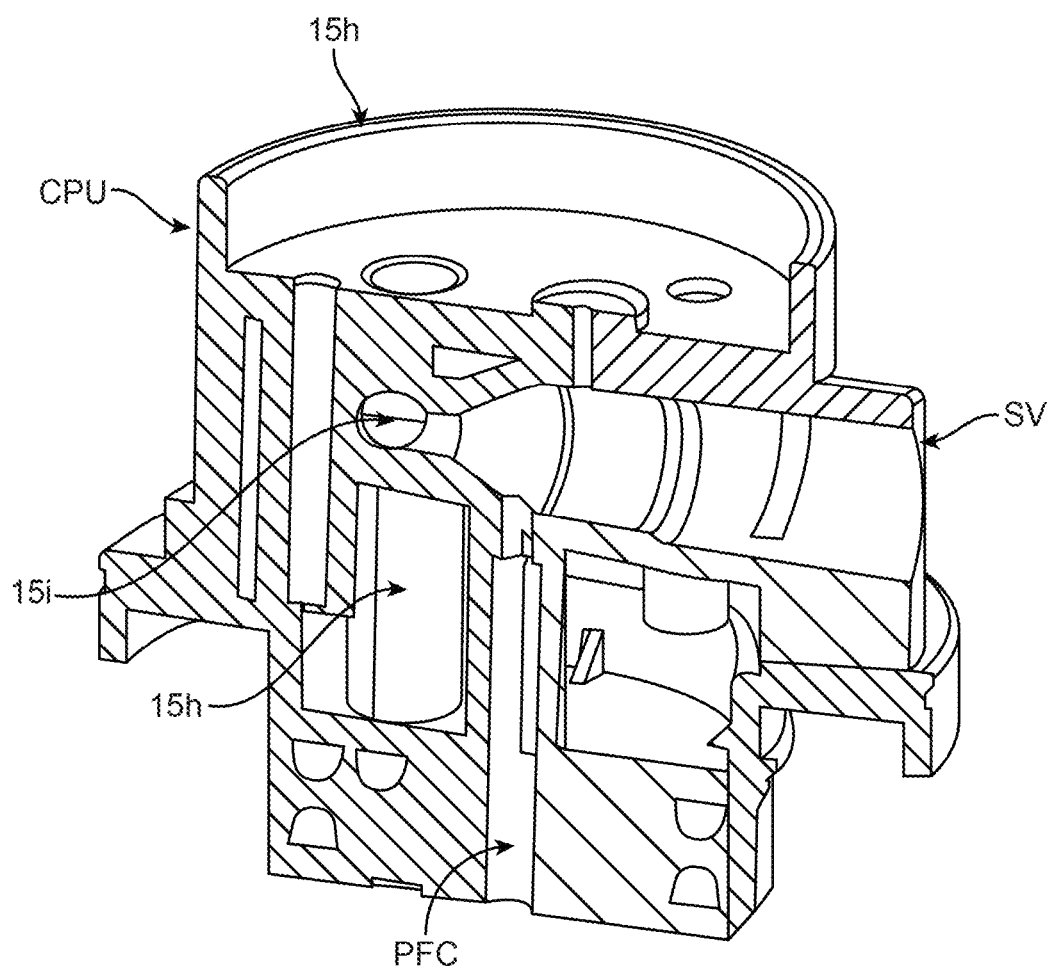
FIG. 7 shows a perspective view of a third vertical cross-section of the CPU shown in FIG. 4, taken at right angles to the cross-sections of FIGS. 5 and 6, coinciding with the central axis of the valve.

FIGS. 6, 7, 10 further shows the product processing unit CPU comprising a processing device 7, arranged downstream of the microfiltration device 15, for performing a mixing treatment and/or pressure reduction treatment of the product provided with gas. The processing device 7 is preferably configured to cause a controlled pressure reduction, to a pressure that is close to or is atmospheric pressure. Preferably, the processing device 7 comprises a labyrinth type fluid path being long, e.g. approximately at least 20 cm or at least 30 cm, and/or narrow and/or curved, at least compared to other fluid paths of the processing unit CPU, e.g. compared to the at least one foaming channel 15b. Downstream of the processing device 7, the processing unit CPU includes a discharge channel/opening DC for discharging the product provided with gas, for example along the direction of arrow a25, via a nozzle NZ.

The present CPU includes a socket/seat SV for receiving the valve member 50, whereas the valve member 50 itself includes a socket FIs for receiving the fluid injector/actuator member FLc (see FIG. 8-9).

FIG. 8 shows that the present valve member 50 of the CPU includes a fluid passage 51 and a fluid injector socket FIs. As follows from the drawings, the fluid passage 51 of the valve member 50 coincides with (and in a preferred example, is in parallel with) an axis of rotation of the valve member 50.

The valve member 50 may be held into this closed state by the fluid injector connector FIc (shown in FIG. 9) of the machine. In this state, flow through the product feedthrough channel PFC is blocked by the valve member 50. In particular, a sealing element s1 of the valve member 50 is configured to provide a sealed closure between the valve member 50 and its valve seat (e.g. providing walls of the product feedthrough channel PFC). In the present embodiment, the same sealing element s1 is also configured to provide a sealed closure between the product feedthrough channel PFC and the nearby fluid feedthrough channel FFC (and remains providing such a seal when the valve member has been moved to the opened valve state, see FIG. 9). It will be appreciated that separate sealing elements may be used instead of a single combined sealing element s1. Further advantageous elaborations regarding sealing element s1 are provided elsewhere in this description, see e.g. FIGS. 8a-f.

Preferably, the fluid feedthrough channel FFC is already open for feedthrough of fluid (e.g. dry air), injected by the fluid injector FIc, when the valve member 50 is still in its closed position. This allows for starting fluid flow prior to product flow. This is indicated by arrow a52 in FIG. 8.

In FIG. 9, the fluid injector connector FIc of the machine, having a fluid supply channel FSC, is shown as being received in the fluid injector socket FIs of the valve member 50. Also, the fluid injector connector FIc has engaged the valve member and has moved the valve member 50 from its valve seat towards the opened valve state. In particular, this movement can involve both rotation and translation of the valve member (e.g. a helical movement, a twisting of the valve member). It should be noted, that the fluid injector connector FIc is preferably also in engagement with the valve member in the initial state when holding the valve member in the closed position (of FIG. 8).

Once the valve member 51 has moved to its opened state, the product feedthrough channel PFC is opened for allowing product flow (from the container bag) towards the microfiltration device of the CPU, as indicated by arrow a53.

Preferably, a further sealing element s2 is present, to provide a gastight sealed closure between the fluid injector socket FIs (particularly the fluid passage 51) and the fluid injector connector FIc. Hence, the injector FIc can inject fluid, e.g. dried air, may via the fluid supply channel FSC through the fluid passage 51 of the valve member into the fluid feedthrough channel FFC of the CPU (see arrows a51 and a52).

The CPU valve member 50 and the fluid injector connector (actuator element) FIc are configured to releasingly engage one-another, for allowing valve actuation, which can be achieved in various ways. For example, the elements can interact via a clicking or clamping connection, via a bayonet-type lock or in a different manner. Preferably, a homokinetic clamping can be achieved, allowing for some play during placement of the container into the machine.

As indicated by arrow a32 in FIG. 10, the valve member 50 may be moved to an opened state for allowing flow through the product feedthrough channel PFC. FIG. 10 also indicated, as is mentioned before, that fluid injection (along arrow a31) is preferably possible regardless of the valve member 50 being in either an opened state or a closed state.

In a further elaboration of an exemplary embodiment, FIGS. 11a-11d show schematic cross section views of a valve member 50 including a fluid passage 51 and a fluid injector socket FIs, a product feedthrough channel PFC and a fluid feedthrough channel FFC, wherein FIGS. 11b-11d also show a fluid injector connector, wherein FIGS. 11a-11d show different configurations related to different states of the system. In FIGS. 11a-11d, sealing elements for providing sealed closures between components are indicated schematically by dots. The skilled person will be able to apply appropriate sealing elements according to general knowledge, depending on relevant system variables. In the case of a sealed connection between two components, sealing elements may be fixed to either or both components.

In FIG. 11a, the valve member 50 is shown in a closed state, blocking flow through the product feedthrough channel PFC, while providing a fluid connection between the fluid injector socket FIs and the fluid feedthrough channel through the fluid passage 51.

In FIG. 11b, the fluid injector connector FIc is shown as being received in the fluid injector socket FIs, wherein the fluid injector connector FIc is sealed by a sealing element e.g. of the fluid injector socket FIs for providing a sealed fluid connection between the fluid injector connector FIc, particularly the fluid supply channel FSC, and the fluid feedthrough channel FFC of the product processing unit CPU through the fluid passage 51 of the valve member 50, as indicated by arrow a41.

In FIG. 11c, the valve member 50 is shown to be actuated, preferably through actuation of the fluid injector connector FIc by the valve actuator VA (not shown in FIG. 11). The actuation is preferably a substantially helical (twisting) actuation, wherein the valve member 50 is configured to receive a rotary actuation force from the fluid injector connector FIc. As a result, the valve member 50 rotates around a rotation axis and—at the same time-linearly translates along the rotation axis). The axis of rotation can be substantially aligned with a central axis of the valve member 50 and a central axis of the fluid injector connector FIc. The product processing unit CPU can be configured to enable a substantially helical movement (i.e. a combined rotary and linear movement) of the valve member 50.

In other words, the valve member 50 and the product processing unit CPU can be configured so that a substantially rotary actuation of the valve member 50 causes a substantially helical movement of the valve member 50, which helical movement includes a linear movement component. The arrows a44 indicate the direction of the linear movement component. In FIG. 11d, the valve member 50 is shown in an opened state after having been actuated as described above. The opened state of the valve member 50 allows a flow of product P through the product flowthrough channel PFC along the direction of arrow a43.

Meanwhile, a fluid connection between the fluid supply channel FSC and the fluid feedthrough channel FFC through the fluid passage 51 has been maintained throughout the actuation and is still maintained while the valve member 50 is in an opened state as in FIG. 11d, as indicated by arrow a42. As said, the valve member 50 may be substantially rotated between an opened state and a closed state. An angle of rotation of the valve member 50 between an opened state and a closed state may be larger than 20 degrees, preferably in the range of 45 to 180 degrees, for example 90 degrees.

It will be appreciated that the state of the valve member 50 may be changed from the opened state to the closed state by reversing the procedure described above, including a reversing actuation. Both the opening and closing procedures are preferably automatically controlled by the control unit CU of the machine B, e.g. depending on a programmed dispensing of a certain amount of product.

Since the product valve member 50 is part of the replaceable product container, contamination of the dispensing machine itself (with product) can be prevented. The valve actuator of the dispensing machine simply connects to the CPU of the installed product container H, to control product flow and also to inject the gas (for example dried air) into the CPU for foaming the product via the respective microfiltration device. Moreover, the dispensing machine can automatically pressurize the content/interior of the product holder after the container has been loaded into the machine, for maintain the flexible bag at a certain pressure, allowing for a swift start of a product dispensing run. Once a product container has become empty or has to be replaced or discarded, the product container can be removed from the machine, wherein the product valve member 50 releases from the machine actuator, preferably remaining in its closed valve state, preventing further chance of contamination.

Moreover, by providing the microfiltration device with two tubular filtration walls 15a, operating in parallel, a good, controlled food product foaming—at a relatively high throughput—can be achieved using compact means. In particular, in this way, application of a relatively long tubular filtration wall can be prevented, allowing form more precise control of the foaming process with a relatively low chance of channel clogging.

As alluded to elsewhere in this description, one or more sealing elements (i.e. "sealing structure" or "sealing member") s1 of/at the valve member 50 may be configured to provide a sealed closure between the valve member 50 and its valve seat SV (e.g. providing walls of the product feedthrough channel PFC). The outer sealing element s1 is e.g. fixed to a rigid (non-elastic) inner part 50A of the valve member 50 in a rotation-fixed manner. The same holds for the inner sealing element s2. As shown in FIG. 8e, the outer sealing element s1 and inner sealing element s2 may be connected by one or more sealing bridges SB by which the sealing elements s1 and s2 may be at least partly held in place with respect to each other and/or with respect to another part of the valve member 50.

As shown in FIGS. 8e-f, at the position or positions of the one or more fluid passages 51, the outer sealing element s1 preferably provides a respective passage 51s through the said sealing element. FIG. 8e shows one such passage 51s and FIG. 8f shows another such passage 51s′.

A sealing element s1 may for example be configured to provide a sealed closure or partition between the product feedthrough channel PFC and the nearby fluid feedthrough channel FFC. In this respect, FIGS. 8a-f show further advantageous elaborations which will be explained below.

As shown, a sealing structure can be provided substantially at an interface between the valve member 50 and a respective valve seat SV. This sealing structure preferably provides at least one, preferably two, more preferably all of a first s1a, second s1b and third s1c sealing structure. It will be appreciated that one or more of said sealing structures s1a, s1b and s1c may alternatively be provided separately, e.g. separate from each other and/or separate from a more general sealing element s1. Several sealing structures s1a, s1b, s1c can be made in one piece, i.e. integrated in a single sealing element s1 that encloses/is applied onto an inner part 50A of the valve member 50.

Figure 8A:
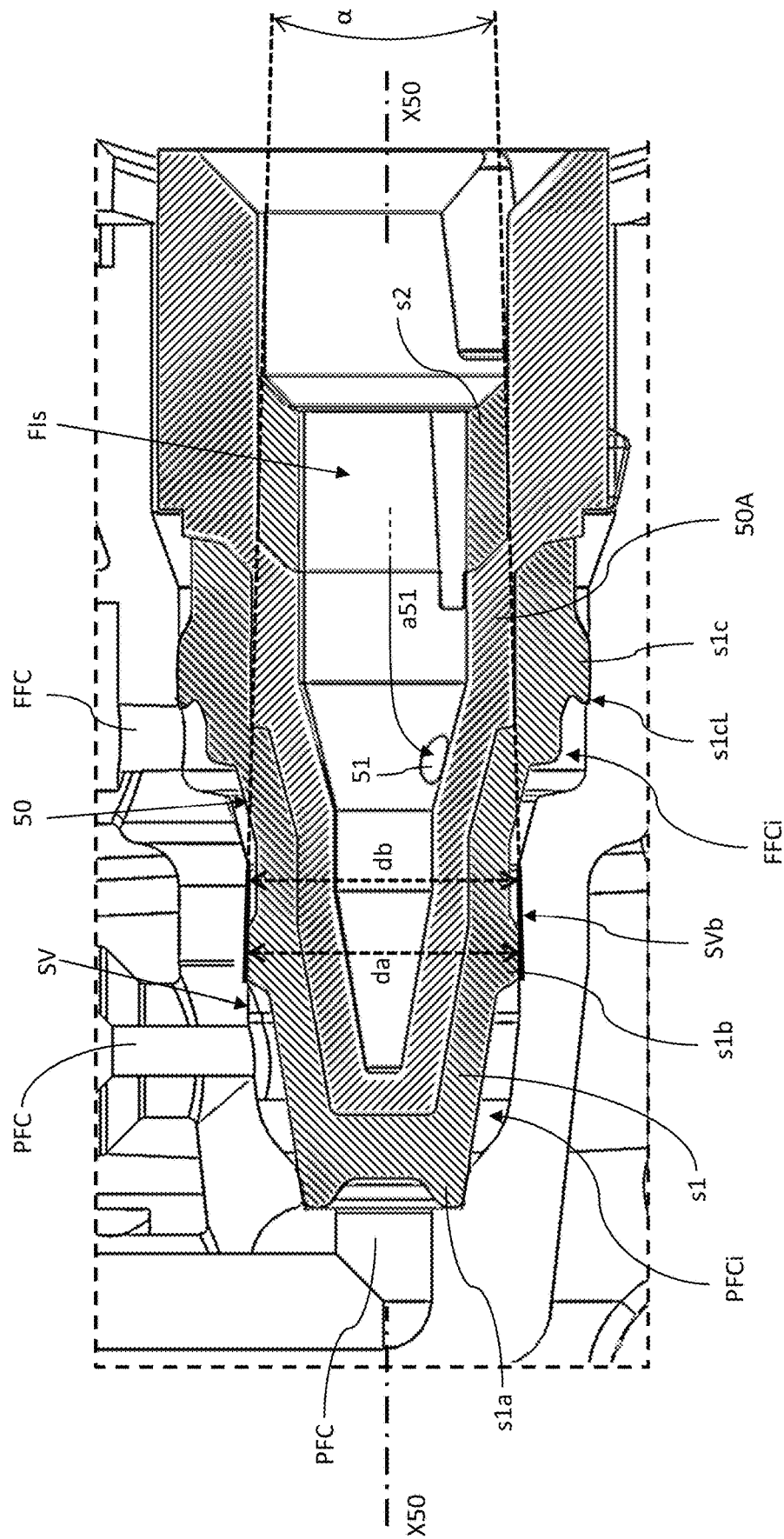
FIG. 8a shows a cross-section of the valve section of the CPU according to a further embodiment, wherein the valve is in a closed state.
Figure 8B:
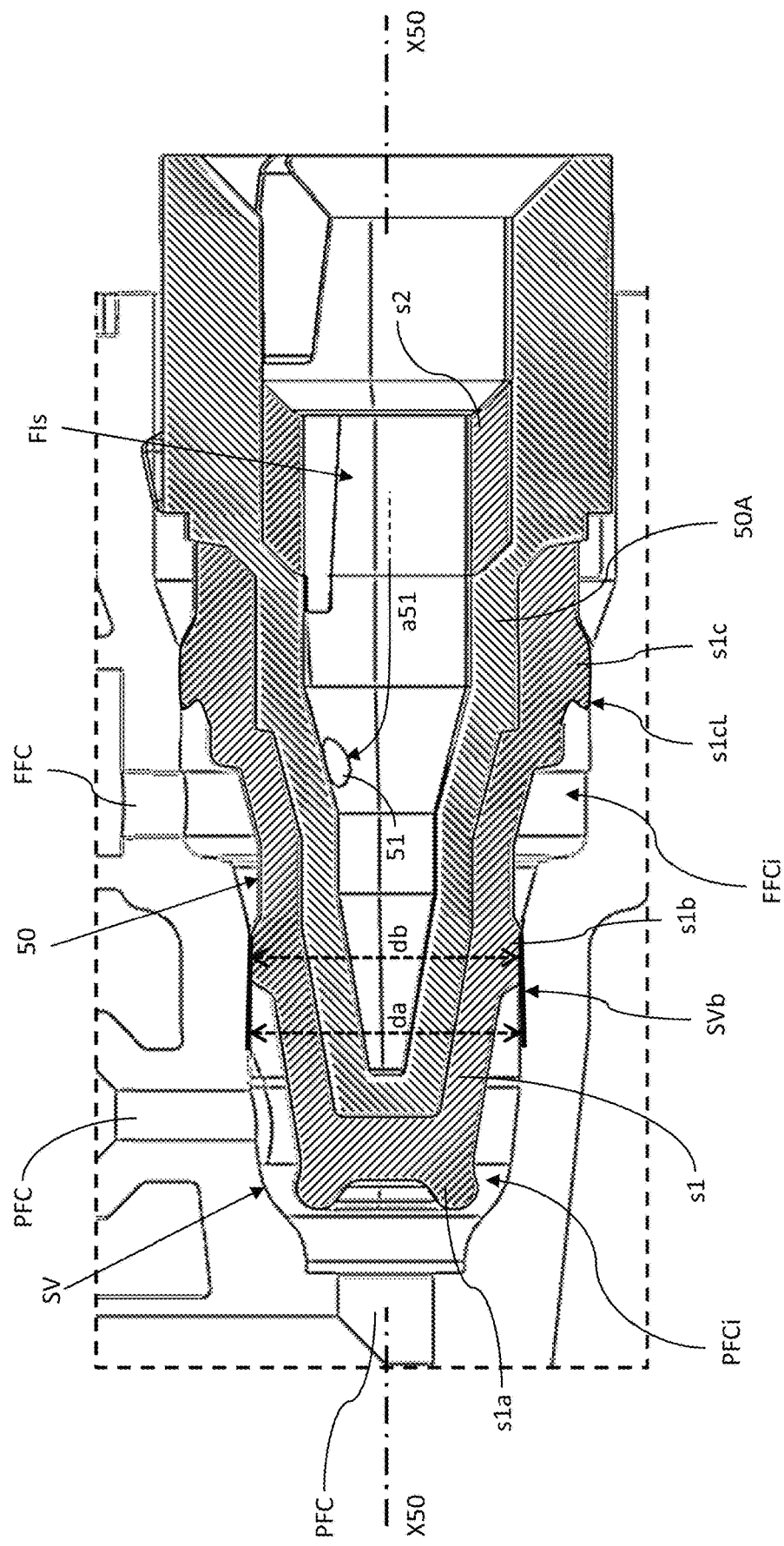
FIG. 8b is similar to FIG. 8a, wherein the valve is in an opened state.
Figure 8C:
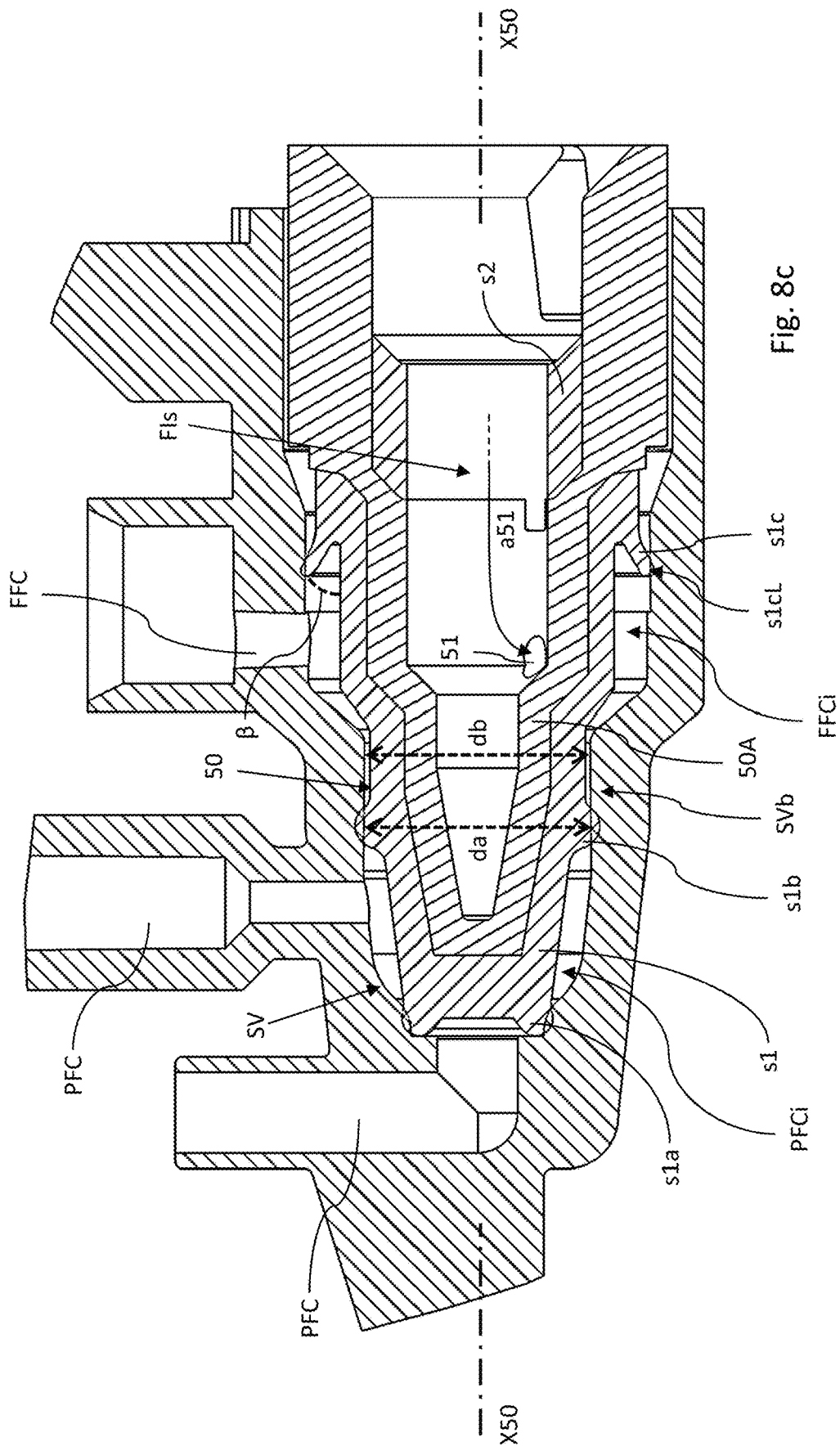
FIG. 8c shows a cross-section of the valve section of the CPU according to a further embodiment, wherein the valve is in a closed state.

The first sealing structure s1a is arranged distally at the valve member 50 and is configured to provide a first sealed closure which blocks the product feedthrough channel PFC when the valve member 50 is in a closed state (see FIGS. 8a and 8c). The first sealing structure s1a is removed from the seat SV when the valve member 50 has been moved to its opened position (see FIGS. 8b and 8d).

Figure 8D:
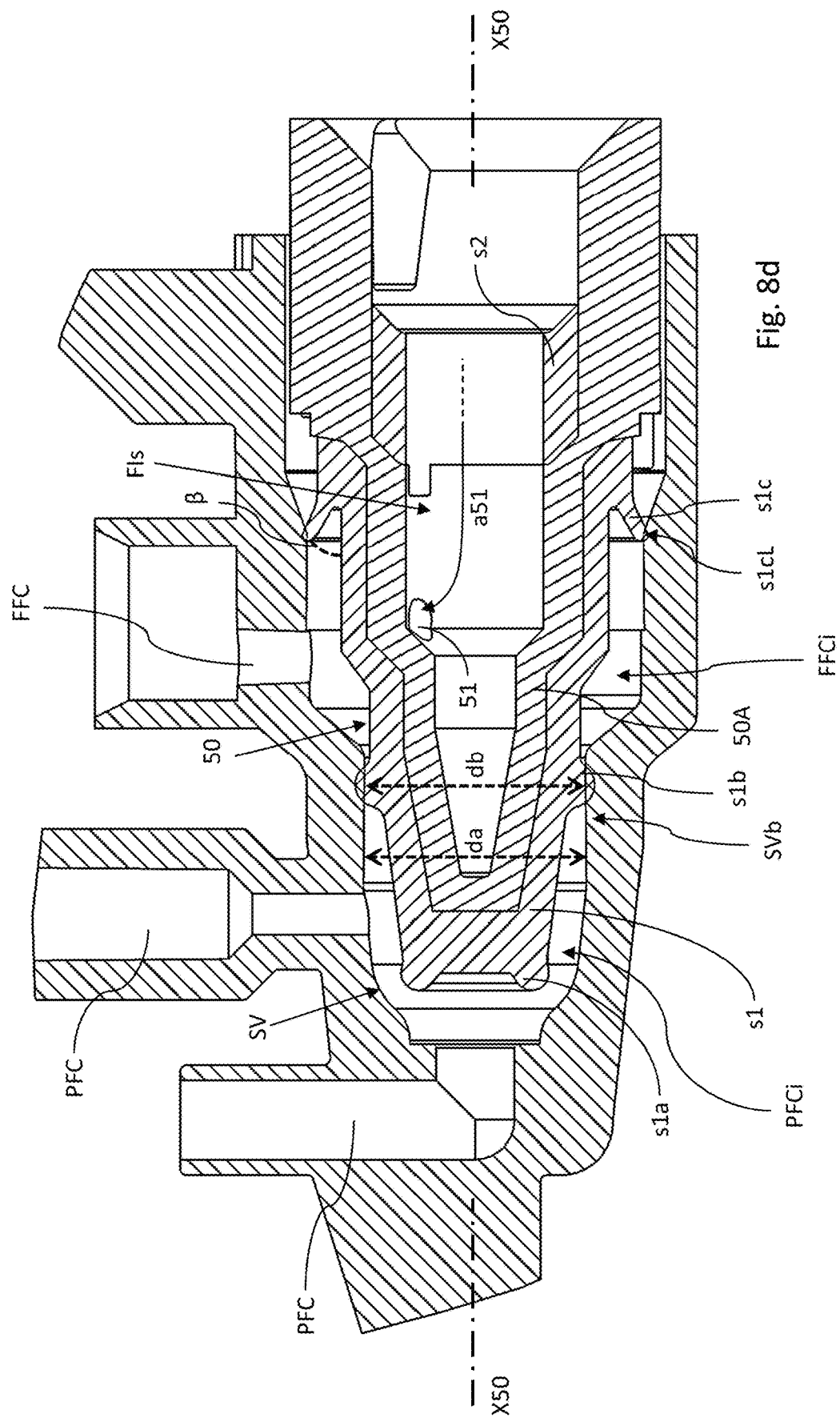
FIG. 8d is similar to FIG. 8c, wherein the valve is in an opened state.

In FIGS. 8c and 8d, parts of the sealing structure s1 have been drawn as overlapping with parts of the valve seat SV. It will be appreciated that, as indicated for example in FIGS. 8a and 8b, such parts of sealing structure s1 are in fact compressed and/or deformed, in particular by the valve seat SV. Thus, in practice, such parts preferably do not overlap.

It will also be appreciated that in FIGS. 8a-f, the shown first, second and third sealing structures s1a, s1b, s1c each extend substantially circularly and/or circumferentially around a main axis X50 of the valve member 50. One or more of such sealing structures may be substantially ring shaped, e.g. having a convex substantially toric outer surface. The sealing structures are preferably concentric with respect to each other, e.g. having their respective centers at main axis X50.

FIG. 8a shows how the first sealing structure s1a is at least partly compressed by the valve seat SV, thereby providing the first sealed closure. FIGS. 8b and 8d show how the first sealing structure s1a is at a distance from the valve seat SV, thereby opening the product feedthrough channel PFC (and thus not providing a sealed closure therein).

The second sealing structure s1b is configured to provide a second sealed closure, remote from a distal end of the valve member 50 at a location between a distal section and a proximal section of the valve member 50.

The second sealing structure s1b may be arranged between the product feedthrough channel PFC and an area outside the product feedthrough channel PFC, at least when the product feedthrough channel PFC is not closed by the valve member 50.

The second sealing structure s1b and a respective receiving structure SVb (see FIGS. 8a-b) may be movable with respect to each other, in particular along with a movement of the valve member 50 with respect to a, e.g. the, valve seat SV, between at least a first and a second relative position.

The second sealing structure s1b and/or said receiving structure SVb can be dimensioned such that the second sealing structure s1b is more compressed, in particular by the receiving structure SVb, in the second relative position compared to in the first relative position.

Said second relative position preferably corresponds to an open position of the valve member 50, in particular with respect to a, e.g. the, valve seat SV, in which open position the product feedthrough channel PFC is not closed by the valve member 50.

Said first relative position preferably corresponds to a closed position of the valve member 50, in particular with respect to a, e.g. the, valve seat SV, in which closed position the product feedthrough channel PFC is closed by the valve member 50.

As shown, said receiving structure SVb may form part of the valve seat SV. Alternatively, for example, the receiving structure may form part (and be movable along with) of the valve member 50 wherein the second sealing structure s1b is (e.g. substantially fixedly) connected to the valve seat SV.

In order to achieve that the second sealing structure s1b is more compressed in its second relative position compared to its first relative position, the respective receiving structure SVb may provide a tapered inner surface, e.g. by providing a substantially frustoconical structure (frustoconical sealing surface) which provides at least two different diameters da, db of the receiving structure SVb. Such diameters are shown in FIGS. 8a-d, wherein, compared to e.g. the average of said diameters, a difference between said diameters can be relatively small, but nevertheless present and functional: in the drawing, diameter da is larger than diameter db. FIG. 8a additionally shows how the frustoconical structure may define an included top angle α (for example an angle α that is larger than 0.5 degrees and smaller than 20 degrees, preferably smaller than 10 degrees). Further, it can thus be seen that a main axis of the substantially frustoconical structure preferably substantially coincides with the central axis X50 of the valve member 50.

As shown, the position of the smaller diameter db of the at least two different diameters da, db preferably corresponds to a position of the sealing structure s1b when the valve member 50 is in an opened state (see FIGS. 8b, 8d). Preferably a position of the larger diameter da of the at least two different diameters da, db corresponds to a position of the sealing structure s1b when the valve member 50 is in a closed state (see FIGS. 8a, 8c).

Thus, when the valve member 50 is moved from its closed position (FIGS. 8a, 8c) to its opened position (FIGS. 8b, 8d), the sealing structure s1b thereby becomes more compressed by the receiving structure SVb. When the valve member 50 is subsequently moved from its opened position to its closed position, the sealing structure s1b thereby thus becomes less compressed (or even uncompressed, relaxed). Since the closed position may be a default position of the valve member 50, i.e. during use the valve member 50 is more often in the closed position compared to the opened position, the above described configuration can thus help to reduce or prevent creep in the sealing structure s1b, thereby improving the durability and/or reliability of the sealing structure s1b in terms of its sealing performance.

It will be appreciated that the functionality of the sealing structure s1b being less compressed in the valve member's opened state compared to the closed state may as such be realized in various ways, for example by variations of the above-described configuration of the receiving structure SVb.

The third sealing structure s1c is arranged near or at a proximal section of the valve member 50 and may be configured to provide a sealed closure between the fluid feedthrough channel FFC and an area outside the fluid feedthrough channel FFC. The third sealing structure s1c is preferably configured to tighten the respective sealed closure depending on, preferably under influence of, an increased fluid pressure in the fluid feedthrough channel FFC relative to the area outside the fluid feedthrough channel FFC.

In this way, the respective sealed closure can be sufficiently tight (i.e. resisting leakage of pressurized air during use) when the fluid feedthrough channel is pressurized, substantially without inhibiting movement of the third sealing structure s1c with respect to the valve seat SV when the fluid feedthrough channel FFC is not or less pressurized. Thus, the valve member 50 can be moved between its open and closed positions (e.g. along axis X50) and leakage from the fluid feedthrough channel FFC can be prevented.

The third sealing structure s1c is preferably substantially deformable under influence of a fluid pressure difference at the third sealing structure s1c. The third sealing structure s1c preferably comprises a lip seal structure s1cL for forming a lip seal, in particular between the valve member 50 and a, e.g. the, valve seat SV.

The lip seal structure s1cL preferably extends substantially at an angle ß with the main axis X50, e.g. viewed in cross section as in FIGS. 8c-d, wherein the angle ß is preferably between 1° and 90°, more preferably between 10° and 70°, more preferably between 20° and 50°, for example about 30°. The lip seal structure s1cL preferably extends at least partly radially outwardly from the main axis X50. The lip seal structure s1cL preferably extends at least partly towards a distal end of the valve member 50 from the main part of the sealing element s1.

FIGS. 8a-b show one example of a lip seal element s1cL, while FIGS. 8c-d show another such example. It can be seen from these examples that an increased pressure in the fluid feedthrough channel FFC, in particular with respect to an area on the other side of the third sealing structure s1c from the fluid feedthrough channel FFC, can deform and/or compress the lip seal structure s1cL such that it is pressed (more) tightly against the valve seat SV at the position of the third sealing structure s1c.

Such a deformability and in particular such a lip seal structure s1cL can advantageously provide that the third sealed closure is tightened depending on an increased fluid pressure in the fluid feedthrough channel FFC relative to the area outside the fluid feedthrough channel FFC.

One or more of the various sealing structures s1a, s1b, s1c at the valve member 50 may additionally provide that the valve member 50 is and/or remains substantially centered with respect to the valve seat SV, in particular while at the same time permitting opening and closing movements of the valve member 50.

As the sealing structures s1a, s1b, s1c are preferably arranged at a distance from each other, one or more intermediate spaces may thus be provided between them, e.g. between the valve member 50 (in particular an outer face of sealing element s1) and the valve seat SV. For example (see FIGS. 8a-d), between the sealing structures s1a and s1b, an intermediate space PFCi is provided which forms part of the product feedthrough channel PFC, at least when the valve member 50 is in its opened position. As another example, between sealing structures s1b and s1c another intermediate space FFCi is provided which forms part of the fluid feedthrough channel FFC and/or the fluid passage or passages 51, at least providing part of a fluid path which includes the fluid passage 51 and the fluid feedthrough channel FFC. Said intermediate space FFCi preferably remains open and fluidly connected to the fluid passage 51 and the fluid feedthrough channel FFC substantially irrespective of the valve member 50 being either in an opened or closed position. Also, the valve member 50 and valve seat SV, in particular the sealing structures s1b and s1c, are preferably configured such that said intermediate space FFCi remains substantially fluid tightly sealed irrespective of the valve member 50 being either in an opened or closed position, wherein in particular the sealing structure s1c prevents leakage of pressurized air to the (atmospheric) environment.

FIGS. 16a-c show perspective views of product flow paths and fluid flow paths in the CPU according to a preferred exemplary embodiment (depicted in FIG. 12), wherein FIG. 16c shows an upside-down view with respect to FIGS. 16a-b. Reference signs have been added to indicate where some corresponding CPU elements are positioned with respect to the flow paths that are shown. In these figures, product flow paths are shaded light gray, whereas fluid flow paths are shaded dark gray. Flow directions have been indicated with arrows, where dashed-line arrows p1-p7 indicate subsequent product flow path directions and solid-line arrows g1-g4 indicate subsequent fluid flow path directions. It is noted that in these figures, product flow paths include flow paths of product provided with gas, i.e. flow paths downstream of the frothing device 15. It is also noted that not all arrows are shown in all of the FIGS. 16a-c.

At arrow p1, product flows from the product container into the product flowthrough channel PFC of the CPU. At arrow p2, product flows past the valve member 50 when the valve member 50 is in an opened state. At arrows p3, product flows through the frothing device 15 where the product is provided with gas. At arrows p4, the product provided with gas enters processing device 7 for pressure reduction and/or mixing. At arrow p5, the product provided with gas enters a downstream section of the processing device 7. At arrow p6, the product provided with gas flows towards the discharge channel DC, to be discharged along the direction of arrow p7.

At arrow g1, gas enters the CPU through a fluid passage of the valve member 50 to flow into the fluid flowthrough channel FFC along arrow g2, continuing along arrows g3. At arrows g4, the gas approaches two microfiltration walls 15a of the frothing device 15, after which it passes through the walls 15a to enter into the stream of product and continue as part of the product provided with gas.

For food safety purposes, depending on the specific product being contained in the container, it may be beneficial to prevent contamination of the CPU and/or the product in the product container before use, e.g. during transport and handling. In particular, it may be required that contact between the product and ambient air be prevented during those times. It may also be required that the interior spaces of the CPU are sealed off from ambient air to prevent e.g. condensate forming in those spaces with associated hygiene issues. In view of this, the CPU may be provided with sealing means for blocking ambient air from entering the CPU and/or from coming in contact with the product.

In particular, in an embodiment which may be carried out independently from the other embodiments, a downstream section of the CPU may be provided with an airtight sealing cap. In particular, the product processing unit CPU can be provided with an airtight sealing cap 71 configured to seal a downstream product discharge area 128 of the product processing unit CPU from an environment, before initial use. For example, the downstream discharge nozzle NZ may be located within the sealed downstream product discharge area 128 (see FIG. 12).

The sealing cap can be configured in various ways. As shown in FIGS. 12, 15a and 15b, the sealing cap may e.g. include a first section 71 and an optional second section 74 that is linked to the first section, e.g. via a (film) hinge 73, wherein preferably at least one or both of the sections is/are provided with a gripping element, e.g. a handle 72. Said optional hinge 73 may be, for example, an integral (one-piece) flexible section of the sealing cap.

In an example, the first cap section 71 is configured to seal off the downstream area 128 and can cooperate with an opposite rim of the CPU to form the respective airtight seal.

Further, in an example, the second cap section 74 may be configured to seal off a second external opening of the CPU, the second opening being a gas supply opening of the gas supply FIs (see FIG. 12).

The sealing cap may be configured to be removed by a user at or around at time when the product container is inserted into the dispensing machine: first the handle is pulled to rotate the first section about the hinge and to release the first section from the CPU; then the sealing cap is pulled further to release the second section from the CPU.

In an example, a single cap includes both sections 71, 74 for sealing two different external openings of the CPU. Alternatively, the cap sections 71, 74 can be separate cap sections (that are not directly linked to each other).

In another embodiment, which may be carried out independently from other embodiments but may also be combined, the CPU may be provided with an airtight (e.g. pressure controlled) seal 61, 62 at an interface between the CPU, in particular the entrance of the afore-mentioned product feedthrough channel PFC, near or adjacent to the interior product containing space of the product container H. In an example, in a closed state, the seal is generally in direct contact with the contents of the product containing space, i.e. for example the product, preventing entry of product into the CPU and in particular preventing entry of e.g. air or gas from the CPU into the product that is held in the interior space of the container H.

As shown in FIGS. 12, 15b and 15c, in an example the seal is a pressure controlled seal that includes a ring 61 and a cap 62, wherein, in a closed state (as shown in FIGS. 12 and 15b), the ring and the cap form an airtight seal, and, in an opened state (as shown in FIG. 15c) a passage for product flow is provided between the ring and the cap as indicated by arrow a61. Since the location of the pressure controlled seal may be hard to access for a user and since hygienic operation of the seal is desired, the pressure controlled seal is preferably configured to open under a pressure exerted by contents of the product container when the product container is pressurized. Thus, opening of the pressure controlled seal is controlled by controlling a pressurization of the product container. The ring and the cap are preferably configured so that the cap breaks away from the ring at a predetermined super-atmospheric opening pressure or opening pressure range. In order to prevent that the broken-away cap should block a product flow into the product feedthrough channel PFC, the CPU may be provided with ribs 63 between the pressure controlled seal and an entrance of the product flow-through channel PFC, so that the cap rests on the ribs after breaking away from the ring, so that product can flow around and underneath the cap, as indicated by arrow a62. Alternatively, for example, the cap itself may be provided with ribs.

An airtight seal of the CPU at its upstream product entrance can be configured in various ways. FIG. 21 shows an alternative that differs from the example depicted in FIG. 12, in that the seal 61, 62 is further configured so that the sealing cap 62 (in particular a respective outer section 62*s*) can be radially compressed (upon pressurization from the product container) in order to release from the (fixed) ring portion 61, thereby opening a respective product flow path into the CPU. For example, a resilient or bendable neck portion 62*s* of the cap 62 can be pushed radially inwards, away from the opposite (fixed) ring 61, indicated by arrows a64, under the opening pressure exerted by contents of the product container when the container is pressurized (thereby reducing an outer diameter of the sealing cap 62 such that the cap can loosen or untighten from the surrounding retaining ring 61). In particular, as follows from FIG. 21, a circumferential outer side of the neck portion 62*s* of the cap 62 and an opposite inner side of the ring portion 61 can enclose a product pressure receiving slit 62*q*, allowing entry of pressurized product for radially compressing the sealing cap. Thus, pressure induced release of the cap 62 from the ring 61 is further facilitated.

In various embodiments, as is mentioned above, the system includes a pressurization chamber (for pressurizing a product holder). The pressurization chamber can be part of the machine B, or it can be part of a removable product container H. For example, as is mentioned above, the exterior walls TW, SW of the removable container H can act as a bag pressurization chamber. Alternatively, one or more such walls can be integrated in the machine B.

In each of these embodiments, the CPU (and its respective product holder, for example its flexible product bag FB) is preferably exchangeable. The CPU, during use, can extend e.g. partly or substantially outside the respective pressurization chamber (see e.g. FIG. 3A, 3B), through a CPU opening of the chamber (the product processing unit CPU in particular protruding via a wall structure SW of the container, e.g. via a dedicated CPU-receiving port RP, towards a product discharging area, as in FIG. 3B and FIG. 20*b*). In particular, the pressurization chamber can be defined by an external wall structure SW of the container, the wall structure SW including a CPU-receiving port RP for receiving and positioning the product processing unit CPU (see FIGS. 18*b*, 20*a*, 20*b*).

The CPU is preferably configured to cooperate with the pressurization chamber (i.e. with its CPU-receiving port RP) to form an airtight seal there-between when the CPU is received in the CPU opening. Such a seal can be achieved in various ways. For example, a ring element 91 of the CPU may form an airtight seal with the CPU chamber and/or other sealing means (not shown) can be provided between and/or integrated in the CPU and the respective port RP for sealing contact or sealing engagement there-between. Thus, the pressurization chamber can be pressurized to a desired operating pressure, wherein a leakage of pressurization gas from the pressurized space can be prevented.

Preferably, in order to promote ease of use and to prevent faulty operation of the system, the system can be configured to provide feedback to a user regarding formation of the airtight seal between the CPU and the pressurization chamber, upon such formation. For example, the CPU may be configured to cooperate with the CPU receiving port RP to produce a sound and/or a haptic feedback signal, e.g. a click.

To facilitate accurate placement of a CPU through the CPU opening of the port RP (e.g. for lining up a fluid supply opening SV of the CPU to a fluid supply connector 50 of the dispensing machine, as shown in FIGS. 18*a-b*, an external shape 111 of the CPU may be configured to substantially mate with a shape 112 of the CPU receiving opening in the port RP (see also FIG. 20*b*). The respective shapes may thus cause alignment and/or centering of the CPU during placement in or through the CPU opening of the port RP. Preferably, as shown in FIGS. 18*a-b*, the respective shapes are rotationally asymmetric about an axis substantially corresponding to a direction of insertion of the CPU, which direction is indicated by arrow a110 in both figures, wherein the arrow points into the surface of the drawing in FIG. 18*a*. The rotational asymmetry may be provided in various ways, for example, as shown in FIGS. 18*a-b*, by one or more protrusions 113 of the CPU (in this case one) on the side of an otherwise substantially axially symmetric shape. The CPU-receiving port RP can have a mating shape (e.g. aperture, notch) 114 for receiving and engaging the protrusion 113 of the CPU. Such an asymmetry provides for resisting an incorrect insertion, particularly an insertion wherein the CPU is rotated with respect to a desired orientation about the said axis.

Preferably, to facilitate accurate placement including alignment and/or centering, the CPU and/or the CPU receiving port RP can have a tapered shape. For example, as shown in FIG. 18*b*, the shape of the CPU can be tapered from a wider part (top part in FIG. 18*b*) that is proximal to the pressurized space to a narrower part (bottom part in FIG. 18*b*) that is distal to the pressurized space. As a result, the CPU is automatically centered in the CPU receiving port during insertion, thus benefitting ease of operation as well as preventing inaccurate placement.

Preferably, to further facilitate CPU-placement, and to ensure that the CPU remains locked in place during operation, as shown in FIGS. 20*a-c*, the system (in particular the container/capsule H) can be provided with a detachable CPU holding latch (clip) 102. FIG. 20*a* shows a perspective view of the CPU connected to a respective flexible bag FB and a CPU holding latch 102, for connecting the CPU to the container wall SW via a CPU-positioning port RP (see FIG. 20*b*). FIG. 20*b* shows a similar view, wherein the lid TW of the product container H has been installed to seal the space containing the flexible bag FW. FIG. 20*c* shows the CPU holding latch as such.

In the example, the CPU includes two L-shaped protrusions 101 on the outside of the CPU (the protrusions 101 facing away from each other). One such protrusion 101 is shown in FIGS. 20*a-c*; another is shown in FIGS. 15*a-b*. These protrusions 101 may be configured to cooperate with the CPU holding latch 102, and the lid TW and CPU-receiving port RP of the external container shell. In particular, after insertion of the CPU through the CPU opening of the CPU-receiving port RP, the arms 103 can be positioned between second sides 101*b* of the L-shaped protrusions 101 and port RP, for firmly latching the CPU in place. The latch 102 may include a spring element 105, that can e.g. be spring biased by the lid TW of the chamber after assembly, for locking the latch in place (see FIG. 20*b*). Also, the latch 102 can include a handle 104 or the-like for enhancing manual grip.

FIG. 20*b* shows that the external container wall SW may include guide/support elements 107 for assisting placement of the latch 102. Also, FIG. 20*b* shows a CPU-positioning port/positioning structure RP of the external container, the positioning structure RP in particular being configured for substantially surrounding an external side of the CPU in order to correctly position the CPU with respect to the container.

In an embodiment that is schematically shown in FIGS. 19*a-c*, which may be combined with any of the afore-described examples, a said cooling system CS can be configured to cool the interior of the container receiving space Hs, for cooling a product container including the CPU while it is received in that container receiving space Hs (the container not being shown in FIGS. 19*a-c*). The wall 121 structure of the receiving space Hs can e.g. include or be provided with one or more cooling duct/channel 122 of the cooling system CS, wherein—at least during operation—the cooling channel 122 contains a cooling liquid that is preferably circulated by the cooling system.

Each cooling channel 122 can be configured in various ways and can extend along various paths/directions. For example, one or more cooling channels 122 can extend in parallel with a center line of the container receiving space (as in FIGS. 19*a-c*). Preferably, in order to cool substantially the entire product container receiving space Hs, a said cooling channel 122 can extends along a winding and/or spiral/helical path around the container receiving space Hs.

The wall/wall structure 121 that encloses the container receiving space Hs may have a specific cooled CPU enclosing section (e.g. an extension) 125, which section 125 encompass outer sides of the CPU and respective nozzle NZ (in particular after placement of the container in the container receiving space; the CPU-enclosing section 125 is also schematically drawn by a dashed box in FIG. 3B).

Preferably, the cooled CPU-enclosing section 125 of the wall structure 121 has a product outlet 136 that is closable by a closure member 123. The closable product outlet 123 of the machine wall structure 121 is preferably located close/near to the product outlet of the CPU after container placement.

For example, the system can include a movable closure member 123 near, e.g. under the CPU (after placement in the machine) for closing/covering the product outlet 136 of the cooled CPU-enclosing section 125. For example, a motor 124 may be provided to move the closure member 123 to an opened position (for example in the direction of arrow a120) to provide a downwards passage for product flow (via the outlet 136) from the CPU during product discharge, and to move the member 123 in an opposite direction after product discharge (to close the outlet 136). This can prevent or significantly reduce heat (and water vapor) exchange from ambient air to the placed CPU (and the product container H) in the receiving space Hs.

Thus, the foamed product dispensing system may include a hermetically sealable wall structure 121 that encloses a container receiving space Hs for receiving the container H, wherein the wall structure 121 includes a product outlet port 136 that is closable (and sealable) by a closure member 123.

The closure member 123 is preferably thermally insulating, e.g. at least partly made from a thermally insulating material and/or configured to significantly reduce conduction of heat through the closure member 123. For example, the closure member 123 may be configured to retain therein a volume of air or another fluid which has low heat conductivity, wherein circulation of the air or other fluid within the closure member 123 may be inhibited, e.g. by a foam or foam-like structure in which the air or other fluid is held. The closure member 123 can include e.g. a cell foam material. In an example, a thermal conductivity of the member 123 can be smaller than 1 W/m/K, preferably smaller than 0.1 W/m/K (at atmospheric pressure and 20° C.). It will be appreciated that many variations and alternatives are possible with respect to enabling that the cover member 123 is thermally insulating.

FIGS. 19*a-c* show an example of a closure member 123 in various positions. FIGS. 19*d-f* show another example of a closure member 223 in various positions. Among other differences, the closure member 123 is arranged under the product outlet port 136, whereas the closure member 223 is arranged over (i.e. above) the product outlet port 236. An advantage of the closure member 223 being arranged above the product outlet port 236 (and below the CPU) is that the closure member 223 can thus be arranged closer to the CPU and/or that the space to be cooled around the CPU can be relatively small, thus enabling relatively rapid re-cooling of said space after a dispensing operation.

As shown in FIGS. 19*a-f*, the closure member 123 is movable between a first position (see FIGS. 19*b* and 19*d*) and a second position (see FIGS. 19*a* and 19*e*). In the first position the closure member 123 provides a passage for a flow of foamed product from the product outlet port 136. In the second position the closure member 123 closes the product outlet port 136.

The closure member 123 preferably comprises a product dispensing passage 123*a* itself, the passage 123*a* being is located opposite the product outlet port 136 when the closure member 123 is in the first position. Preferably in the closure member's second position, compared to the first position, the product dispensing passage 123*a* is arranged at a distance from the product outlet port 136.

Such a passage 123*a* can provide improved thermal insulation during dispensing. In particular, such a passage 123*a* can enable that exposure of the cooled space Hs is relatively small while product dispensing is also enabled.

A seal 125*s* (see FIGS. 19*a-c*) is preferably provided between the wall structure 121 and the closure member 123, in particular when the product outlet port 136 is closed by the thermally insulating closure member 123, in order to limit, preferably prevent, air flowing between the closure member 123 and the wall structure 121, such air flow being associated with transfer of heat and/or moisture. The seal 125*s* is preferably made from an elastic material, e.g. rubber, silicone or the-like.

In a particularly advantageous elaboration, the closure member 123 is manually removable from the product dispensing machine B and subsequently manually replaceable therein. In this way, easy remote cleaning of the closure member 123 can be enabled, the closure member 123 thus being in particular cleanable outside the machine B. The closure member 123 may be in particular removable and replaceable when a door D2 of the machine is opened (see FIG. 19*f* in comparison to e.g. FIG. 19*e*).

In this respect, although in the examples shown the closure member 123 can be disconnected from the machine B, 'removable from the machine B' is not to be construed as necessarily also meaning disconnectable from the machine B. For example, in an alternative embodiment which is not shown, the closure member 123 may remain at least physically linked to the machine B by a respective flexible linking structure, e.g. a string or chain or the-like.

Preferably the product dispensing machine B is configured to automatically open and close the product outlet port 136 by respective movement of the closure member 123, in particular after a manual replacement of the closure member 123. In this way, ease of use and/or hygiene can be promoted, as thus a user (operator) may thus suffice by simply replacing the closure member 123 (e.g. without also connecting or otherwise handling the replaced closure member 123).

As will be explained further, to this end, the machine B can include a closure member actuator 124 to (re)engage the closure member 123 after replacement.

As shown in FIG. 19f, for example, the closure member 223 may comprise a handling structure 223f for manually handling the closure member 223 while removing the closure member 223 from the product dispensing machine B. As shown, such a handling structure may be in the form of an edge, ridge, depression, groove or the-like which enables a user to exert a removal force (e.g. in the direction of arrow 221) on the closure member 223 using his hand M, for example one or more fingers. Such a handling structure 223f can provide improved ease of use as well as improved hygiene, as it can invite a user to let his hand touch only the handling structure 223f and not other parts of the closure member 223 and/or the overall system, in particular thus discouraging that the user touches a part which is contacted by discharged product during dispensing.

It will be appreciated that in FIG. 19F the indication of a hand M is not to be construed as a restrictive indication of scale.

The product dispensing machine B is preferably configured to detect a replaced closure member 123, e.g. using a respective sensor 124s (see FIGS. 19a-c), wherein preferably the closure member 123 comprises a respective detectable part 123n, e.g. a magnet 123n, which is configured to be detected by the product dispensing machine B, e.g. by the sensor 124s. Such a configuration can enable the machine B to respond to a replacement of the closure member 123, e.g. by attempting to (re)engage said closure member 123. Alternatively or additionally, the machine may thus provide feedback to a user regarding replacement of the closure member 123, e.g. indicating a correct or incorrect replacement, and possibly encouraging the user to take corrective action upon a detected incorrect replacement.

The closure member 123 may comprise a drip retaining structure 123d for receiving and retaining therein drips of product emanating from the product outlet port 136 at least when the product outlet port 136 is closed by the closure member 123 (see FIGS. 19a and 19e), wherein preferably the drip retaining structure 123d is at least partly arranged in alignment with, e.g. under or over, the product outlet port 136 when the product outlet port 136 is closed by the closure member 123. Such a drip retaining structure 123d can improve hygiene, in particular by inhibiting that drips of product can reach areas which are difficult to clean and/or which are less or not cooled. Any drips retained in the drip receiving structure 123d may be removed, i.e. the structure 123d may be cleaned, when the closure member 123 is removed from the machine, as described above.

As mentioned, the product dispensing machine B preferably comprises a closure member actuator 124 for actuating the closure member 123. For example, the closure member 123 may thus be actuated between a position in which the closure member 123 closes the product outlet port 136 (see FIGS. 19a and 19e), e.g. the second position, and at least one other position, wherein preferably the at least one other position comprises a position, e.g. the first position, in which the closure member 123, e.g. a passage 123a thereof, permits a flow of foamed product from the product outlet port 136 for dispensing foamed product. Such a closure member actuator 124 can enable that such a position or positions of the closure member 123 can be controlled by the machine B.

The closure member actuator 124 is preferably configured to engage and disengage the closure member 123 (e.g. to re-engage the closure member 123 after replacement thereof in the machine B). Such engaging and disengaging can effectively enable transfer of (mechanical) control of the closure member between the machine B and a user.

With respect to said disengaging, preferably the system comprises a blocking element 124b for blocking a movement of the closure member 123 at a predetermined position thereof, for example for disengaging the closure member 128 from the closure member actuator 124. In the particular the closure member actuator 124 may be configured to engage the closure member 123 with, e.g. against, the blocking element 124b to disengage the closure member 123 from the closure member actuator 124.

Such a configuration can provide effective means for controlled disengaging of the closure member 123 by the actuator 124. FIGS. 19c and 19f show how an actuator member 124a, preferably a substantially linearly moveable actuator member 124a, of the closure member actuator 124 has been retracted beyond such a blocking element 124b with the result that the closure member 123 has been disengaged by the blocking element 124b from the actuator 124. Such a disengaged closure member 123 may be manually removed and subsequently replaced as described above. Subsequently a replaced closure member 123 may be re-engaged by the actuator 124 e.g. by the actuator member 124a moving towards the closure member 123. It will be appreciated that the closure member 123 can thus also be re-engaged without prior removal and replacement thereof (e.g. when the user has not actuated the closure member 123 after the disengagement).

The closure member actuator 124 may be configured to magnetically engage the closure member 123, wherein preferably the closure member 123 comprises a magnetically engageable element 123m, e.g. a magnet 123m, which is configured to be engaged by the closure member actuator 124. It has been found that such a magnetic configuration can provide a good connection between the actuator 124 and the closure member 123 when the closure member 123 is engaged by the actuator 124 while also enabling well controlled engaging and disengaging of the closure member 123.

FIG. 17 shows a schematic view of a combined system for pressurization of a product container and for fluid supply to a CPU. This combined system relates to a preferred embodiment which may be carried out either independent of or in combination with any of the other embodiments. In alternative embodiments, for example, separate systems may be configured for pressurizing the product container and for fluid supply to the CPU.

In the exemplary system shown in FIG. 17, a choked gas supply is implemented, the choked gas supply including a respective flow constriction 89. In particular, as follows from the drawing, ambient air enters a compressor 82 through an air filter 81. A controllable three-way valve 83 directs the pressurized air downstream of the compressor either towards the container receiving space Hs, wherein the system is in a pressurization mode, or towards the CPU, wherein the system is in a dispensing mode. The three-way valve 83 is preferably adjustable by an electronic controller CTR between at least the pressurization mode and the dispensing mode. FIG. 17 schematically shows the three-way valve 83 in dispensing mode. In this exemplary embodiment, the pressurization mode and dispensing mode are mutually exclusive, although in alternative embodiments they may occur simultaneously.

In pressurization mode, a pressure sensor 84 measures the pressure in the container and feeds back a representative pressure signal to a controller (not shown) for regulating the pressure through regulation of the compressor 82. A safety valve 85 is provided to depressurize the container in case of excessive pressure, e.g. in case of a failure of the pressure sensor 84, the controller CTR and/or the compressor 82.

In dispensing mode, pressurized air enters a passive condensate block 87 which is positioned in a cooled space CSp of the dispensing system. The condensate block 87 is configured to passively cool and dry the pressurized air and is provided with a drain valve 88 for draining condensate produced by cooling the air, wherein the drain valve 88 is configured to be closed in dispensing mode and open otherwise.

As indicated in FIG. 17, the drain valve 88 may be fluidly connected to the container receiving space Hs. In this way, air can drain from the product container Hs through the condensate block 87 through the drain valve 88 into the atmosphere.

Downstream of the condensate block 87, the pressurized air passes into the CPU through an orifice 89, wherein the orifice provides a flow constriction 89 (also called gas restriction) so that a so-called choked flow condition occurs when air is supplied at sufficiently high pressure upstream of the orifice. In such a choked flow condition, flow velocity of the gas inside the constriction substantially corresponds to a speed of sound in the gas in the constriction. Advantageously, as a result, air flow downstream of the orifice can be substantially flow controlled as opposed to pressure controlled. In particular, a substantially steady air flow through the microfiltration walls 15*a* of the CPU can be provided substantially irrespective of a level of clogging of those walls 15*a*, wherein clogging generally results in an increased flow resistance. The flow constriction 89 is preferably arranged in one of: a (movable) fluid injector connector FIc of the product dispensing machine B, in particular in a distal part of the fluid injector FIc; and the product processing unit (CPU). Such an arrangement enables that the flow constriction 89 is arranged close to the microfiltration walls 15*a*, so that a delay in pressure build up at said walls 15*a* can be reduced, in particular by reducing the so-called dead volume between flow constriction 89 and walls 15*a*.

Upstream of the flow constriction 89, with further reference to FIG. 17, a gas buffer volume 89*b* can be provided in which a volume of pressurized gas, e.g. air, can be held. Such a buffer volume 89*b* can enable more rapid initial gas pressurization, in particular at the flow constriction 89, so that a delay in pressure build up at the microfiltration walls 15*a* can be further reduced (additional or alternative to a reduction as described above due to an arrangement of the flow constriction 89). It has been found that a minimum volume of the buffer volume 89*b* of 0.5 liter, e.g. a volume of up to 2 liter, can provide particularly good results.

The buffer volume 89*b* may for example be arranged in (e.g. formed by) a head space of the capsule SW or container receiving space Hs. Alternatively or additionally the buffer volume 89*b* may be arranged (elsewhere) in the machine B, in particular immediately downstream of the compressor 82, in order to limit or prevent shocks in the system.

Upstream of the condensate block 87 and downstream of the three-way valve 83, a bypass orifice 86 can be provided to evacuate excess air if the compressor is oversized.

The product dispensing machine B is preferably configured for pressurizing a placed product container H (e.g. placed in container receiving space Hs) to at least two (mutually different) operating pressures for supplying product to the processing unit CPU. In this way, user control of a cream-to-air ratio of the dispensed product can be provided, wherein in particular a higher operating pressure is associated with a higher cream-to-air ratio (i.e. a larger amount of cream with respect to an amount of air).

To that end, as shown in FIG. 17, the dispensing machine B preferably includes a user operable controller CTR for selecting a desired container operating pressure. In particular, said controller CTR may be connected to or forming part of a user interface IN of the machine B.

As shown, such a controller CTR may be combined with a controller which controls the compressor 82 and/or the three-way valve 83. Said controller CTR preferably receives input from the pressure sensor 84, for example to compare a sensed pressure to a predetermined or user configured target pressure.

The gas supply for supplying gas to the product (described above and shown in FIG. 17) is preferably configured for providing a predetermined gas flow rate during operation that is substantially independent of a set product container operating pressure.

It is self-evident that the invention is not limited to the above-described exemplary embodiments. Various modifications are possible within the framework of the invention as set forth in the appended claims.

Thus, the product can comprise, for instance, an edible or non edible protein, a protein mixture or protein solution. An edible protein solution can comprise, for instance, a milk protein, a whey protein and casein, egg white proteins, yeast isolate, soy protein, hemoglobin, vegetal protein isolate, meat protein, collagen, gelatin and the like.

The product may be, for instance, homogeneously or non homogeneously foamed.

The product can be a food product, or a cosmetic product, a cleaner and/or a different type of product.

The product can further contain various substances, for instance, a thickener, coloring, flavoring and the like.

For example, alternative modes of valve operation may be employed, and fluid paths may be laid out along various spatial trajectories without substantially affecting the functional performance of the system.

Further, the product dispensing machine can be configured to pressurize the product container in various ways. In an example, the machine can include one or more pumps or pumping means for pressurizing the container. In addition or besides, the machine can be configured to include one or more dedicated high pressure reservoirs (e.g. one or more gas cylinders, being filled with gas at high pressure, e.g. a pressure higher tan 100 bar), or to be connected to an external high pressure gas supply, for pressuring a product container. Moreover, as is mentioned before, the product container as such can be configured in various ways. It may include e.g. a pressurization chamber but that is not required (for example, the dispensing machine B itself may include a pressurization chamber for receiving a product container). Also, is follows from the embodiments described, the product container may be partly or entirely removable from the dispensing machine, in particular to be exchanged with a new (part).

Moreover, in various embodiments, the frothing device 15 includes at least one microfiltration device, for supplying gas to the product (for foaming). In this way good foaming results can be achieved. However, the system (in particular the CPU) can additionally or alternatively include one or more other frothing elements to provide product foaming, for example one or more filter elements, one or more gas injector devices for injecting gas into the product, one or more stirring devices, one or more turbulence inducers for inducting turbulence in a product flow, a combination of one or such elements and/or in a different manner.

Further, as follows from the above, a replaceable product container H as such can be configured in various ways. It can be provided by a single container wall that encloses an interior space for holding the product. Also, it can be provided by an external (e.g. rigid) wall that encloses an interior space, for receiving an internal product holder (e.g. a flexible bag or a product holder having at least one flexible wall). The product container as such can be configured to be pressurized. Further, the product container can act as a removable capsule during operation, for positioning product (e.g. a product holder) in the dispensing machine B.

Moreover, in above-embodiments, the machine B itself includes a cooling system CS, in particular for cooling a container receiving space Hs. In a further or alternative embodiment, the product container itself (e.g. an aforementioned capsule SW) is provided with cooling means for cooling the container. As an example, an outer wall SW of the container can include one or more cooling ducts for circulating a cooling medium through that wall, wherein such cooling ducts can e.g. be fed by the cooling system of the machine B with the cooling medium during operation (via respective, interacting cooling medium ports). In another embodiment, the cooling system can be integrated with the replaceable container itself. In yet another embodiment, the container wall SW can include one or more Peltier elements for removing heat from the container, wherein a power supply for such elements can be integrated with the container and/or with the dispensing machine B (in the latter case, dedicated electric contacts between the machine B and the container SW can be implemented for transferring Peltier element cooling power from the machine B to the container).

Further, the CPU is preferably configured such that, before initial use, the interior of the CPU (in particular its interior product ducts and processing space/spaces as well as its interior gas ducts) are hermetically sealed off from an environment of the respective product container H, in an airtight manner. This can be achieved by the CPU construction (i.e. its outer wall sections, see e.g. FIG. 12) and by application of gas tight sealing means that seal the product input/output openings as well as the gas injection opening (see e.g. FIG. 12 again) before initial use. For example, a main outer wall structure of the CPU can be assembled from a number of different CPU sections, in particular a top section including the product inlet part and at least a further section including a gas injection part (the section e.g. being plastic CPU sections, made e.g. via plastic injection moulding and/or other manufacturing steps), wherein such CPU sections can be joined to each other in a manner to provide an hermetically sealed outer CPU surface (except for product input/discharge openings and the gas injection opening that can be sealed via dedicated sealing means, e.g. afterwards, as is described above).

Further, according to an aspect, the product container H does not necessarily need to be a loose (exchangeable) container. According to an embodiment, it can also be integrated in the machine/appliance.

Further, the product container H can be a disposable container.

Further, according to an embodiment, the container can be a bottle or bottle-type container.

For example, the exchangeable product container can be a bag in container (BIC), or a bag in box (BIB) or bottle in bottle container (BIB), as will be appreciated by the skilled person.

The invention claimed is:

1. A foamed product dispensing system, comprising:
   (a) a product dispensing machine configured to receive an exchangeable product container;
   (b) a product container configured to cooperate with the product dispensing machine after placement in the machine;
   wherein the product container is configured to contain a foamable product,
   wherein the product container is provided with a product processing unit (CPU) including a frothing device, the CPU having a product entrance for receiving product and a product exit for discharging product,
   wherein the CPU is connectable to a gas supply for supplying gas to the product, and
   (c) a hermetically sealable wall structure that encloses a container receiving space for receiving the container,
   wherein the wall structure includes a product outlet port that is closable by a thermally insulating closure member,
   wherein the closure member is movable between a first position and a second position,
   wherein, in the first position, the thermally insulating closure member provides a passage for a flow of foamed product from the product exit of the CPU through the product outlet port,
   wherein, in the second position, the thermally insulating closure member closes the product outlet port, and
   wherein the closure member comprises a product dispensing passage that is located opposite the product outlet port when the closure member is in the first position,
   wherein in the second position of the closure member, as compared to the first position, the product dispensing passage is arranged at a distance from the product outlet port.

2. The foamed product dispensing system according to claim 1, wherein:
   (i) the closure member is manually removable from the product dispensing machine and subsequently manually replaceable therein, wherein optionally the closure member comprises a handling structure for manually handling the closure member while removing the closure member from the product dispensing machine; and/or
   (ii) the product dispensing machine is configured to automatically open and close the product outlet port using the closure member after a manual replacement of the closure member.

3. The foamed product dispensing system according to claim 1, wherein the closure member comprises a drip retaining structure for receiving and retaining therein drips of product emanating from the product outlet port at least when the product outlet port is closed by the closure member.

4. The foamed product dispensing system according to claim 3, wherein the drip retaining structure is at least partly arranged under and/or over the product outlet port when the product outlet port is closed by the closure member.

5. The foamed product dispensing system according to claim 1, wherein the product dispensing machine further comprises a closure member actuator for actuating the closure member, wherein the closure member actuator is configured to engage and disengage the closure member.

6. The foamed product dispensing system according to claim 5, wherein the system comprises a blocking element for blocking a movement of the closure member at a predetermined position thereof.

7. The foamed product dispensing system according to claim 5, wherein the closure member actuator is configured to magnetically engage the closure member, wherein the closure member optionally comprises a magnetically engageable element which is configured to be engaged by the closure member actuator.

8. A foamed product dispensing system according to claim 1,
wherein the product dispensing machine is configured for pressurizing a placed product container to at least two mutually different operating pressures for supplying product to the processing unit (CPU),
wherein the dispensing machine optionally includes a user operable controller (CTR) for selecting a desired container operating pressure,
wherein the gas supply is optionally configured for providing a predetermined gas flow rate during operation that is substantially independent of a set product container operating pressure.

9. A foamed product dispensing system according to claim 1,
wherein the gas supply is a choked flow gas supply, comprising a gas restriction for achieving choked flow during operation,
wherein the flow constriction is arranged in one of:
(i) a movable fluid injector connector of the product dispensing machine, in particular in a distal part of the fluid injector; and
(ii) the product processing unit (CPU).

10. The system according to claim 9, wherein the gas supply is configured to provide a gas buffer volume upstream of the flow constriction for providing a pressurized gas buffer, the gas buffer volume being located between a gas pressurization pump of the system and the flow restriction.

11. A foamed product dispensing system according to claim 1, further comprising:
an exchangeable capsule configured to exchangeably receive the product container,
wherein the machine is configured to exchangeably receive the capsule containing the product container,
wherein the capsule is configured to cooperate with the product dispensing machine to be pressurized,
wherein the product dispensing machine is configured to enable a pressurization of the capsule depending on a position and/or orientation of the capsule relative to the machine.

12. The foamed product dispensing system according to claim 11,
wherein the product dispensing machine comprises a retaining member which is movable from a releasing position to a retaining position depending on the position and/or orientation of the capsule relative to the machine,
wherein in the releasing position the capsule is releasable from the machine,
wherein in the retaining position the capsule is retained in the machine.

13. The foamed product dispensing system according to claim 12,
wherein the product dispensing machine comprises a door which is movable from an opened position to a closed position when the retaining member is in its retaining position,
wherein in its releasing position the retaining member substantially blocks a movement of the door from the opened position to the closed position,
wherein the machine is optionally configured to detect when the door is in the closed position.

14. A foamed product dispensing system, comprising:
(a) a product dispensing machine configured to receive an exchangeable product container;
(b) a product container configured to cooperate with the product dispensing machine after placement in the machine,
wherein the product container is configured to contain a foamable product,
wherein the product container is provided with a product processing unit (CPU), and a frothing device having a product entrance for receiving product and a product exit for discharging product,
wherein the CPU is connectable to a gas supply for supplying gas to the product,
wherein the CPU comprises a product feedthrough channel (PFC) upstream of the frothing device, closable by a valve member,
wherein the CPU comprises a fluid feedthrough channel (FFC) upstream of the frothing device,
wherein the valve member is configured for providing a fluid communication between the fluid feedthrough channel (FFC) of the CPU and a fluid supply of the dispensing machine,
wherein at the valve member, there is provided at least one of:
(i) a distally arranged first sealing structure configured to provide a first sealed closure which blocks the product feedthrough channel (PFC) when the product feedthrough channel (PFC) is closed by the valve member; and/or
(ii) a second sealing structure configured to provide a second sealed closure, remote from a distal end of the valve member at a location between a distal section and proximal section of the valve member; and/or
(iii) a third sealing structure arranged near or at a proximal section of the valve member.

15. The foamed product dispensing system according to claim 14,
wherein at least one of the sealing structures is an elastically compressible structure that protrudes laterally with respect to a central axis of the valve member, the compressible structure being compressed by a respective seal receiving structure, wherein the receiving structure is optionally dimensioned to compress the sealing structure more when the valve member is in an open state compared to when the valve member is in a closed state, and optionally, wherein the receiving structure forms part of the valve seat of the valve member, and/or wherein the receiving structure comprises a substantially frustoconical structure for compressing the sealing structure more at the closed state compared to the open state, wherein optionally a main axis of the substantially frustoconical structure substantially coincides with the central axis of the valve member.

16. The foamed product dispensing system according to claim 14, wherein at least one of the sealing structures comprises a lip seal structure for forming a lip seal.

17. A valve member for a product container of a foamed product dispensing system according to claim 14, wherein the valve member is configured for providing a fluid communication between a fluid feedthrough channel (FFC) of a product processing unit (CPU) of the container and a fluid supply of the dispensing machine, wherein the valve member is optionally provided with a first, second and/or third sealing structure.

18. A product container for a foamed product dispensing system comprising a valve member according to claim 17.

19. The foamed product dispensing system according to claim 14, further comprising a hermetically sealable wall structure that encloses a container receiving space for receiving the container, wherein the wall structure includes a product outlet port that is closable by a thermally insulating closure member, wherein the closure member is movable between a first position and a second position, wherein, in the first position, the thermally insulating closure member provides a passage for a flow of foamed product from the product outlet port, wherein, in the second position, the thermally insulating closure member closes the product outlet port, and wherein the closure member comprises a product dispensing passage that is located opposite the product outlet port when the closure member is in the first position, wherein in the second position of the closure member, as compared to the first position, the product dispensing passage is arranged at a distance from the product outlet port.

* * * * *